United States Patent [19]
Ikeda et al.

[11] Patent Number: 6,109,408
[45] Date of Patent: Aug. 29, 2000

[54] DRIVING FORCE TRANSMISSION SYSTEM

[75] Inventors: Akihiko Ikeda, Aichi-ken; Shinji Ogawa; Hirokazu Suzuki, both of Toyota; Mitsuru Ohba, Anjo; Fumitomo Tsuchiya, Toyota; Akihiko Ichikawa, Toyota; Tomoyuki Kano, Toyota; Satoshi Ashida, Toyota; Toshifumi Sakai, Okazaki; Hiroshi Takuno, Aichi-ken; Kunihiko Suzuki, Gamagori; Naoyuki Kokubo, Aichi-ken; Masayuki Shimada, Takahama; Naoyuki Sakai, Anjo; Takashi Hosokawa, Kariya; Akio Suzuki, Toyota; Moritaka Isomura, Kariya, all of Japan

[73] Assignees: Toyota Jidosha Kabushiki Kaisha, Toyota; Toyoda Koki Kabushiki Kaisha, Kariya, both of Japan

[21] Appl. No.: 09/014,627

[22] Filed: Jan. 28, 1998

[30] Foreign Application Priority Data

| Jan. 29, 1997 | [JP] | Japan | 9-015670 |
| Jan. 30, 1997 | [JP] | Japan | 9-016934 |
| Feb. 18, 1997 | [JP] | Japan | 9-049875 |
| Feb. 18, 1997 | [JP] | Japan | 9-049876 |
| Feb. 18, 1997 | [JP] | Japan | 9-049877 |
| Nov. 21, 1997 | [JP] | Japan | 9-321502 |
| Nov. 21, 1997 | [JP] | Japan | 9-321513 |
| Nov. 21, 1997 | [JP] | Japan | 9-321515 |
| Nov. 21, 1997 | [JP] | Japan | 9-321519 |
| Nov. 21, 1997 | [JP] | Japan | 9-337748 |
| Nov. 21, 1997 | [JP] | Japan | 9-337749 |
| Nov. 21, 1997 | [JP] | Japan | 9-337750 |
| Nov. 21, 1997 | [JP] | Japan | 9-337751 |

[51] Int. Cl.[7] .................................................. F16D 13/04
[52] U.S. Cl. .......................... 192/35; 192/54.52; 192/54.4; 192/84.7
[58] Field of Search .................... 192/53.2, 35, 54.52, 192/54.4, 70.12, 70.23, 84.7, 84.96, 48.2, 93 A

[56] References Cited

FOREIGN PATENT DOCUMENTS

| 63-97425 | 4/1988 | Japan . |
| 2-21441 | 5/1990 | Japan . |
| 3-219123 | 9/1991 | Japan . |
| 3-282019 | 12/1991 | Japan . |
| 4-18723 | 2/1992 | Japan . |
| 4-138133 | 12/1992 | Japan . |
| 7-14229 | 3/1995 | Japan . |
| 7-71563 | 3/1995 | Japan . |
| 2525611 | 11/1996 | Japan . |

*Primary Examiner*—Charles A. Marmor
*Assistant Examiner*—Ha Ho
*Attorney, Agent, or Firm*—Oblon, Spivak, McClelland, Maier & Neustadt, P.C.

[57] ABSTRACT

A driving force transmission system comprising: a coupling case and a shaft arranged rotatably relative to each other; a pilot clutch and a main clutch for controlling a torque transmission between the coupling case and the shaft; an electromagnet for controlling the actions of the pilot clutch and the main clutch; and oil for retaining the functions of the pilot clutch and the main clutch. This system further comprises a coupling case, a shaft, a rotor, an X-ring and an O-ring for isolating a coupling oil chamber, in which the pilot clutch and the main clutch are arranged, liquid-tight from the surrounding space.

39 Claims, 28 Drawing Sheets

DRIVING FORCE TRANSMISSION SYSTEM

BACKGROUND OF THE INVENTION

1. Field of the Invention

The present invention relates to a driving force transmission system to be applied to a transmission, transfer or differential of a vehicle.

2. Related Art

Generally in the driving force transmission system of the vehicle, there are arranged a plurality of rotary members, through which the output of an engine is transmitted to wheels. When a clutch mechanism is arranged in the driving force transmission system between the rotary members, on the other hand, the transmission/interruption of a torque can be arbitrarily switched by applying/releasing the clutch mechanism, if necessary. One example of the driving force transmission system, in which the clutch mechanism is arranged in the torque transmission path of the rotary members, is disclosed in Japanese Patent Laid-Open No. 282019/1991 (JP-A-3-282019).

The driving force transmission system, as disclosed, is equipped with a differential carrier made hollow, a connecting shaft (or a fast rotary member) inserted in the differential carrier, and a hub (or a second rotary member) arranged in the differential carrier and made rotatable relative to the connecting shaft. The connecting shaft and the hub are arranged on an axis, and a bearing is fitted between the differential carrier and the connecting shaft.

On the differential carrier, on the other hand, there is fitted an annular electromagnet which is stopped in its rotation relative to the differential carrier by means of bolts. On the connecting shaft, moreover, there is fixed a cylindrical side wall to set a predetermined air gap between the side wall and the electromagnet. A drum is jointed to the outer circumference of the side wall, and a pilot clutch and a main clutch are arranged between the drum and the hub.

The pilot clutch is equipped with a clutch disc splined in the inner circumference of the drum, a cam member fitted axially movably on the outer circumference of the hub, a clutch plate splined in the outer circumference of the cam member, and an armature to be attracted toward the side wall by an electromagnetic force. On the other hand, the main clutch is equipped with a clutch disc splined in the inner circumference of the drum, and a clutch plate splined in the flange of the hub.

Between the cam member and the main clutch, moreover, there is arranged an axially movable push member. Between the cam member and the push member, still moreover, here are fitted balls. On the other hand, a drive pinion shaft is jointed to the hub, and the drive pinion shaft is jointed to the differential constructed by the gear mechanism.

According to the driving force transmission system thus constructed, when no electric current is fed to the electromagnet, the pilot clutch is released so that the torque of the connecting shaft is not transmitted to the hub. When the electric current is fed to the electromagnet, on the other hand, the magnetic flux passes through the side wall and the armature so that the armature is attracted toward the side wall by the electromagnetic force.

Then, the pilot clutch is applied to rotate the cam member, and this rotation is transmitted to the balls so that the push member is activated in the axial direction to apply the main clutch thereby to transmit the torque of the connecting shaft to the hub. The torque thus transmitted to the hub is transmitted through the drive pinion shaft, the differential and axles to the wheels.

On the other hand, the differential carrier is filled in its internal space with oil for lubricating and cooling the pilot clutch, the main clutch and the differential.

Here, in the pilot clutch or the main clutch, the torque is transmitted by the fictional force between the surfaces of the clutch disc and the clutch plate. It is, therefore, preferable to select the oil which can keep the wear resistance, the oil cutting property or the judder resistance of the clutch disc and the clutch plate satisfactory. In the differential, on the other hand, the torque is transmitted and differentiated by the meshing resistance of the gears. It is, therefore, preferable to select the oil which is low in the fluid point, and is excellent in the heat resistance and oxidation stability and load resistance.

In the driving force transmission system described in the aforementioned publication, however, the pilot clutch, the main clutch and the differential are arranged in a common space of the differential carrier. This makes it difficult to employ the oil which is suited individually for the pilot clutch, the main clutch and the differential. As a result, the active characteristics of the pilot clutch and the main clutch may be degraded to lower the transmission function of the driving force.

Moreover, the oil, as confined in the differential carrier, may wet the electromagnet to make the magnetic permeability of a magnetic circuit heterogeneous and to lower the transmission function of the clutch mechanism for the driving force. Still moreover, a foreign substance such as wear powder, as produced at the side of the differential, may enter the clearance between the clutch disc and the clutch plate to wear or break the clutch mechanism thereby to lower the durability or the transmission function of the driving force.

SUMMARY OF THE INVENTION

A main object of the invention is to provide a driving force transmission system capable of using the oil suited for the action characteristics of a clutch mechanism and sealing the clutch mechanism to be controlled by an electromagnet, from another mechanism.

Another object of the invention is to improve the accuracy of a gap to be formed between an electromagnet and a magnetic member.

Still another object of the invention is to reduce the number of parts of the driving force transmission system.

Still another object of the invention is to facilitate the handling of an electric wire for energizing the electromagnet.

Still another object of the invention is to improve the positioning accuracy of a first rotary member in the radial direction.

Still another object of the invention is to make it possible to mount the driving force transmission system on a vehicle such that it is arranged in a longitudinal intermediate portion of the propeller shaft.

Still another object of the invention is to prevent the vibration at the vehicle body side from being transmitted to the electromagnet.

Still another object of the invention is to make it possible to mount the driving force transmission system on the vehicle without any special case and to arrange the same without modifying the transfer or differential.

Still another object of the invention is to suppress the entrance of a foreign substance into an electromagnet housing chamber.

Still another object of the invention is to improve the durability of a clutch mechanism.

Still another object of the invention is to facilitate the positioning of an annular electromagnet and a casing relative to each other in the circumferential direction.

Still another object of the invention is to suppress the plastic deformation of a first rotary member or nuts when stud bolts are embedded in the first rotary member and when the nuts are fastened after a fitting member is attached.

Still another object of the invention is to enhance the action efficiency for the clutch mechanism of the driving force transmission system of this kind by preventing the leakage of a magnetic flux establishing a magnetic path and to improve the controllability of the electromagnet for the clutch mechanism by preventing the fluctuation of the magnetic flux density in the magnetic path.

Still another object of the invention is to reduce the weight of the driving force transmission system.

Still another object of the invention is to enhance the applying force for the clutch mechanism thereby to increase the torque to be transmitted between the first rotary member and the second rotary member.

Still another object of the invention is to promote the cut of an oil film to be formed between a clutch plate composing the clutch mechanism and an armature or magnetic member for clamping the clutch plate.

Still another object of the invention is to make the clutch mechanism compact.

Still another object of the invention is to retain a low coercive force of a magnetic path establishing member acting as a path for a magnetic flux, as established by energizing the electromagnet, and a high hardness in a predetermined portion of the magnetic path establishing member.

Still another object of the invention is to suppress the difference in the magnetic attraction of the electromagnet among the products by minimizing the width of a welded portion, into which the materials for a body portion and an annular portion composing the first rotary member are welded, at the welding time thereby to minimize the influence upon the magnetic flux density of the magnetic path to be established.

Still another object of the invention is to joint the body portion and the annular portion of the first rotary member by adopting no welding means.

Still another object of the invention is to improve the joint strength between the body portion and the annular portion.

Still another object of the invention is to improve the working efficiency of electromagnetic type control means for the clutch mechanism.

Still another object of the invention is to improve the control performance of the electromagnet control means for the clutch mechanism.

Still another object of the invention is to suppress the noise or vibration of the clutch mechanism and the rotational chattering of a cam mechanism for applying the clutch mechanism.

According to the invention, therefore, there is provided a driving force transmission system comprising: a clutch mechanism to be kept wet with oil; and control means including an electromagnet for controlling the applied state of the clutch mechanism, and the clutch mechanism and the oil are housed in an oil chamber made liquid-tight. As a result, the oil, which is excellent in the effects for keeping satisfactory the characteristics of the clutch mechanism such as the wear resistance, the oil cutting or the judder resistance, can be used independently of another lubricating oil so that the transmission function of the driving force is improved.

Moreover, the oil chamber and the surrounding space are isolated liquid-tight by an isolating mechanism so that the oil, as confined in the oil chamber, is hard to leak to the electromagnet. As a result, the magnetic permeability of the magnetic circuit, as made of the electromagnet, is kept constant to stabilize the applying force for the clutch mechanism and additionally the transmission function of the driving force.

Moreover, the oil chamber and the surrounding space are isolated liquid-tight by the isolating mechanism so that the foreign substance, as may be present in the space around the oil chamber, can be prevented from entering the oil chamber. As a result, the wear or damage of the clutch mechanism is prevented to improve the durability of the clutch mechanism and the transmission function of the driving force.

In the driving force transmission system of the invention, on the other hand, the electromagnet is fitted on a stationary member, and a first rotary member is supported by a bearing with respect to the electromagnet and is rotatably supported by another bearing with respect to the stationary member.

As a result, a gap to be formed between the electromagnet and the first rotary member is accurately sized to suppress the fluctuation in the magnitude of the electromagnetic force for actuating the clutch mechanism.

As a result, the applying force for the clutch mechanism, i.e., the torque capacity is easily controlled to improve the transmission function of the driving force to be mutually transmitted between the first rotary member and the second rotary member. On the other hand, the first bearing and the second bearing are so arranged in substantially identical positions as to overlap in the radial direction. As a result, the space for arranging the first bearing and the second bearing in the axial direction can be made as small as possible to reduce the size of the driving force transmission system in the axial direction.

In the driving force transmission system of the invention, a connector accompanying the electromagnet engages with the stationary member to fix the electromagnet in the circumferential direction. As a result, the number of parts is suppressed. When the electromagnet is fixed in the rotating direction, on the other hand, the connector comes into a predetermined position of the stationary member so that the electric wire is easily connected with the connector.

In the driving force transmission system of the invention, the electromagnet can be fitted on the stationary portion such as the vehicle body. By this construction, the driving force transmission system of the invention can be arranged in an intermediate portion of a propeller shaft of the vehicle. In this case, the noise or vibration can be suppressed by interposing an elastic member between the stationary portion and the driving force transmission system.

The driving force transmission system of the invention is equipped with not only the oil chamber and an electromagnet housing chamber housing the electromagnet, and this chamber is isolated liquid-tight from the surrounding chamber. Thus, it is possible to prevent a foreign substance, as may be present outside of the electromagnet housing chamber, from entering this chamber. As a result, the foreign substance is hard to enter the air gap which is formed between the electromagnet and the magnetic member, to keep the magnetic permeability of the air gap at a constant level thereby to improve the driving force transmission function of the clutch mechanism.

Since the electromagnet housing chamber is formed adjacent to the oil chamber and filled with a cooling fluid, the heat, as generated by applying the clutch mechanism, is cooled with the cooling fluid so that the wear or breakage of the clutch mechanism is suppressed to improve the durability of the clutch mechanism. As a result, the torque transmission performance of the driving force transmission system is kept satisfactory.

In the driving force transmission system of the invention, the electromagnet is fitted in the opening of a casing through a positioning mechanism. Since the positioning mechanism is arranged to face the opening, the worker can observe the positioning mechanism visually from the outside of the casing trough the opening when the casing and the annular electromagnet are to be positioned in the circumferential direction on the axis. Moreover, when the annular electromagnet (or unit) and the casing are out of phase in the circumferential direction, this phase difference can be corrected into coincidence not by moving the electromagnet and the casing in the axial direction but only by rotating the electromagnet. As a result, the works of positioning the electromagnet and the casing in the circumferential direction can be performed easily and promptly to improve the assembly of the driving force transmission system.

The driving force transmission system of the invention is composed of a plurality of parts, and stud bolts are employed for fitting those parts. Each of these stud bolts has such threaded portions at its two end portions that their external diameters are set according to the strengths of the parts to be screwed thereon. As a result, the strength of the embedded side externally threaded portion and the strength of the nut side externally threaded portion can be suited for the strength of either the member to be fixed or the nut, so that the shearing stress to act on the fixed member or the threaded nut portion can be lightened to suppress its plastic deformation. On the other hand, the strength of the stud bolt is set by setting the external diameter of the embedded side externally threaded portion and the external diameter of the nut side externally threaded portion to different values. As a result, the axial length of the stud bolt can be suppressed to make contribution to the size reduction of the fixed member.

In the driving force transmission system of the invention, a magnetic path is established to circulate through a rear housing supporting the electromagnet, a friction clutch mechanism and the armature when an electromagnetic coil composing the electromagnet is energized, so that the armature is attracted by the magnetic induction. As a result, the armature applies the clutch mechanism frictionally so that the first and second rotary members are brought into a torque transmitting state by the frictional applying force thereby to transmit the torque according to the frictional applying force for the clutch mechanism between the first and second rotary members.

Thus, a front housing to be contacted by magnetic path establishing members including the rear housing, the clutch mechanism and the armature is made of a non-magnetic material. As a result, the magnetic flux forming the magnetic path is hard to leak from the front housing thereby to reduce no magnetic flux density. As a result, the working efficiency of the electromagnetic type control means for the clutch mechanism can be improved over that of the driving force transmission system of this type of the prior art.

In the driving force transmission system of the invention, the front housing is made of an aluminum alloy, and the rear housing is made of a magnetic material such as iron. Then, the first rotary member can be lightened to reduce the size of the driving force transmission system itself.

In the driving force transmission system of the invention, nut members are so screwed on the rear end portion of the rear housing as to move forward and backward thereby to fasten the front housing from the rear end side. This can eliminate the chattering, as might otherwise be caused by the screwing between the front housing and the rear housing, thereby to hold the air gap between a yoke and the rear housing always at a constant value.

As a result, the fluctuation, as might be caused by the fluctuation in the air gap, in the magnetic flux density is not caused to eliminate the fluctuation in the attraction for the armature. As a result, a stable frictional applying force is generated from the clutch mechanism to improve the controllability of the electromagnetic type control means for the clutch mechanism.

In the driving force transmission system of the invention, on the other hand, there are interposed between the first and second rotary members: a main clutch for transmitting, when frictionally applied, the torque between the two rotary members; a pilot clutch to be frictionally applied by the electromagnetic force generated by the electromagnet; and a cam mechanism interposed between the main clutch and the pilot clutch for converting the frictional applying force of the pilot clutch into a force for pushing the main clutch. As a result, the frictional applying force of the pilot clutch can be smoothly amplified and transmitted to the main clutch through the cam mechanism.

As a result, the main clutch can be sufficiently applied frictionally to raise the torque to be transmitted between the first and second rotary members thereby to improve the driving force transmitting characteristics of the driving force transmission system.

According to the driving force transmission system of the invention, when the electromagnet is energized, the magnetic path is established to circulate through the side wall, the clutch mechanism and the armature so that the armature is attracted toward the side wall by the magnetic induction. As a result, the armature pushes the clutch plate into frictional engagement to connect the two rotary members in a torque transmitting state so that the torque according to the frictional applying force is transmitted between the two rotary members.

Moreover, the clutch plate, as confronting the armature, of the clutch mechanism is so constructed as to rotate integrally with the armature, and an oil film is formed in the clearance between the confronting faces of the clutch plate and the armature. However, the cutting of this oil film is promoted by oil film cut promoting means which is formed on at least one of the confronting faces of the clutch plate and the armature. This suppresses the drop, as might otherwise be caused by the formation of the oil film, in the action responsiveness of the clutch mechanism.

In the driving force transmission system of the invention, the clutch plate, as confronting the side wall of the first rotary member, of the clutch mechanism is made rotatable integrally with that side wall. Then, an oil film is formed in the clearance between the confronting faces of the clutch plate and the side wall. However, the oil film cutting is promoted by the oil film cut promoting means which is formed on at least one of the confronting faces of the clutch plate and the side wall. This suppresses the drop, as might otherwise be caused by the formation of the oil film, in the action responsiveness of the clutch mechanism.

Here, in the driving force transmission system of the invention, the clutch plate, as confronting the armature, in the clutch mechanism is made rotatable integrally with the armature, and the clutch plate, as confronting the side wall of the first rotary member, in the clutch mechanism is made rotatable integrally with the side wall. In this case, oil film cut promoting means is provided on at least one of the confronting faces of the clutch plate and the armature and on at least one of the confronting faces of the clutch plate and the side wall. As a result, the oil film cutting is promoted between the clutch plate and the armature and between the clutch plate and the side wall, so that the reduction, as might otherwise be caused by the formation of the oil film, in the action responsiveness of the clutch mechanism is more effectively prevented.

In the driving force transmission system of the invention, the clutch plate, as confronting the armature, of the clutch mechanism is made rotatable relative to the armature thereby to form an oil film in the clearance between the confronting faces of the clutch plate and the armature. However, the oil film cutting is promoted by oil film cut promoting means which is formed on at least one of the confronting faces of the clutch plate and the armature. This suppresses the reduction, as might otherwise be caused by the formation of the oil film, in the action responsiveness of the clutch mechanism.

In this case, the armature can function as one clutch plate of the clutch mechanism. As a result, the clutch mechanism can be made compact while retaining a predetermined function.

In the driving force transmission system of the invention, the clutch plate, as confronting the side wall of the first rotary member, in the clutch mechanism and the side wall are made rotatable relative to each other. Then, an oil film is formed in the clearance between the confronting faces of the clutch plate and the armature. However, the oil film cutting is promoted by oil film cut promoting means which is formed on at least one of the confronting faces of the clutch plate and the side wall. This suppresses the reduction, as might otherwise be caused by the formation of the oil film, in the action responsiveness of the clutch mechanism.

In this case, the side wall of the first rotary member can function as one clutch plate of the clutch mechanism. As a result, the clutch mechanism can be made compact while retaining a predetermined function.

In the driving force transmission system of the invention, the clutch plate, as confronting the armature, in the clutch mechanism is made rotatable relative to the armature, and the clutch plate, as confronting the side wall of the first rotary member, in the clutch mechanism and the side wall are made rotatable relative to each other. In this case, oil film cut promoting means is fitted on at least one of the confronting faces of the clutch plate and the armature and on at least one of the confronting faces of the clutch plate and the side wall.

Thus, the oil film cutting is promoted between the clutch plate and the armature and between the clutch plate and the side wall. As a result, the reduction, as caused by the formation of the oil film, in the action responsiveness of the clutch mechanism can be more effectively prevented, and the clutch mechanism can be made more compact.

The driving force transmission system of the invention is equipped, between the two rotary members, with: the main clutch for transmitting, when frictionally applied, the torque between the two rotary members; the electromagnetic type pilot clutch to be frictionally applied when energized; and the cam mechanism interposed between the main clutch and the pilot clutch for converting the frictional applying force for the pilot clutch into a force for pushing the main clutch. As a result, the frictional applying force for the pilot clutch can be smoothly amplified and transmitted to the main clutch through the cam mechanism.

As a result, the main clutch can be forcibly applied frictionally to raise the torque to be transmitted between the two rotary members thereby to improve the driving force transmitting characteristics of the driving force transmission system.

In the driving force transmission system of the invention, when the electromagnet is energized, the magnetic path is formed to circulate through the side wall of the first rotary member, the clutch mechanism and the armature so that the armature is attracted toward the side wall by the magnetic induction. As a result, the armature applies the clutch mechanism frictionally so that the two rotary members are connected to transmit the torque by the frictional applying force thereby to transmit the torque according to the frictional applying force for the clutch mechanism between the two rotary members.

Here, the magnetic path establishing members for establishing the magnetic path, when the electromagnet is energized, between the electromagnet and the armature are made of a low-carbon magnetic material, and the sliding portions of the magnetic path establishing members have highly hard surfaces. As a result, the magnetic path establishing members have a high magnetic permeability as a whole and a low coercive force, and have hard surfaces only at the sliding portions requiring the high hardness so that they are excellent in heat resistance and wear resistance.

As a result, it is possible to retain not only the low coercive force of the magnetic path establishing members but also the high hardness of the necessary portions. When the feed of the electric current to the electromagnet is interrupted, the magnetic path, as established in the magnetic path establishing members, promptly disappears to cause no delay in response to the interruption of the magnetic path. As a result, as soon as the current feed to the electromagnet is interrupted, the clutch mechanism interrupts its action thereby to interrupt the torque transmission between the two rotary members.

According to the driving force transmission system of the invention, the sliding portions of the magnetic path establishing members are given the highly hard surfaces by a surface hardening treatment. This surface hardening treatment to be applied to the sliding portions of the magnetic path establishing members include a carburizing treatment and a quenching treatment. The surfaces can be easily hardened either by carburizing and quenching only the surfaces of the sliding portions of the magnetic path establishing members or by carburizing the whole surfaces of the magnetic path establishing members, machining the carburized surface portions excepting the sliding portions of the magnetic path establishing members and quenching the portions left unmachined.

In the driving force transmission system of the invention, the magnetic path establishing members are exemplified by the side wall of the first rotary member. This first rotary member is constructed of a bottomed cylindrical front housing made of a non-magnetic material, and a rear housing screwed on the rear end opening of the front housing to cover the rear end opening and made of a magnetic material. The rear housing constructs the side wall of the first rotary member. As a result, only the sliding portions can be easily subjected to the surface hardening treatment if the rear housing can be made to have a high magnetic permeability and a low coercive force.

The driving force transmission system of the invention is equipped, between the two rotary members, with the main clutch for transmitting, when fictionally applied, the torque between those rotary members, the electromagnetic type pilot clutch to be frictionally applied when energized, and the cam mechanism interposed between the main clutch and the pilot clutch for converting the frictional applying force for the pilot clutch into the force for pushing the main clutch. As a result, the frictional applying force for the pilot clutch can be smoothly amplified and transmitted to the main clutch through the cam mechanism.

As a result, the main clutch can be sufficiently applied frictionally to raise the transmission torque between the two rotary members thereby to improve the driving force transmitting characteristics of the driving force transmission system.

In the driving force transmission system of the invention, when the electromagnet is energized, the magnetic path is established so that the clutch mechanism is frictionally applied by the magnetic induction. By this frictional applying force, the two rotary members are connected to transmit the torque so that the torque according to the frictional applying force for the clutch mechanism is transmitted between the two rotary members.

Moreover, the first rotary member is equipped with the front housing of a non-magnetic material and the rear housing, and the rear housing is composed of a body portion made of a magnetic material, and an annular portion made of a non-magnetic material and fitted on the radially intermediate portion of the body portion. The body portion and the annular portion are jointed by the electron-beam welding method.

According to this electron-beam welding method, the welded portion, in which the two materials making the body portion and the annular portion are welded into each other, is extended narrow and deep so that the influences of the magnetic permeability upon the rear housing can be reduced. As a result, it is possible to suppress the difference in the magnetic attraction of the electromagnet among the products of the driving force transmission system and to retain the welding depth of the welded portions sufficiently thereby to improve the joint strength between the body portion and the annular portion.

In the driving force transmission system of the invention, the first rotary member is equipped with the front housing of a non-magnetic material and the rear housing, and the rear housing is composed of a body portion made of a magnetic material, and an annular portion made of a non-magnetic material and fitted on the radially intermediate portion of the body portion. Moreover, the annular portion is formed into a conical cylinder and is jointed to the body portion by fitting it in the conical annular hole formed in the body portion.

Thus, the joint of the annular portion, as composing the rear housing, to the body portion is strong, and no welding means need be adopted for jointing the annular portion and the body portion. As a result, the influences, as caused from the welded portion, of the magnetic permeability can be eliminated to suppress the difference in the magnetic attraction of the electromagnet among the products of the driving force transmission system. Moreover, the welding means can be omitted to lower the production cost.

According to the driving force transmission system of the invention, when the active force is applied for urging the annular portion of the rear housing to the body portion in the axial direction, the body portion is fitted to bite in a wedge shape into the annular portion. As a result, the joint strength of the annular portion to the body portion is further enhanced.

According to the driving force transmission system of the invention, the electromagnetic type control means for applying the clutch mechanism frictionally is equipped with the electromagnet positioned outside of the front housing and confronting one side of the clutch mechanism, as positioned in the front housing, through the rear housing, and the armature positioned in the front housing at the other side of the clutch mechanism and adapted to be attracted in the axial direction, when the coil of the electromagnet is energized, to push the clutch mechanism. Moreover, the front housing to be contacted by the clutch mechanism and the armature is made of a non-magnetic material. As a result, the magnetic flux establishing the magnetic path is hard to leak from the front housing so that it will not reduce the magnetic flux density. As a result, the working efficiency of the electromagnetic control means for the clutch mechanism can be improved over that of the driving force transmission system of this kind of the prior art.

According to the driving force transmission system of the invention, the front housing is made of an aluminum alloy so that the first rotary member can be lightened to reduce the weight of the driving force transmission system itself.

According to the driving force transmission system of the invention, the nut members are so screwed on the rear end portion of the rear housing as to move forward and backward thereby to fasten the front housing from the rear end side. As a result, it is possible to eliminate the chattering, as might otherwise be caused by the screwing between the front housing and the rear housing, and to retain the air gap to be formed by the electromagnet, always at a constant value. As a result, the fluctuation, as might otherwise be caused by the fluctuation in the air gap, is eliminated to eliminate the fluctuation in the attraction for the armature. In the clutch mechanism, therefore, the frictional applying force is stabilized to improve the control performance of the electromagnetic type control means for the clutch mechanism.

The driving force transmission system of the invention is equipped, between the two rotary members, with the main clutch for transmitting, when frictionally applied, the torque between the two rotary members, the electromagnetic type pilot clutch to be frictionally applied when energized, and the cam mechanism interposed between the main clutch and the pilot clutch for converting the frictional applying force for the pilot clutch into the force for pushing the main clutch. As a result, the fictional applying force for the pilot clutch can be smoothly amplified and transmitted to the main clutch through the cam mechanism. As a result, the main clutch can be sufficiently applied frictionally to increase the transmission torque between the two rotary members thereby to improve the driving power transmitting characteristics of the driving force transmission system.

According to the driving force transmission system of the invention, when a coil composing the pilot mechanism is inactive, the armature is inactive to activate neither the two cam mechanisms nor the clutch mechanism so that no torque transmission is performed between the first rotary member and the second rotary member.

When the coil composing the pilot mechanism is energized, on the other hand, it attaches and moves the armature in the axial direction. This moving force is converted by the first cam mechanism into a rotational force, which is converted by the second cam mechanism into a force for urging the clutch mechanism in the axial direction. As a result, the clutch mechanism is frictionally applied to transmit the torque between the first and second rotary members. In this case, the frictional applying force for the clutch mechanism rises in proportion to the flow of an electric current to be fed to the coil, so that the torque to be transmitted between the first and second rotary members rises in proportion to the increase in the flow of the current to be fed to the coil.

Here, the driving force transmission system is constructed such that the force for moving the armature composing the pilot mechanism in the axial direction is converted by the first cam mechanism into a rotational force, and such that this rotational force is converted by the second cam mechanism into a force for urging the clutch mechanism in the axial direction. This makes it unnecessary for the pilot mechanism to generate the frictional applying force. As a result, there can be adopted a pilot mechanism which is composed of the coil and the armature to be attracted, when the coil is energized, to move in the axial direction but is not equipped with the frictional clutch. As a result, it is possible to prevent the noises or vibration in the pilot mechanism.

In the driving force transmission system, on the other hand, the moving direction of the armature is always in the same axial direction no matter whether the directions of the relative rotations of the first rotary member and the second rotary member might be forward or backward. As a result, the action directions of the first cam mechanism and the second cam mechanism are unchanged so that the increase in the chattering of those cams in the rotational direction can be suppressed.

According to the driving force transmission system of the invention, the pilot mechanism is constructed of the coil and the armature to be attracted, when the coil is energized, to move in the axial direction. The armature is made to act as a first cam member of the first cam mechanism, whereas a second cam member of the first cam mechanism is made to act as the first cam member of the second cam mechanism. As a result, all the mechanisms including the pilot mechanism, the first cam mechanism and the second cam mechanism can be made compact to reduce the size of the driving force transmission system.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
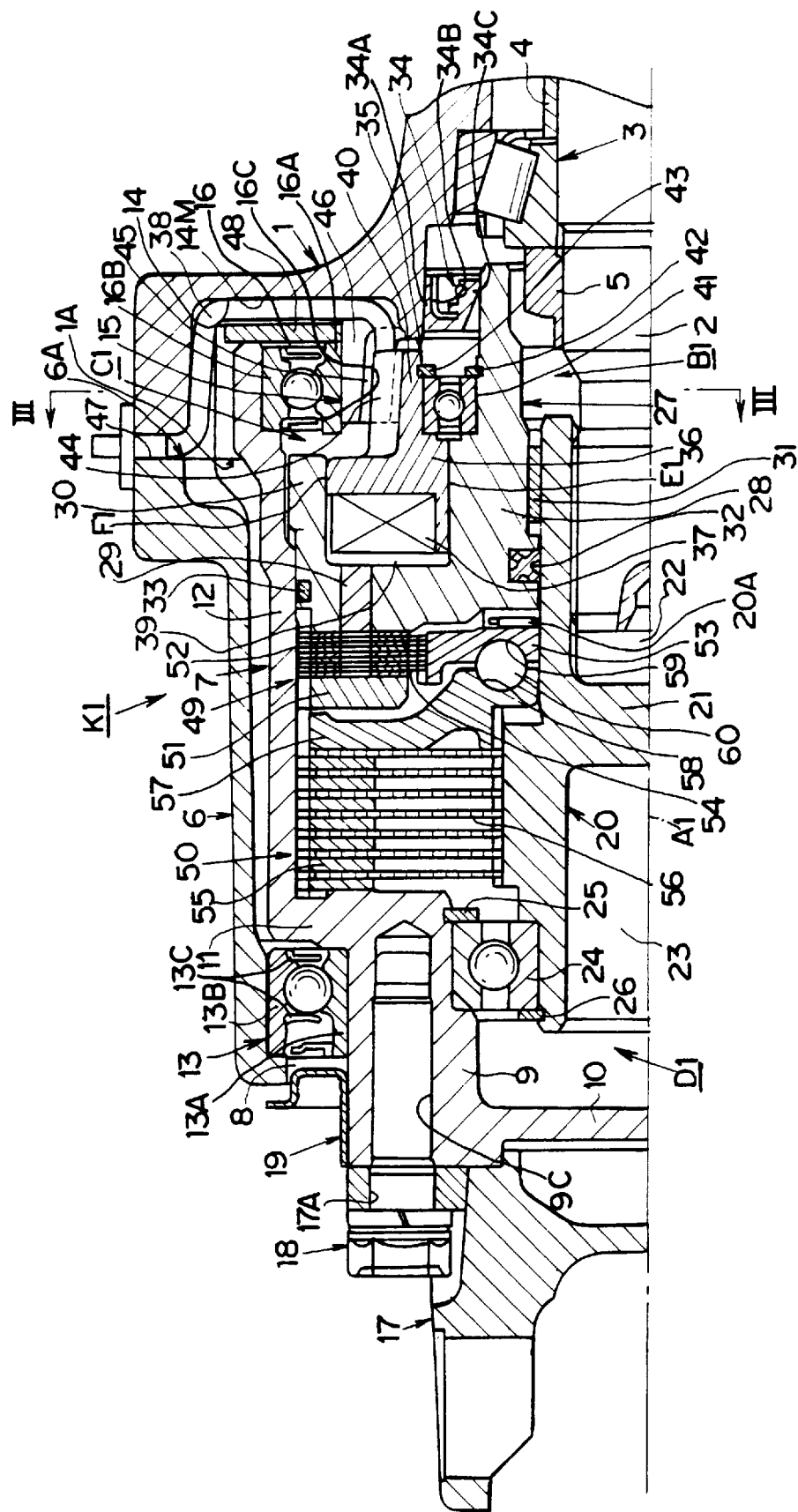
FIG. 1 is a sectional front elevation showing one half of a driving force transmission system of the invention.
Figure 2:
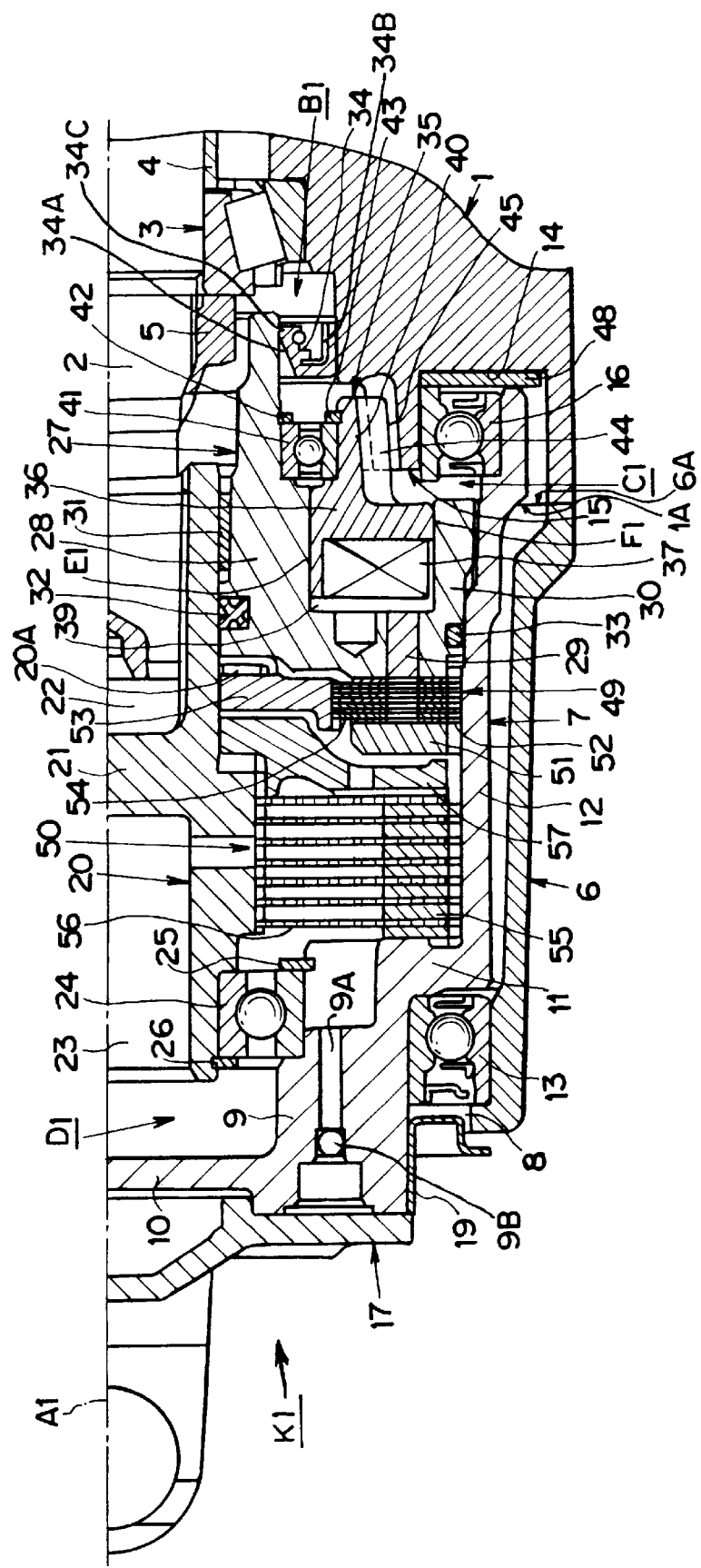
FIG. 2 is a sectional front elevation showing the other half of the driving force transmission system of the invention.

The invention will be described in detail in connection with its embodiments with reference to the accompanying drawings. FIGS. 1 and 2 are sectional front elevations showing the halves of a driving force transmission system K1 which is mounted on a standby four-wheel drive vehicle. This driving force transmission system K1 is arranged between a propeller shaft and a differential. Reference numeral 1 appealing in FIGS. 1 and 2 designates a differential carrier which is irrotationally fixed. In this differential carrier 1, there is arranged a drive pinion shaft 2 which is to be rotated on an axis A1. In the inner circumference of the differential carrier 1, there is fitted a bearing 3, by which the drive pinion shaft 2 is rotatably supported.

To the drive pinion shaft 2, there are attached a sleeve 4 and a nut 5 which are located at the two sides of the bearing 3 in the direction of the axis A1. The bearing 3 is clamped by the sleeve 4 and the nut 5 so that the drive pinion shaft 2 and the differential carrier 1 are positioned in the direction of the axis A1. Here in the differential carrier 1, there is arranged the differential which is constructed of the well-known gear train.

On the open end of the differential carrier 1, on the other hand, there is fixed a cylindrical cover 6 which is centered by the axis A1. From the outside of the cover 6 to the inside of the cover 6 and to the inside of the differential carrier 1, moreover, there is arranged a bottomed cylindrical coupling case 7. This coupling case 7 is made of a non-magnetic material such as an aluminum alloy. The coupling case 7 is formed of a diametrically smaller cylindrical portion 9, a bottom portion 10, an annular joint portion 11 and a diametrically larger cylindrical portion 12.

The diametrically smaller cylindrical portion 9 is arranged in an opening 8 of the cover 6, and the outer end portion of the cover 6 in the diametrically smaller cylindrical portion 9 is closed by the bottom portion 10. The annular joint portion 11 is extended to the outer circumferential side from the inner side end portion of the cover 6 in the diametrically smaller cylindrical portion 9. The diametrically larger cylindrical portion 12 is arranged toward the inner side of the differential carrier 1 from the outer circumferential end of the joint portion 11.

In the diametrically smaller cylindrical portion 9, there is formed an oil inlet 9A which extends therethrough in the direction of the axis A1. This oil inlet 9A is provided for pouring the oil into the (later-described) coupling oil chamber and is sealed liquid-tight by press-fitting a ball 9B in the oil inlet 9A after pouring the oil. Moreover, the oil inlet 9A is caulked at its entrance so that the ball 9B is prevented from coming out of the oil inlet 9A by the pressure in the coupling oil chamber. Here, the outer end face of the diametrically smaller cylindrical portion 9 is internally threaded at 9C in its four portions on a circumference on the axis A1.

In the inner circumference of the end portion at the side of the opening 8 of the cover 6, there is fixed a seal bearing 13. This seal bearing 13 is given the well-known structure in which a seal member 13C is fitted between an inner race 13A and an outer race 13B. At the end face 14 of the differential carrier 1 at the side of the cover 6, on the other hand, there is formed a cylindrical portion 15 which is protruded on the axis A1 toward the cover 6. On the outer circumference of the cylindrical portion 15, there is fixed a seal bearing 16. This seal bearing 16 is given the well-known construction in which a seal member 16c is fitted between an inner race 16A and an outer race 16B so as to seal these races.

On the other hand, the seal bearings 13 and 16 are filled therein with lubricating grease. Moreover, the inner race 13A of the seal bearing 13 is mounted on the outer circumference of the diametrically smaller cylindrical portion 9 of the coupling case 7, and the outer race 16B of the seal bearing 16 is mounted in the inner circumference of the end portion of the diametrically larger cylindrical portion 12 at the side of the differential carrier 1. In short, the coupling case 7 is so supported by the seal bearings 13 and 16 as to rotate on the axis A1.

On the end face of the diametrically smaller cylindrical portion 9 of the coupling case 7 at the outer side of the cover 6, on the other hand, there is fitted a flange 17. In this flange 17, there are formed four holes 17A on a circumference on the axis A1. Moreover, bolts 18 are inserted into the individual holes 17A and are driven into the internally threaded portions 9C to fix the diametrically smaller cylindrical portion 9 and the flange 17. This flange 17 is jointed to the (not-shown) propeller shaft. On the outer circumference of the diametrically smaller cylindrical portion 9, there is fitted a cylindrical dust deflector 19 for preventing the dust from coming from the outside. On the other hand, the opening 8 is sealed by the seal bearing 13.

In the cover 6, there is arranged a shaft 20 which is rotated on the axis A1. In this shaft 20, there are formed recesses 22 and 23 which are defined in the direction of the axis A1 by a partition 21. These recesses 22 and 23 are column-shaped spaces on the axis A1. In the inner circumference of the recess 22 arranged at the side of the differential carrier 1, moreover, there is splined the leading end of the drive pinion shaft 2.

On the other hand, the axial length of the shaft 20 is set to such a value that it extends from the open end of the differential carrier 1 to the inside of the diametrically smaller cylindrical portion 9 of the coupling case 7. Between the inner circumference of the diametrically smaller cylindrical portion 9 and the outer circumference of the end portion of the shaft 20 at the side of the diametrically smaller cylindrical portion 9, moreover, there is mounted a bearing 24 which supports the shaft 20 rotatably. Moreover, the bearing 24 is clamped between a snap ring 25 mounted in the inner circumference of the diametrically smaller cylindrical portion 9 and a snap ring 26 mounted in the outer circumference of the shaft 20 thereby to position the shaft 20 and the coupling case 7 in the axial direction.

Around the shaft 20, there is arranged an annular rotor 27. This rotor 27 is given an axial length to reach the inside of the differential carrier 1 from the inside of the coupling case 7. The rotor 27 can rotate on the axis A1 and is composed of: an inner cylindrical portion 28 having a generally L-shaped radial section; an annular shielding member 29 fixed on the outer circumference of the inner cylindrical portion 28; and an outer cylindrical portion 30 fixed on the outer circumference of the shielding member 29.

The inner cylindrical portion 28 and the outer cylindrical portion 30 are made of a magnetic material such as iron, and the shielding member 29 is made of a non-magnetic material such as stainless steel. Moreover, the outer cylindrical portion 30 of the rotor 27 is screwed into the inner circumference of the coupling case 7 and is irrotationally fixed by the welding. In other words, the rotor 27 is screwed in the rear end opening of the coupling case 7 thereby to cover the opening. As a result, the coupling case 7 and the rotor 27 are integrally rotated.

In the inner circumference of the inner cylindrical portion 28 of the rotor 27, on the other hand, there is fitted a metallic bushing 31. This bushing 31 supports the shaft 20 so that the rotor 27 and the shaft 20 can rotate relative to each other. Between the inner circumference of the inner cylindrical portion 28 and the outer circumference of the shaft 20, moreover, there is mounted an X-ring 32 which is made of a rubber elastomer. By this X-ring 32, a liquid-tight seal is established between the shaft 20 and the rotor 27. Between the outer circumference of the outer cylindrical portion 30 and the inner circumference of the coupling case 7, moreover, there is mounted an O-ring 33 which is made of a rubber elastomer. By this O-ring 33, a liquid-tight seal is established between the rotor 27 and the coupling case 7.

Between the bearing 3 and the cylindrical portion 15 in the inner circumference of the differential carrier 1, still moreover, there is mounted an oil seal 34, which is composed of an annular seal body 34A and a reinforcing metal ring 34B embedded in the seal body 34A. A single seal hip 34C is formed at the inner circumference side of the seal body 34A. By this oil seal 34, a liquid-tight seal is established between the differential carrier 1 and the rotor 27. In the differential carrier 1, moreover, there is formed a differential oil chamber B1 which is sealed liquid-tight by the X-ring 32 and the oil seal 34. The drive pinion shaft 2 is arranged in the differential oil chamber B1.

On the other hand, the space, as defined by the differential carrier 1, the cover 6, the coupling case 7 and the rotor 27, is sealed liquid-right and gas-tight from the surrounding space by the oil seal 34, the O-ring 33 and the seal bearing 13, thereby to form an electromagnet housing chamber C1. Moreover, the space, as defined by the coupling case 7, the shaft 20 and the rotor 27, is sealed liquid-tight from the surrounding space by the O-ring 33 and the X-ring 32 thereby to form a coupling oil chamber D1.

In the electromagnet housing chamber C1, there is arranged an electromagnet 35. This electromagnet 35 is equipped with an annular iron core 36 made of a magnetic material, a coil 37 wound on the iron core 36, and an electric wire 38 for feeding electric current to the coil 37. Between the inner cylindrical portion 28 and the outer cylindrical portion 30 of the rotor 27, there is formed an annular recess 39. The electromagnet 35 is arranged in this recess 39.

Between a cylindrical portion 40 formed integrally with the iron core 36 at the side of the differential carrier 1 and the inner cylindrical portion 28 of the rotor 27, moreover, there is mounted a (radial) bearing 41 so that the electromagnet 35 and the rotor 27 can rotate relative to each other. Moreover, the electromagnet 35 and the rotor 27 are positioned in the axial direction and in the radial direction by the bearing 41, by a snap ring 42 mounted on the inner cylindrical portion 28 and by a snap ring 43 mounted on the iron core 36. Thus, an (air) gap E1 between the inner circumference of the iron core 36 and the inner cylindrical portion 28 and an (air) gap F1 between the outer circumference of the iron core 36 and the outer cylindrical portion 30 are set by the single bearing 41.

Figure 3:
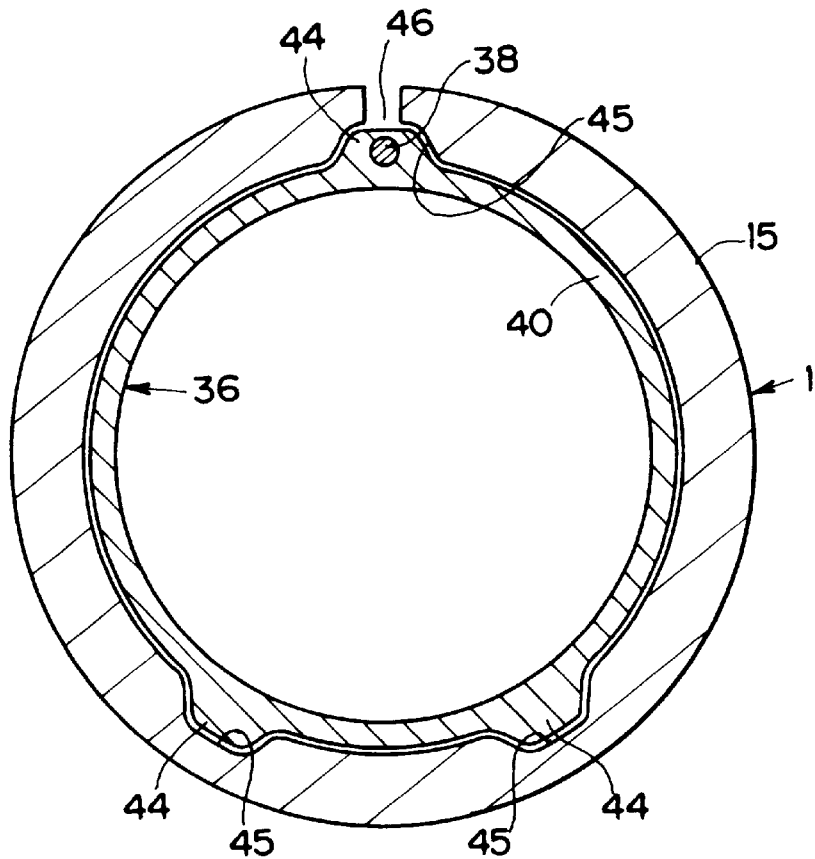
FIG. 3 is a side section taken along line III—III of FIG. 1 and shows a construction of a cylindrical portion of an electromagnet and a cylindrical portion of a casing.

On the other hand, the electromagnet 35 and the differential carrier 1 are so jointed to each other by a rotation stopping mechanism that they cannot rotate relative to each other. This rotation stopping mechanism will be described with reference to FIG. 3. FIG. 3 presents a radial section showing the cylindrical portion 40 of the iron core 36 and the cylindrical portion 15 of the differential carrier 1. On the outer circumference of the cylindrical portion 40 of the iron core 36, there are formed a plurality of ridges 44 which are protruded outward. Moreover, the electric wire 38 is buried in one of the ridges 44.

In the inner circumference of the cylindrical portion 15 of the differential carrier 1, on the other hand, there are formed a plurality of grooves 45 which are positioned to correspond to the ridges 44. Moreover, the cylindrical portion 40 of the iron core 36 is arranged in the cylindrical portion 15 of the differential carrier 1 so that the ridges 44 are individually fitted in the grooves 45. These engaging forces between the ridges 44 and the grooves 45 prevent the relative rotations between the differential carrier 1 and the electromagnet 35. Here, the ridges 44 and the grooves 45 may be individually provided by at least one. These cylindrical portion 15, ridges 44 and grooves 45 are arranged to face an opening 6A of the cover 6 and an opening 1A of the differential carrier 1.

Thus, the rotation stopping mechanism for preventing the relative rotation between the differential carrier 1 and the electromagnet 35 is arranged radially outside of the bearing 41 on the axis A1, and the seal bearing 16 is arranged radially outside of the rotation stopping mechanism. In the cylindrical portion 15, there is formed a cut-off portion 46 for providing the communication between one groove 45 and the outer circumference of the cylindrical portion 15. This cut-off portion 46 is provided for passing the electric wire 38 when the cylindrical portion 40 of the electromagnet 35 is inserted into the cylindrical portion 15 of the differential carrier 1.

In the end face 14 of the differential carrier 1 at the side of the cover 6, there is formed a groove 14M, along which the electric wire 38 is arranged. This electric wire 38 is guided through a through groove 47, as formed in the abutting faces of the differential carrier 1 and the cover 6, to the outside of the differential carrier 1 and the cover 6 to be connected with a not-shown power source. An annular shim 48 is fitted on the outer circumference of the cylindrical portion 15 of the differential carrier 1, and the seal bearing 16 is made to abut against the end face of the shim 48. Moreover, the electric wire 38, as threaded in the groove 14, is held by the shim 48 so that it is fixed.

In the coupling oil chamber D1, there are arranged a pilot clutch 49 to be applied/released by the electromagnetic force of the electromagnet 35, and a main clutch 50 to be applied in association with the application of the pilot clutch 49 to transmit the torque of the coupling case 7 to the shaft 20.

The pilot clutch 49 is equipped with an armature 51, a plurality of clutch discs 52 and a plurality of clutch plates 54. The armature 51 is arranged at a predetermined spacing from the rotor 27. On the other hand, the clutch discs 52 are arranged between the armature 51 and the rotor 27. Moreover, the clutch discs 52 and the clutch plates 54 are arranged alternately of each other. The outer circumferences of these armature 51 and clutch discs 52 are splined in the inner circumference of the coupling case 7.

On the other hand, an annular cam 53 is mounted on the outer circumference of the shaft 20, and the inner circumference of the clutch plate 54 is splined on the outer circumference of the cam 53. The annular cam 53 and the shaft 20 are constructed to rotate relative to each other. Between the cam 53 and the inner cylindrical portion 28 of the rotor 27, on the other hand, there is arranged a thrust bearing 20A. This thrust bearing 20A is provided for bearing a thrust load to act on the cam 53 and for keeping the rotor 27 and the cam 53 rotatable relative to each other.

On the other hand, the main clutch 50 is arranged between the pilot clutch 49 and the diametrically smaller cylindrical portion 9 of the coupling case 7. This main clutch 50 is equipped with a plurality of clutch discs 55 and a plurality of clutch plates 56 arranged alternately of the clutch discs 55. The outer circumferences of the clutch discs 55 are splined in the inner circumference of the coupling case 7, and the inner circumferences of the clutch plates 56 are splined in the outer circumference of the shaft 20.

Figure 4:
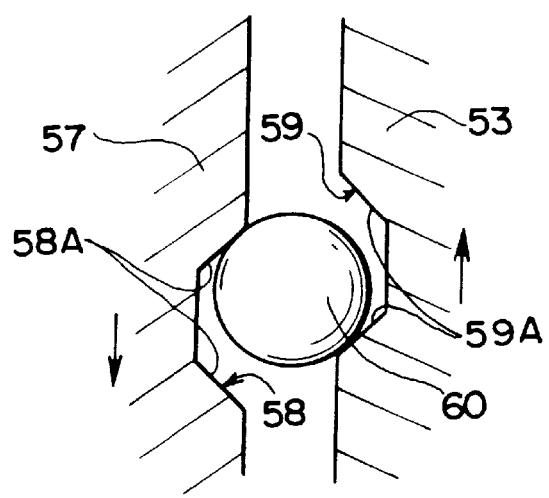
FIG. 4 is a section showing a portion of a construction a cam, ball and a piston to be applied for applying a main clutch shown in FIGS. 1 and 2.

Between the main clutch 50 and the pilot clutch 49, moreover, there is arranged an annular piston 57. This piston 57 is splined in the outer circumference of the shaft 20. As shown in FIG. 4, grooves 58 and 59 having trapezoidal sections are formed in the confronting faces of the piston 57 and the cam 53. Oppositely sloped pressure receiving faces 58A and 59A are formed in the grooves 58 and 59, respectively. Balls 60 are arranged in the grooves 58 and 59.

The coupling oil chamber D1 is filled with the coupling oil which is characterized to keep satisfactory the wear resistance, the oil cut and the judder resistance of the clutch discs 52 and 55 and the clutch plates 54 and 56. This coupling oil is prepared by adding various kinds of additives to mineral lubricating oil. On the other hand, the differential oil chamber B1 is filled with the lubricating oil which is characterized to have little viscosity change due to the temperature, a low fluid point, an excellent heat resistance, an excellent oxidation stability and an excellent load resistance. This lubricating oil is exemplified by lubricating mineral oil.

Here will be described the correspondence between the construction of the driving force transmission system K1 and the invention. Specifically, the differential carrier 1 and the cover 6 correspond to a stationary member of the invention, and the coupling case 7 and the rotor 27 correspond to a first rotary member of the invention. On the other hand; the shaft 20 and the drive pinion shaft 2 correspond to a second rotary member of the invention; the pilot clutch 49 and the main clutch 50 correspond to a clutch mechanism of the invention; and the outer cylindrical portion 30 and the inner cylindrical portion 28 correspond to a magnetic member of the invention. On the other hand, the rotor 27, the armature 51 and the electromagnet 35 correspond to electromagnetic control means of the invention. On the other hand, the cam 53, the piston 57 and the balls 60 correspond to a cam mechanism of the invention.

Moreover, the cylindrical portion 15 of the differential carrier 1, the grooves 45 formed in the cylindrical portion 15, the cylindrical portion 40 of the iron core 36 and the ridges 44 formed on the cylindrical portion 40 correspond to a rotation stopping mechanism or a positioning mechanism of the invention. On the other hand, the bearing 41 corresponds to a first bearing of the invention, and the seal bearing 16 corresponds to a second bearing of the invention. On the other hand, the seal bearing 13 corresponds to a third bearing of the invention.

On the other hand, the differential carrier 1, the cover 6, the coupling case 7, the O-ring 33, the oil seal 34, the seal bearings 13 and 16, the rotor 27, the shaft 20 and the X-ring 32 correspond to an isolating mechanism of the invention, and the coupling oil chamber D1 corresponds to a clutch housing chamber of the invention.

Moreover, the coupling 7, the pilot clutch 49, the main clutch 50 and the electromagnet 35 thus integrally assembled construct one unit.

Here will be described the actions of the driving force transmission system K1 having the construction thus far described. At first, when no electric current is fed to the electromagnet 35, the pilot clutch 49 and the main clutch 50 are released. As a result, the torque, as transmitted from the not-shown propeller shaft to the coupling case 7, is not transmitted to the shaft 20 and the drive pinion shaft 2.

When the electric current is fed to the electromagnet 35, on the other hand, the magnetic flux passes through the iron core 36, the outer cylindrical portion 30, the armature 51 and the inner cylindrical portion 28 to establish a magnetic circuit. As a result, the armature 51 is moved toward the outer cylindrical portion 30 and the inner cylindrical portion 28 by the electromagnetic force (or the magnetic attraction). Then, the clutch discs 52 and the clutch plates 54 are applied. As a result, the torque of the coupling case 7 is transmitted through the pilot clutch 49 to the cam 53.

When the torque is transmitted to the cam 53, the cam 53 and the piston 57 are rotated relative to each other in the direction of arrow, as shown in FIG. 4. Then, the balls 60 are pushed onto the pressure receiving faces 58a and 59A, as sloped in the same direction, so that the force acts for the pressure receiving faces 58A and 59A to push the balls 60 out of the grooves 58 and 59. As a result, there is established a thrust load which is directed to move the cam 53 and the piston 57 away from each other in the direction of the axis A1.

Here, the cam 53 is received by the thrust bearing 20A so that it is prevented from moving toward the rotor 27. As a result, the piston 57 is pushed toward the main clutch 50 by the thrust load thereby to apply the clutch discs 55 and the clutch plates 56. In other words, the applying force of the pilot clutch 49 is amplified by the cam 53, the balls 60 and the piston 57 and is transmitted to the main clutch 50. When the main clutch 50 is applied, the torque of the coupling case 7 is transmitted through the main clutch 50 to the shaft 20 and the drive pinion shaft 2. Here, the main clutch 50 and the pilot clutch 49 are cooled, when applied to generate heat, with the oil which is confined in the coupling oil chamber D1.

According to the driving force transmission system K1, moreover, the gaps E1 and F1 are set by the bearing 41 or the single component which is mounted between the inner cylindrical portion 28 and the electromagnet 35. Here, the bearing 41 or the radial bearing is intrinsically given a sizing accuracy capable of accurately setting the relative positions of the member to be mounted and the support member in the radial direction. As a result, the setting accuracy of the gaps E1 and F1 is improved as much as possible.

It is, therefore, easy to control the applying force (or the torque capacity) between the clutch discs 52 and the clutch plates 54. As a result, it is easy to control the applying force (or the torque capacity) between the clutch discs 55 and the clutch plates 56. In short, the function to transmit the driving force to be transmitted from the coupling case 7 to the shaft 20 is improved.

On the other hand, the components such as the bearing 41, the rotation stopping mechanism and the seal bearing 16 are arranged in substantially identical positions in the direction of the axis A1 and with overlaps in the radial direction. As a result, the space for arranging those components in the axial direction can be reduced as much as possible to reduce the size of the driving force transmission system K1 in the direction of the axis A1. Here, it is possible to adopt a construction in which the bearing 41, the rotation stopping mechanism and the seal bearing 16 are partially overlapped in the axial direction.

In this embodiment, moreover, one axial end of the coupling case 7 is supported by the seal bearing 16, and the other axial end of the coupling case 7 is supported by the seal bearing 13. As a result, the coupling case 7 is highly accurately positioned in the radial direction thereby to suppress the vibration of the coupling case 7 and the noise (or the booming noise) to be caused by the vibration.

Moreover, the rotation stopping mechanism for preventing the relative rotation between the electromagnet 35 and the differential carrier 1 is equipped with the ridges 44 formed on the electromagnet 35 itself and the grooves 45 formed in the differential carrier 1 itself, and establishes the rotation stopping function by the engaging forces between the ridges 44 and the grooves 45.

Here will be described the works of assembling the unit in the differential carrier 1. Specifically, the electromagnet 35 and the differential carrier 1 are moved relative to each other in the axial direction to insert the cylindrical portion 40 of the electromagnet 35 into the cylindrical portion 15 of the differential carrier 1. By these simple works, it is possible to stop the rotation of the electromagnet 35 and the differential carrier 1. As a result, the driving force transmission system K1 can be assembled easily and promptly.

In order to prevent the relative rotation between the electromagnet 35 and the differential carrier 1, on the other hand, no other part need be attached to reduce the number of parts of the driving force transmission system K1. As a result, the assembling works of the driving force transmission system K1 can be further improved to reduce the weight of the driving force transmission system K1.

On the other hand, the electromagnet housing chamber C1 and its surrounding space are sealed fluid-tight (i.e., liquid-tight and gas-tight) by the differential carrier 1, the cover 6, the coupling case 7, the oil seal 34, the O-ring 33 and the seal bearing 13. Moreover, the electromagnet 35 and the gaps E1 and F1 are arranged in the electromagnet housing chamber C1. This arrangement suppresses the entrance of a foreign substance such as the differential oil confined in the differential oil chamber B1 or the wear powder, as produced by the meshing engagement of the gears, into the electromagnet housing chamber C1.

By the O-ring 33, on the other hand, the coupling oil, as confined in the coupling oil chamber D1, is prevented from entering the electromagnet housing chamber C1. By the seal bearing 13, moreover, the water or the foreign substance outside of the differential carrier 1 is prevented from entering the electromagnet housing chamber C1. Still moreover, the lubricating grease, as confined in the seal bearing 13 and the seal bearing 16, is prevented from entering the electromagnet housing chamber C1.

As a result, only the air is present in the gaps E1 and F1, which are formed between the iron core 36 of the electromagnet 35 and the outer cylindrical portion 30 and the inner cylindrical portion 28 of the rotor 27, and it is possible to prevent the water, oil or foreign substance from entering the (air) gaps E1 and F1. As a result, the magnetic permeabilities of the gaps E1 and F1 can be kept homogeneous to stabilize the magnetic attraction to be established by the electromagnet 35. In other words, the relation between the current to be fed to the electromagnet 35 and the applying force of the pilot clutch 49 is stabilized. As a result, the applying force of the main clutch 50 is easily controlled to improve the driving force transmitting performance of the driving force transmission system K1.

In this embodiment, moreover, the coupling oil chamber D1 and the differential oil chamber B1 are sealed liquid-tight. On the other hand, the electromagnet housing chamber C1 is an air chamber, and the through groove 47 is formed in a position to face the electromagnet housing chamber C1. The electric wire 38 is inserted into the through groove 47. As a result, the oil has no possibility to leak out of the through groove 47 so that no special seal mechanism need be provided in the through groove 47. As a result, the assembly of the differential carrier 1 and the cover 6 is simplified to improve the workability.

Since no seal is required for the through groove 47, on the other hand, the through groove 47 can be formed in the abutting faces between the differential carrier 1 and the cover 6. As a result, when the electromagnet 35 is to be fitted in the differential carrier 1 and the cover 6, it is sufficient to form the through hole 47 which is sized to admit the electric wire 38. In other words, a through hole as large as to admit the (not-shown) socket mounted on the leading end of the electric wire 38 need not be formed for the differential carrier 1 or the cover 6, so that the facility of design in space is improved.

In this embodiment, on the other hand, the coupling oil chamber D1, as sealed liquid-tight by the O-ring 33 and the X-ring 32, is formed in the coupling case 7. Moreover, the pilot clutch 49 and the main clutch 50 are arranged in the coupling oil chamber D1. On the other hand, the coupling oil chamber D1 is filled with the coupling oil. Here, the X-ring 32 is excellent in the pressure resistance because of its structure. This suppresses the entrance of the coupling oil of the coupling oil chamber D1 into the differential oil chamber B1 and the entrance of the differential oil of the differential oil chamber B1 into the coupling oil chamber D1.

As a result, it is possible to separately select and fill the oil matching the characteristics demanded by the coupling oil chamber D1 and the oil matching the characteristics and performance demanded by the differential oil chamber B1. Specifically, the coupling oil chamber D1 is filled with the coupling oil which is characterized to keep satisfactory the wear resistance, the oil cut and the judder resistance of the clutch plates and discs composing the pilot clutch 49 and the main clutch 50. This coupling oil is prepared by adding various additives to lubricating mineral oil. On the other hand, the differential oil chamber B1 is filled with the lubricating oil which has little viscosity change due to the temperature, a low fluid point, an excellent heat resistance, an excellent oxidation stability and an excellent load resistance. This lubricating oil is exemplified by lubricating mineral oil.

Moreover, the place for mounting the driving force transmission system K1 is located in the transmission, between the propeller shaft and the differential or on the transfer of a four-wheel drive vehicle. No matter what place the driving force transmission system K1 might be mounted on, the coupling oil matching the characteristics or performance of the pilot clutch 49 or the main clutch 50 can be selected independently of the matching with the function and characteristics demanded for the remaining power transmission system and its components. As a result, the degree of freedom for the mounting position and layout of the driving force transmission system K1 is increased.

In this embodiment, on the other hand, there is formed the single unit which is equipped with the coupling case 7, the pilot clutch 49 and the main clutch 50. Moreover, the torque transmission characteristics such as the wear resistance, the oil cut and the judder resistance of the pilot clutch 49 or the main clutch 50 can be managed or evaluated by the single unit. In the vehicle manufacturing process, therefore, the performance is easily managed at the unit before the step at which the driving force transmission system K1 is mounted on the vehicle.

Moreover, the shaft 20 and the rotor 27 are sealed liquid-tight by the X-ring 32. As a result, the foreign substance such as the wear powder, as produced at the side of the differential oil chamber B1, is prevented from entering the coupling oil chamber D1. As a result, no foreign substance will possibly enter the clearances between the clutch discs 52 and the clutch plates 54 of the pilot clutch 49 or between the clutch discs 55 and the clutch plates 56 of the main clutch 50. As a result, the applying/releasing actions of the pilot clutch 49 and the main clutch 50 are stabilized while preventing the wear or damage of the clutch discs and plates to improve the driving force transmitting function and the durability.

In the shaft 20, on the other hand, there is formed the recess 23 which is opened into the coupling oil chamber D1. This recess 23 increases the capacity of the coupling oil chamber D1. In other words, the coupling oil is accommodated by making use of the recess 23 of the shaft 20, as arranged in the coupling case 7. Without enlarging the size of the coupling case 7, therefore, the capacity for the coupling oil can be made as high as possible to improve the durability of the coupling oil.

Figure 5:
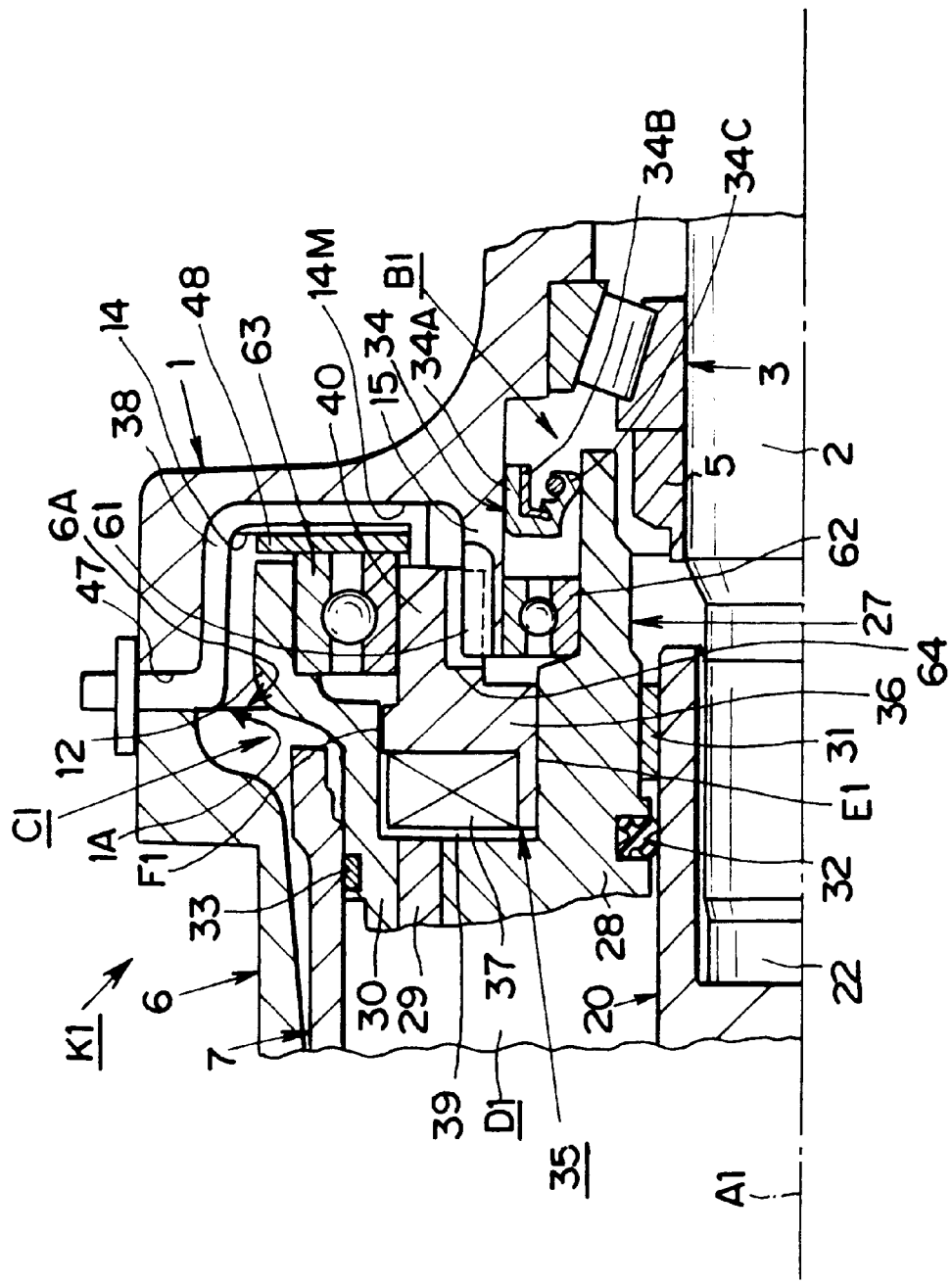
FIG. 5 is a sectional front elevation showing one half of another example of the construction of a rotation stopping mechanism and first and second bearings to be applied to the driving force transmission system of the invention.

FIG. 5 is a section showing a portion of another embodiment of the driving force transmission system K1. In FIG. 5, the support mechanism for the rotor 27 and the support mechanism for the electromagnet 35 are different from those of the embodiment of FIGS. 1 to 4. In FIG. 5, a plurality of ridges 61 are formed on the outer circumference of the cylindrical portion 15 which is formed in the differential carrier 1. On the inner circumference of the cylindrical portion 15, on the other hand, there is fixed a bearing 62 for supporting the rotor 27 rotatably.

In the inner circumference of the outer cylindrical portion 30, on the other hand, there is fixed a seal bearing 63 for supporting the electromagnet 35 rotatably. Moreover, this seal bearing 63 sets the gaps E1 and F1 between the iron core 36 of the electromagnet 35 and the inner cylindrical portion 28 and the outer cylindrical portion 30.

In the inner circumference of the cylindrical portion 40 of the iron core 36, moreover, there are formed a plurality of grooves 64 which are made to engage with the ridges 61. By these engagements between the grooves 64 and the ridges 61, the differential carrier 1 and the electromagnet 35 are stopped from their relative rotation. These ridges 61 and grooves 64 are arranged to face the openings 1A and 6A. Around the outer circumference of the bearing 62 on the axis A1, moreover, there are arranged the cylindrical portion 15, the ridges 61, the cylindrical portion 40 and the grooves 64. Around the outer circumference of the cylindrical portion 40 in the radial direction, on the other hand, there is arranged the seal bearing (of a radial bearing) 63. The remaining construction is similar to that of the embodiment of FIGS. 1 and 2.

Here will be described the correspondences between the construction of FIG. 5 and the invention. The seal bearing 63 corresponds to the first bearing of the invention; the cylindrical portion 15, the cylindrical portion 40, the ridges 61 and the grooves 64 correspond to the rotation stopping mechanism or the positioning mechanism of the invention; and the bearing 62 corresponds to the second bearing of the invention. Effects similar to those of the embodiment of FIGS. 1 and 2 are achieved in this embodiment of FIG. 5, too.

Here in the embodiments of FIGS. 1 to 5, there may be adopted a construction in which the electromagnet housing chamber C1 is filled with cooling oil. In this construction, the cooling oil is sealed by the seal bearing 16 so that it does not leak to the outside of the differential carrier 1 and the cover 6.

By the O-ring 33 and the oil seal 34, on the other hand, the electromagnet housing chamber C1, the differential oil chamber B1 and the coupling oil chamber D1 are sealed liquid-tight. As a result, the cooling oil, as filling the electromagnet housing chamber C1, will leak into neither the differential oil chamber B1 nor the coupling oil chamber D1. Moreover, the main clutch 50, the pilot clutch 49 and the electromagnet 35 are cooled with the cooling oil.

In the embodiments of FIGS. 1 to 5, moreover, the seal bearings 41 and 62 can be replaced by bearings having no seal. This is because the differential oil chamber B1 and the electromagnet housing chamber C1 are sealed liquid-tight by the oil seal 34 so that the oil, as filling the differential oil chamber B1, has no possibility of leaking into the electromagnet housing chamber C1.

Figure 6:
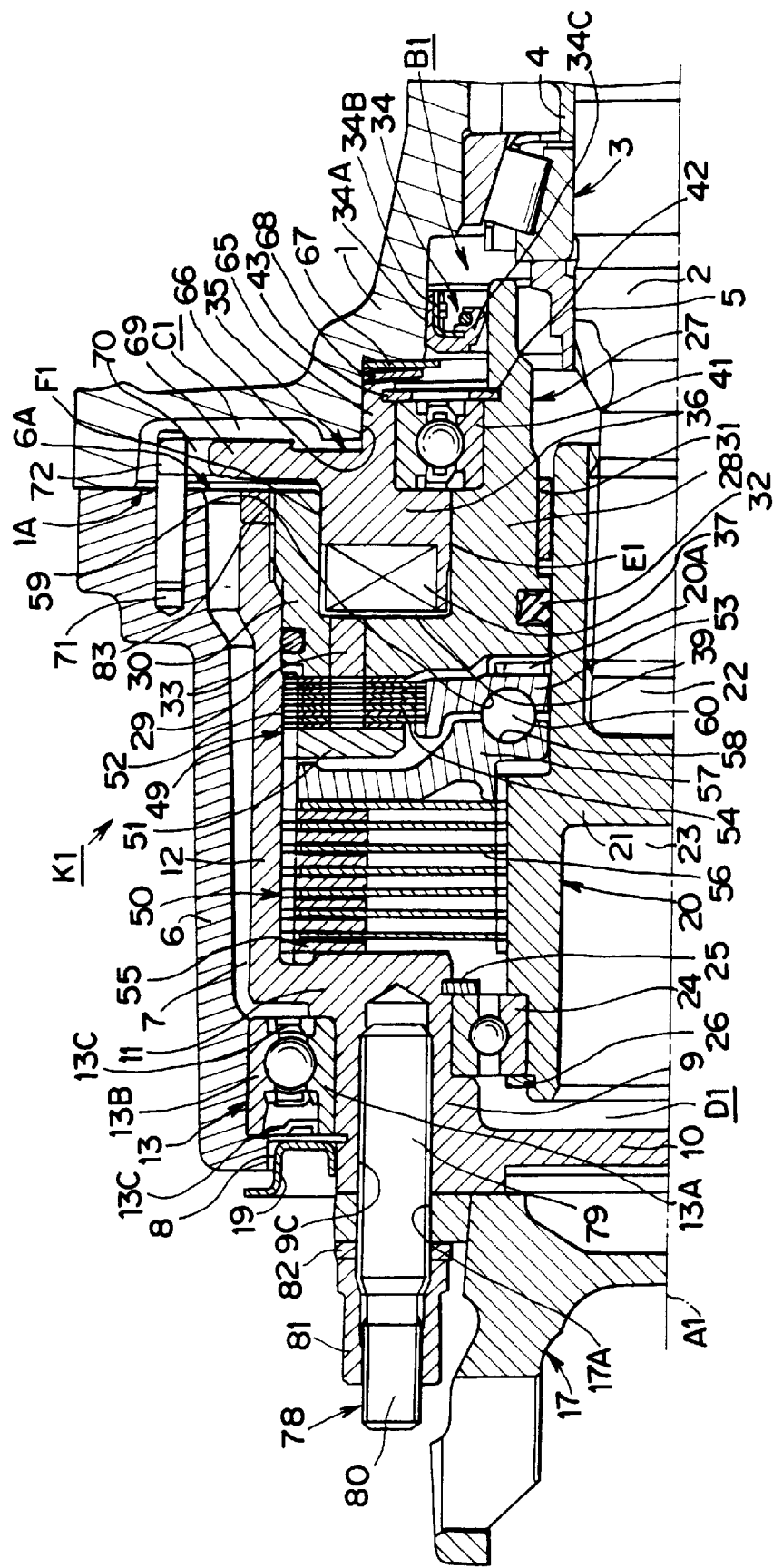
FIG. 6 is a sectional front elevation showing one half of a driving force transmission system according to still another embodiment of the invention.
Figure 7:
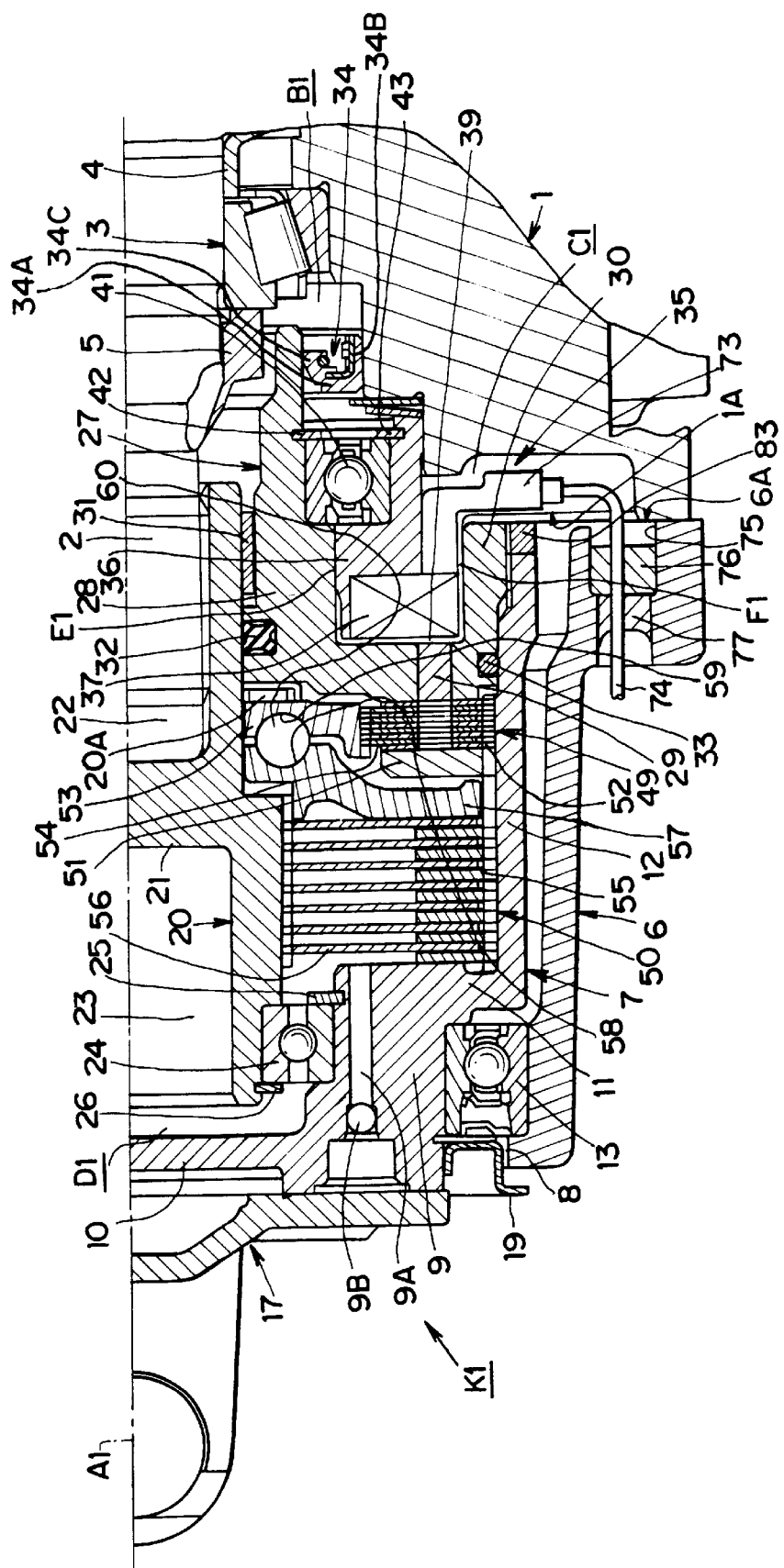
FIG. 7 is a sectional front elevation showing the other half of the driving force transmission system of FIG. 6.

FIGS. 6 and 7 are sectional front elevations showing the halves of the driving force transmission system K1. The embodiment of FIGS. 1 and 2 and the embodiment of FIGS. 6 and 7 are different, when compared, in the construction of the electromagnet, in the construction of the rotation stopping mechanism for the electromagnet, in the construction of the fixing mechanism for the coupling case and the flange, and in the joint mechanism for the coupling case and the rotor. Here will be specifically described those differences.

At first, a cylindrical portion 65 on the axis A1 is formed in the iron core 36 of the electromagnet 35, and the (radial) bearing 41 is fitted between the cylindrical portion 65 and the rotor 27. Moreover, the electromagnet 35 and the rotor 27 are positioned in the direction of the axis A1 by the bearing 41, the snap ring 42 fitted on the inner cylindrical portion 28, and the snap ring 43 fitted on the iron core 36.

In the inner circumference of the differential carrier 1, on the other hand, there is formed an annular recess 66 on the axis A1. The cylindrical portion 65 is fitted in the inner circumference of the recess 66. In short, a centering location is made of the recess 66 and the cylindrical portion 65. Moreover, the bearing 41 and the recess 66 are arranged to overlap in the radial direction. As a result, the iron core 36 is positioned in the radial direction by the recess 66 and the bearing 41. Thus, the gap E1 is set between the inner circumference of the iron core 36 and the inner cylindrical portion 28, and the gap F1 is set between the outer circumference of the iron core 36 and the outer cylindrical portion 30.

Between the end face of the recess 66 and the cylindrical portion 65, on the other hand, there are arranged an annular shim 67 and an annular disc spring 68. The iron core 36 is urged leftward, as shown in the Drawings, by the elastic force of the disc spring 68.

Figure 8:
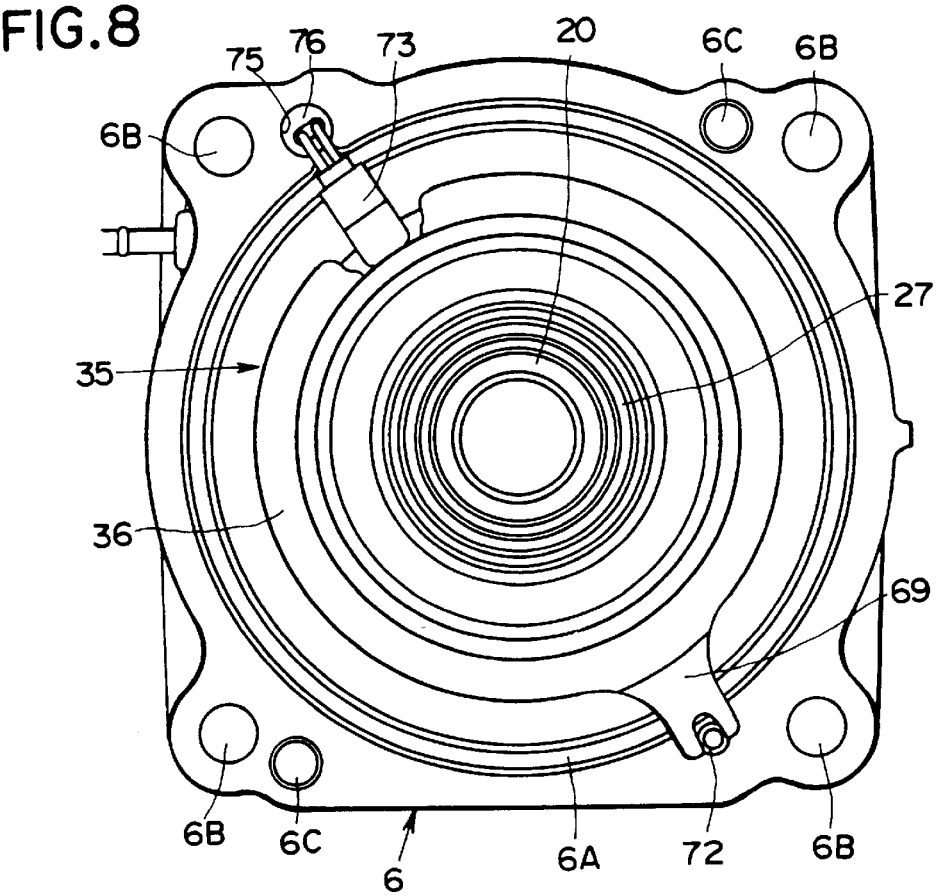
FIG. 8 is a righthand side elevation showing an essential portion of the driving force transmission system of FIG. 6, that is, a cover, an electromagnet, a shaft and a rotor.

FIG. 8 is a righthand end face showing the cover 6, the electromagnet 35 and the rotor 27. A protrusion 69 is formed on a portion of the outer circumference of the iron core 36, and a cut-off portion 70 is formed in the protrusion 69. In the abutting end face of the cover 6 against the differential carrier 1, on the other hand, there is formed a hole 71. In this hole 71, there is so fitted a rotation stopping pin 72 that its leading end is arranged in the cut-off portion 70.

The relative rotation between the cover 6 and the iron core 36 is prevented by the engagement between the rotation stopping pin 72 and the protrusion 69. In short, the hole 71, the rotation stopping pin 72, the protrusion 69 and the cut-off portion 70 construct the rotation stopping mechanism. In this embodiment, moreover, this rotation stopping mechanism is arranged to face the openings 1A and 6A.

In the outer circumference of the cover 6, moreover, there are formed a plurality of axial holes 6B. In the vicinity of the axial holes 6B, on the other hand, there are embedded a plurality of knock pins 6C. By inserting these knock pins 6C into the (not-shown) holes formed in the differential carrier 1, moreover, the cover 6 and the differential carrier 1 are positioned in the circumferential direction on the axis A1.

When the cover 6 and the differential carrier 1 are positioned in the circumferential direction on the axis A1, moreover, the axial holes 6B and a plurality of (not-shown) internal threads formed in the differential carrier 1 are arranged in positions to confront each other. Here, the (not-shown) bolts are individually inserted into the axial holes 6B and fastened to fix the cover 6 and the differential carrier 1.

With the coil 37 of the electromagnet 35, on the other hand, there is connected through a bobbin 73 an electric wire 74. This electric wire 74 is provided for feeding the electric current to the coil 37.

The bobbin 73 and the protrusion 69 are arranged, as shown in FIG. 8, in positions circumferentially different from that of the iron core 36. Specifically, the bobbin 73 and the protrusion 69 are arranged in positions of about 180 degrees.

In the cover 6, moreover, there is formed a hole 75, in which is fitted a grommet 76 attached to the electric wire 74. The hole 75 is arranged in a position of about 180 degrees with respect to the hole 71 in the circumferential direction of the cover 6. Here, an adhesive 77 is buried in the hole 75 outside of the grommet 76. Moreover, the relative positions between the bobbin 73 and the protrusion 69 and between the hole 71 and the hole 75 in the circumferential direction need not be spaced by 180 degrees.

Here will be described the fixing mechanism for the coupling case 7 and the flange 17. As shown in FIG. 6, the coupling case 7 and the flange 17 are fixed by stud bolts 78. Four stud bolts 78 are arranged in the circumferential direction. Each stud bolt 78 has an embedded side externally threaded portion 79 and a nut side externally threaded portion 80 in its longitudinal direction. Moreover, the embedded side externally threaded portion 79 is set to a larger external diameter than that of the nut side externally threaded portion 80.

The embedded side externally threaded portion 79 is embedded in the internally threaded portion 9C. By bringing the leading end of the embedded side externally threaded portion 79 into the bottom end of the internally threaded portion 9C, moreover, the stud bolts 78 and the diametrically smaller cylindrical portion 9 are positioned in the screwing direction.

The stud bolts 78 are inserted into holes 17A of the flange 17. Moreover, nuts 81 are screwed on the nut side externally threaded portions 80 and are fastened to fix the coupling case 7 and the flange 17 to each other. Here, a washer 82 is sandwiched between the flange 17 and the nut 81.

Here will be described the joint mechanism for the coupling case 7 and the rotor 27. On the outer circumference of the outer cylindrical portion 30, there is screwed a nut member 83. This nut member 83 and the coupling case 7 are held in abutment at their confronting faces. When the coupling case 7 is pushed lightward of the Drawings, a reaction responding to the load is established at the nut member 83. As a result, the movement of the rotor 27 relative to the coupling case 7 is suppressed by the looseness between the coupling case 7 and the rotor 27. As a result, the fluctuation of the transmission torque of the main clutch 50 and the pilot clutch 49 is suppressed by the load of the coupling case 7 in the axial direction. The remaining construction is similar to that of the embodiment of FIGS. 1 and 2.

Here will be described the correspondences between the construction of FIGS. 6 and 7 and the construction of the invention. Specifically, the differential carrier 1 and the cover 6 correspond to the casing or the stationary member of the invention, and coupling case 7 and the rotor 27 correspond to the first rotary member of the invention. Moreover: the shaft 20 and the drive pinion shaft 2 correspond to the second rotary member of the invention; the pilot clutch 49 and the main clutch 50 correspond to the clutch mechanism of the invention; and the outer cylindrical portion 30 and the inner cylindrical portion 28 correspond to the magnetic member of the invention.

Moreover, the protrusion 69, the cut-off portion 70 and the rotation stopping pin 72 correspond to the rotation stopping mechanism or the positioning mechanism of the invention. Still moreover, the bearing 41 corresponds to the first bearing of the invention, and the cylindrical portion 65 and the recess 66 correspond to the positioning mechanism of the invention. In addition, the coupling case 7 corresponds to the front cover of the invention, and the rotor 27 corresponds to the rear housing of the invention.

In the driving force transmission system K1 shown in FIGS. 6 and 7, too, the transmission or interruption of the torque is controlled depending upon whether or not the electric current is fed to the electromagnet 35. In the driving force transmission system K1 shown in FIGS. 6 and 7, moreover, the electromagnet 35 and differential carrier 1 are positioned in the radial direction by fitting the recess 66 and the cylindrical portion 65. Moreover, the gaps E1 and F1 are set by the single bearing 41. Here, the bearing 41 is intrinsically given a sizing accuracy capable of accurately setting the relative positions between the member to be mounted and the support member in the radial direction, so that the setting accuracy of the gaps E1 and F1 is improved as high as possible. As a result, the applying force of the main clutch 50, i.e., the torque capacity is easily controlled to improve the transmission function of the driving force to be transmitted from the coupling case 7 to the shaft 20 and the drive pinion shaft 2.

In the embodiment of FIGS. 6 and 7, on the other hand, the bearing 41, the cylindrical portion 65 and the recess 66 are arranged to overlap in the radial direction. In other words, the bearing 41, the cylindrical portion 65 and the recess 66 are arranged concentrically of the axis A1. As a result, the space for arranging the bearing 41, the cylindrical portion 65 and the recess 66 is restricted in the direction of the axis A1. As a result, the size of the driving force transmission system K1 can be made as small as possible in the axial direction.

In the embodiment of FIGS. 6 and 7, moreover, the electromagnet 35 is positioned in the radial direction relative to the differential carrier 1 by fitting the cylindrical portion 65 and the recess 66. In short, no part such as the bearing is required for positioning the differential carrier 1 and the electromagnet 35 in the radial direction. As a result, the number of parts of the driving force transmission system K1 can be suppressed to reduce the number of steps for manufacturing the driving force transmission system K1, to lighten the driving force transmission system K1 and to lower the cost for manufacturing the driving force transmission system K1.

Here will be described a first working example of assembling the driving force transmission system K1. In this first assembling example, a unit, as composed of the shaft 20, the coupling case 7, the main clutch 50, the pilot clutch 49, the rotor 27, the electromagnet 35, the bearing 24 and the bearing 41, is attached in advance to the differential carrier 1. After this, the cover 6 and the differential carrier 1 are fixed.

When the cover 6 and the differential carrier 1 are jointed to each other, more specifically, the cover 6 and the differential carrier 1 and the unit are relatively moved in the axial direction so that the unit is inserted through the opening 6A into the cover 6. In this embodiment, the electromagnet 35, the protrusion 69 and the rotation stopping pin 72 are arranged to face the opening 1A and the opening 6A This enables the worker to observe the electromagnet 35, the protrusion 69 and the rotation stopping pin 72 visually from the outside of the cover 6 and the differential carrier 1 immediately before the end face of the cover 6 and the end face of the differential carrier 1 comes into abutment. In other words, it is possible to confirm the phases of the electromagnet 35 and the cover 6 in the circumferential direction on the axis A1, specifically the phases of the rotation stopping pin 72 and the cut-off portion 70 in the circumferential direction.

When the rotation stopping pin 72 and the cut-off portion 70 are out of phase in the circumferential direction, the differential carrier 1 and the cover 6 can be stopped while rotating the electromagnet 35. By this rotation of the electromagnet 35, the rotation stopping pin 72 and the cut-off portion 70 can be corrected in phase in the circumferential direction on the axis A1. Here, the differential carrier 1 and the cover 6 are positioned in the circumferential direction with reference to the knock pin 6C of the cover 6 and the (not-shown) hole of the differential carrier 1.

After this, the cover 6 and the differential carrier 1 are moved in the axial direction until the relative movement between the cover 6 and the differential carrier 1 is ended with their end faces coming into abutment. After the end of the relative movement between the cover 6 and the differential carrier 1, the rotation stopping pin 72 is inserted in the cut-off portion 70. As a result, the rotations of the cover 6 and the electromagnet 35 are fixed by the engaging force between the rotation stopping pin 72 and the protrusion 69. Moreover, the (not-shown) bolts are inserted into the axial holes 6B and fastened to fix the differential carrier 1 and the cover 6.

In this embodiment, as described hereinbefore, the electromagnet 35, the protrusion 69 and the rotation stopping pin 72 can be visually observed from the outside of the cover 6 and the differential carrier 1 before the abutment between the end face of the cover 6 and the end face of the differential carrier 1. When the electromagnet 35 and the cover 6 are out of phase in the circumferential direction, moreover, the phases of the rotation stopping pin 72 and the cut-off portion 70 can be corrected in the circumferential direction not by moving the differential carrier 1, the cover 6 and the unit in the axial direction but merely by rotating the electromagnet 35 as it is. As a result, the works of positioning the electromagnet 35 and the cover 6 in the circumferential direction on the axis A1 can be performed easily and promptly to improve the assembling workability for the driving force transmission system K1.

Figure 9:
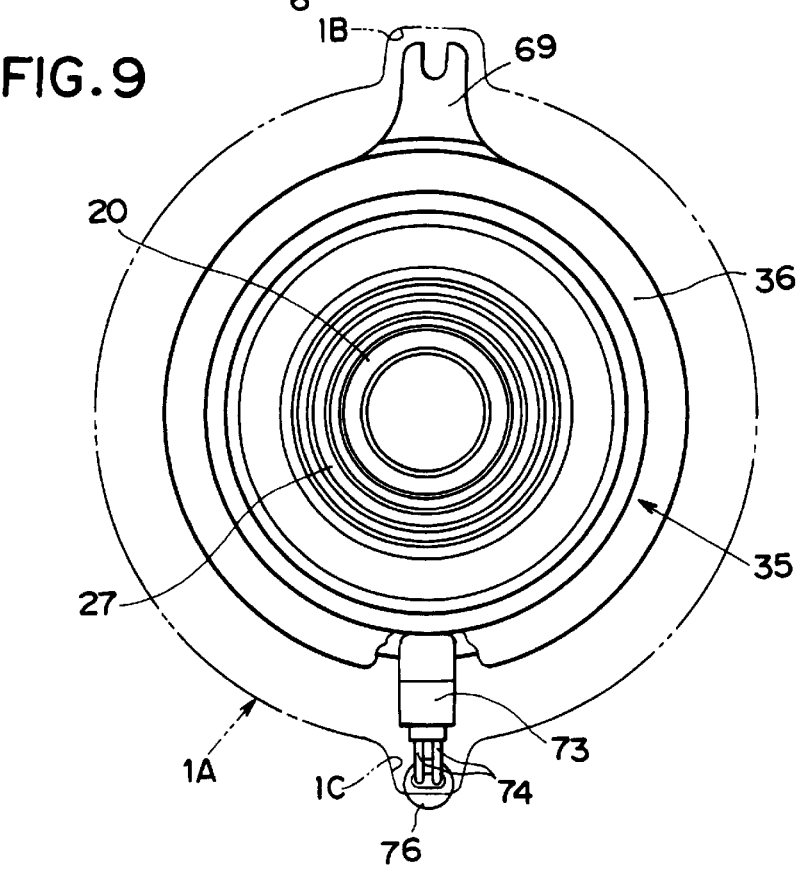
FIG. 9 is a righthand side elevation showing an example of the construction of an opening of a differential carrier shown in FIGS. 6 and 7.

Here will be described a second working example of assembling the driving force transmission system K1. This second assembling example is also applied to the case in which the construction of the differential carrier 1 is slightly different from that of the embodiment of FIGS. 6 and 7. As shown in FIG. 9, more specifically, grooved portions 1B and 1C are formed to protrude outward in the generally circular opening 1A of the differential carrier 1. These grooved portions 1B and 1C are arranged at a spacing of about 180 degrees with respect to the circumferential direction of the opening 1A.

Moreover, the protrusion 69 is arranged in the grooved portion 1B, and the electric wire 74 is arranged in the grooved portion 1C. In this construction, the electric wire 74, the protrusion 69 and the grooved portions 1B and 1C correspond to the positioning mechanism of the invention.

In this second assembling example, the unit, as prepared by assembling the shaft 20, the coupling case 7, the main clutch 50, the pilot clutch 49, the rotor 27, the electromagnet 35, the bearing 24 and the bearing 41 integrally, is assembled in advance with the cover 6, and the cover 6 and the differential carrier 1 are then assembled.

At first, the unit and the cover 6 are relatively moved in the axial direction so that the unit is housed through the opening 6A in the cover 6. In this embodiment, before the end of the positioning the cover 6 and the unit in the axial direction, the electromagnet 35, the protrusion 69 and the rotation stopping pin 72 can be visually observed from the outside of the cover 6. Moreover, it is possible to confirm the phases of the electromagnet 35 and the cover 6 in the circumferential direction, that is, the phases of the rotation stopping pin 72 and the cut-off portion 70 in the circumferential direction.

Here, the rotation stopping pin 72 and the cut-off portion 70 may be out of phase in the circumferential direction. In this case, the rotation stopping pin 72 and the cut-off portion 70 can be brought into phase in the circumferential direction neither by moving the cover 6 and the electromagnet 35 relatively in the axial direction nor by extracting any part already housed in the cover 6 but by merely rotating the electromagnet 35. The positioning of the cover 6 and the unit in the axial direction is then ended by moving the cover 6 and the unit again in the axial direction.

At the end of positioning the cover 6 and the unit in the axial direction, the rotation stopping pin 72 is inserted in the cut-off portion 70. As a result, the rotations of the cover 6 and the electromagnet 35 are stopped by the engaging forces between the rotation stopping pin 72 and the protrusion 69. Then, the electric wire 74 is inserted into the hole 75 and extracted out of the cover 6, and the grommet 76 is fitted in the hole 75. After this, the (not-shown) connector may be attached to the end portion of the electric wire 74.

By these works, the cover 6 and the unit are assembled, and the cover 6 and the unit, and the differential carrier 1 are then relatively moved in the axial direction. Here, the differential carrier 1 and the cover 6 are positioned in the circumferential direction with reference to either the knock pins 6C of the cover 6 and the (not-shown) holes of the differential carrier 1, or the axial holes 6B of the cover 6 and the (not-shown) internal threads of the differential carrier 1.

Now, the positioning of the cover 6 and the unit in the circumferential direction is ended by the works described above. As a result, the positioning of the differential carrier 1 and the unit is indirectly performed by the circumferential positioning of the differential carrier 1 and the cover 6. Specifically, the positioning of the protrusion 69 of the electromagnet 35, the electric wire 74 and the grooved portions 1B and 1C of the differential carrier 1 is ended in the circumferential direction. This makes it unnecessary to position the electromagnet 35 and the differential carrier 1 in the circumferential direction. After the abutment between the end face of the differential carrier 1 and the end face of the cover 6, the (not-shown) bolts are inserted into the axial holes 6B and are individually fastened to fix the differential carrier 1 and the cover 6.

Thus, effects similar to those of the first assembling example are also achieved in the second assembling example. Even when the aperture 1A of the differential carrier 1 is formed, as shown in FIG. 9, the differential carrier 1 and the unit are indirectly positioned by positioning the differential carrier 1 and the cover 6 in the circumferential direction.

As a result, the works of positioning the electromagnet 35 and the differential carrier 1 in the circumferential direction, i.e., the works of positioning the protrusion 69, the electric wire 74 and the grooved portions 1B and 1C need not be elaborately performed to improve the assembling workability.

After the electric wire 74 is inserted into the hole 75, on the other hand, the differential carrier 1 and the cover 6 are positioned. This prevents the electric wire 74 from coming into contact with the edge portion of the opening 1A of the differential carrier 1. As a result, the electric wire 74 can be prevented from being damaged or broken during the assembling works for the driving force transmission system K1.

Moreover, the electric wire 74 is inserted into the hole 75, and this hole 75 is sealed by filling it with the adhesive 77. This makes it unnecessary to fit any special seal member in the hole 75 so that the number of parts is reduced. As a result, the number of steps of assembling the driving force transmission system can be reduced to suppress the rise in the production cost.

Moreover, the electric wire 74 and the protrusion 69 are arranged in circumferentially different positions with respect to the iron core 36. As a result, the radial projection of the electromagnet 35 can be suppressed to make the radial sizes of the cover 6 and the differential carrier 1 as small as possible.

Figure 10:
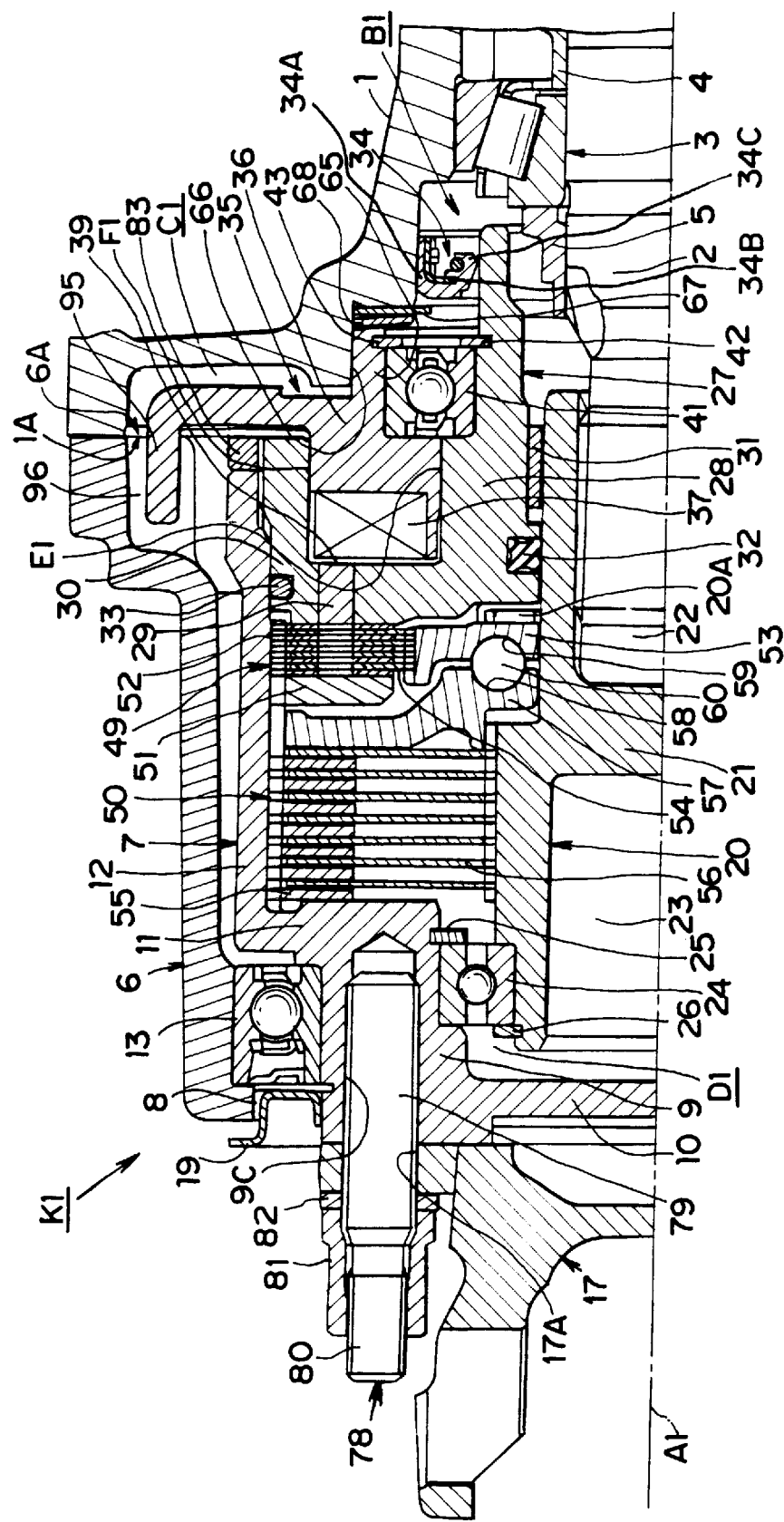
FIG. 10 is a sectional front elevation showing one half of a driving force transmission system according to still another embodiment of the invention.

FIG. 10 is a sectional front elevation showing one half of another embodiment of the invention. This embodiment of FIG. 10 is different from that of FIGS. 6 and 7 in the construction of the rotation stopping mechanism for the electromagnet 35. In the embodiment of FIG. 10, more specifically, a retaining pawl 95 is so formed in a circumferential portion of the iron core 36 as is projected outward and bent toward the cover 6. On the other hand, a retaining groove 96 is formed in the inner circumference of the cover 6. Moreover, the leading end of the retaining pawl 95 is arranged in the retaining groove 96 so that the rotations of the cover 6 and the electromagnet 35 are stopped in the circumferential direction by the engaging forces between the retaining pawl 95 and the cover 6. Moreover, the retaining pawl 95 and the retaining groove 96 are arranged to face the openings 1A and 6A. These retaining pawl 95 and retaining groove 96 correspond to the positioning mechanism of the invention. Here will be omitted the description of the remaining construction of FIG. 10 because they are similar to those of FIGS. 6 and 7.

The driving force transmission system K1, as shown in FIG. 10, can be assembled according to either the first assembling example or the second assembling example. Before the end of the positioning of the cover 6 and the unit in the direction of the axis A1, moreover, the worker is allowed to observe the electromagnet 35, the retaining pawl 95 and the retaining groove 96 visually from the outside of the cover 6. The worker can also confirm the phases of the electromagnet 35 and the cover 6 in the circumferential direction, that is, the phases of the retaining pawl 95 and the retaining groove 96 in the circumferential direction.

Here, when the phases of the retaining pawl 95 and the retaining groove 96 are different, the circumferential phases of the retaining pawl 95 and the retaining groove 96 can be corrected into coincidence not by moving the unit and the cover 6 in the direction of the axis A1 but merely by rotating the electromagnet 35. After this, the cover 6 and the unit are moved in the axial direction to end the positioning thereof in the axial direction.

At the end of the positioning of the cover 6 and the unit in the axial direction, the retaining pawl 95 is inserted in the retaining groove 96. As a result, the rotations of the cover 6 and the electromagnet 35 are stopped by the engaging forces between the retaining pawl 95 and the cover 6. In other words, the cover 6 and the electromagnet 35 are positioned in the circumferential direction.

The cover 6 and the unit are assembled by the actions described above, and actions similar to those of the embodiment of FIGS. 6 and 7 are performed to fix the differential carrier 1 and the cover 6. As a result, effects similar to those of the embodiment of FIGS. 6 and 7 are achieved. Here in the embodiments of FIGS. 6 to 10, at least one rotation stopping mechanism for the electromagnet 35 may be arranged in the circumferential direction.

On the other hand, the driving force transmission system K1 shown in FIGS. 1 and 2 is assembled as in the embodiment of FIGS. 6 and 7. In the case of assembling the driving force transmission system shown in FIGS. 1 and 2, the differential carrier 1 and the electromagnet 35 are relatively moved in the axial direction.

In FIGS. 1 and 2, the cylindrical portion 15, the cylindrical portion 40, the grooves 45 and the ridges 44 are arranged to face the openings 1A and 6A. As a result, the cylindrical portion 15, the cylindrical portion 40, the grooves 45 and the ridges 44 can be visually observed from the outside of the differential carrier 1 and the cover 6.

When the grooves 45 and the ridges 44 are out of phase in the circumferential direction on the axis A1, the electromagnet 35 can be rotated without moving the unit and the cover 6, or the unit and the differential carrier 1 in the axial direction. In short, the phases of the grooves 45 and the ridges 44 can be corrected in the circumferential direction into coincidence by rotating the electromagnet 35. As a result, the positioning works for the grooves 45 and the ridges 44 in the circumferential direction can be performed easily and promptly to improve the assembling workability of the driving force transmission system K1.

In the inner circumference of the cylindrical portion 40 of the iron core 36, moreover, there are formed the grooves 64 which engage with the ridges 61. By the engagements between these grooves 64 and ridges 61, the differential carrier 1 and the electromagnet 35 are stopped in their rotations. In other words, the differential carrier 1 and the electromagnet 35 are positioned in the circumferential direction. Moreover, the cylindrical portion 15, the ridges 61, the cylindrical portion 40 and the grooves 64 are arranged radially outside of the bearing 62 on the axis A1. Moreover, the seal bearing (or the radial bearing) 63 is arranged radially outside of the cylindrical portion 40.

When the driving force transmission system K1 shown in FIG. 5 is to be assembled, moreover, the differential carrier 1 and the unit are relatively moved in the direction of the axis A1.

Here, the cylindrical portion 15, the cylindrical portion 40, the ridges 61 and the grooves 64 are arranged to face the openings 1A and 6A. This makes it possible to confirm the cylindrical portion 15, the cylindrical portion 40, the ridges 61 and the grooves 64 visually from between the differential carrier 1 and the cover 6.

When the ridges 61 and the grooves 64 are out of phase in the circumferential direction, the electromagnet 35 can be rotated as it is without moving the differential carrier 1 and the electromagnet 35 relative to each other in the axial direction. As a result the phases of the ridges 61 and the grooves 64 can be corrected in the circumferential direction into coincidence. As a result, the differential carrier 1 and the electromagnet 35 are positioned easily and promptly in the circumferential direction thereby to improve the assembling workability for the driving force transmission system K1.

Figure 11:
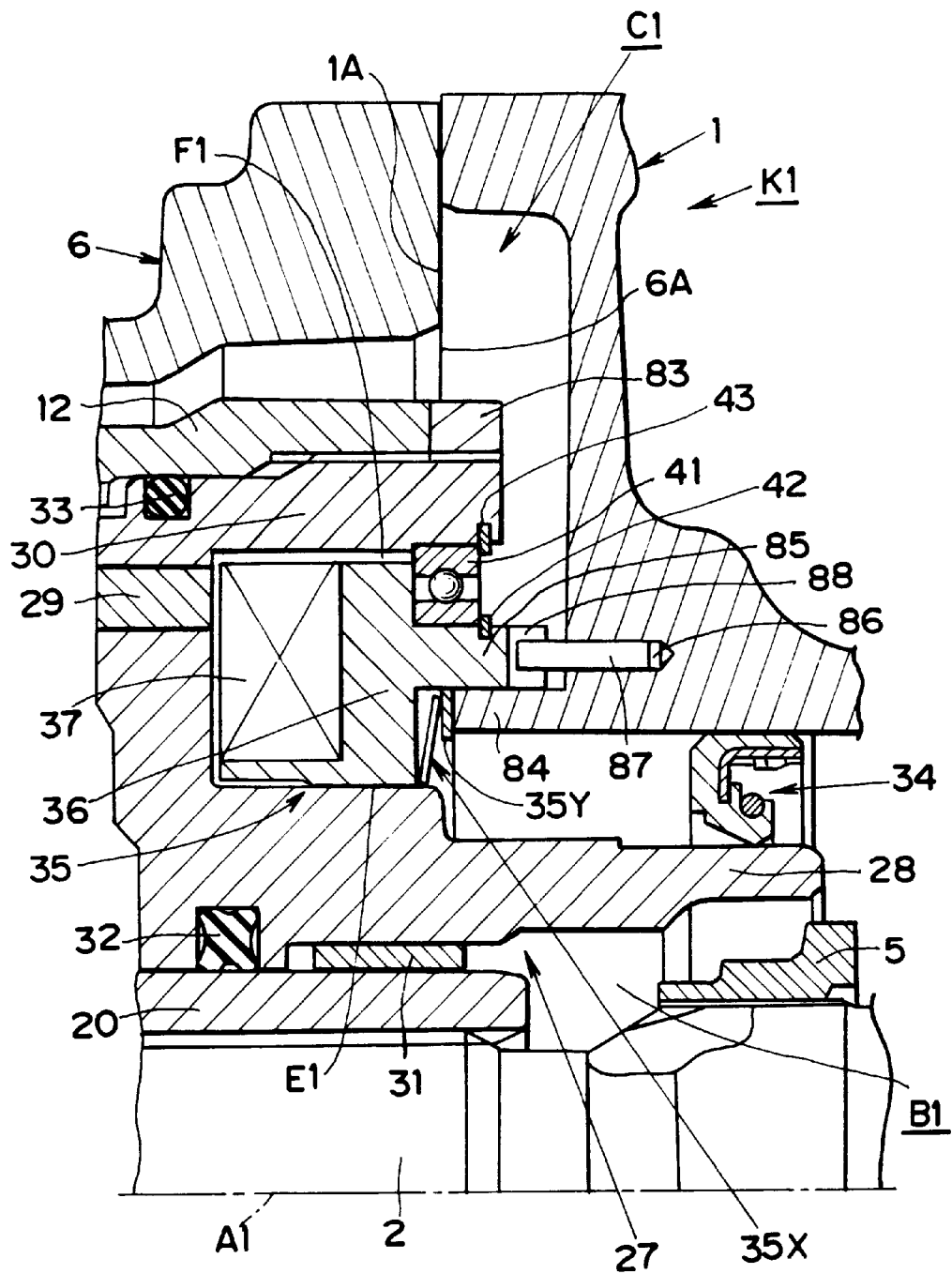
FIG. 11 is a sectional front elevation showing one half of a portion of still another embodiment, in which the construction of the driving force transmission system of FIG. 6 is partially modified.

FIG. 11 is a sectional front elevation showing a portion of another embodiment. FIG. 11 shows the embodiment in which the rotation stopping mechanism and the electromagnet positioning mechanism shown in FIGS. 6 and 7 are modified.

Here will be described the mechanism for positioning the electromagnet 35 in the radial direction. In the differential carrier 1, there is formed a cylindrical portion 84 on the axis A1. In the iron core 36, on the other hand, there is formed a cylindrical portion 85 on the axis A1. Moreover, the cylindrical portion 85 is fitted on the outer circumference of the cylindrical portion 84 to position the electromagnet 35 in the radial direction with respect to the differential carrier 1.

Between the outer cylindrical portion 30 and the cylindrical portion 85, moreover, there is arranged the (radial) bearing 41, by which the electromagnet 35 and the rotor 27 are enabled to rotate relative to each other. The gaps E1 and F1 are set by the aforementioned positioning mechanism and the bearing 41. This bearing 41 is positioned in the axial direction by the snap ring 43 fitted on the outer cylindrical portion 30 and by the snap ring 42 fitted on the cylindrical portion 85.

On the inner circumference of the cylindrical portion 85, on the other hand, there are arranged an annular shim 35Y and an annular conical spring 35X. By the elastic force of this conical spring 35X, the iron core 36 is urged leftwardly of the Drawing.

Here will be described the rotation stopping mechanism for the electromagnet 35. In the differential carrier 1, there is formed a hole 86, in which a rotation stopping pin 87 is fitted. In the cylindrical portion 85, on the other hand, there is formed a cut-off portion 88, into which the leading end of the rotation stopping pin 87 is inserted. By the engaging forces between the rotation stopping pin 87 and the cylindrical portion 85, moreover, the electromagnet 35 is rotationally stopped. The rotation stopping mechanism for these is arranged to face the openings 1A and 6A. The remaining construction is similar to that of the embodiment of FIGS. 6 and 7.

Here will be described the correspondences between the construction of the embodiment of FIG. 11 and the construction of the invention. Specifically, the rotation stopping pin 87 and the cut-off portion 88 correspond to the rotation stopping mechanism of the invention. Moreover, the bearing 41 corresponds to the first bearing of the invention, and the cylindrical portion 84 and the cylindrical portion 85 correspond to the positioning mechanism of the invention. In the embodiment of FIG. 11, moreover, effects similar to those of the embodiment of FIGS. 6 and 7 are achieved.

Figure 12:
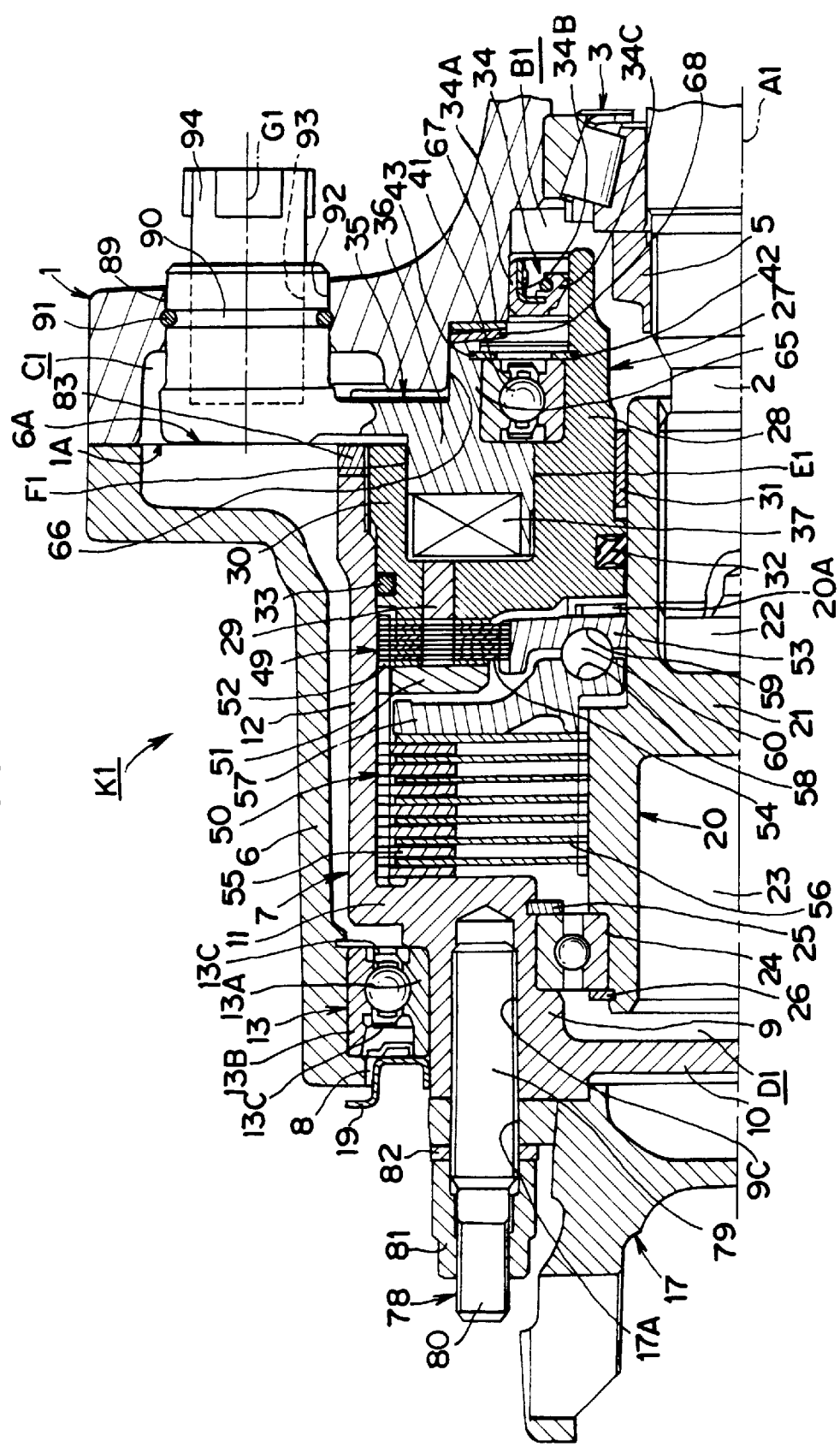
FIG. 12 is a sectional front elevation showing one half of a driving force transmission system according to still another embodiment of the invention.
Figure 13:
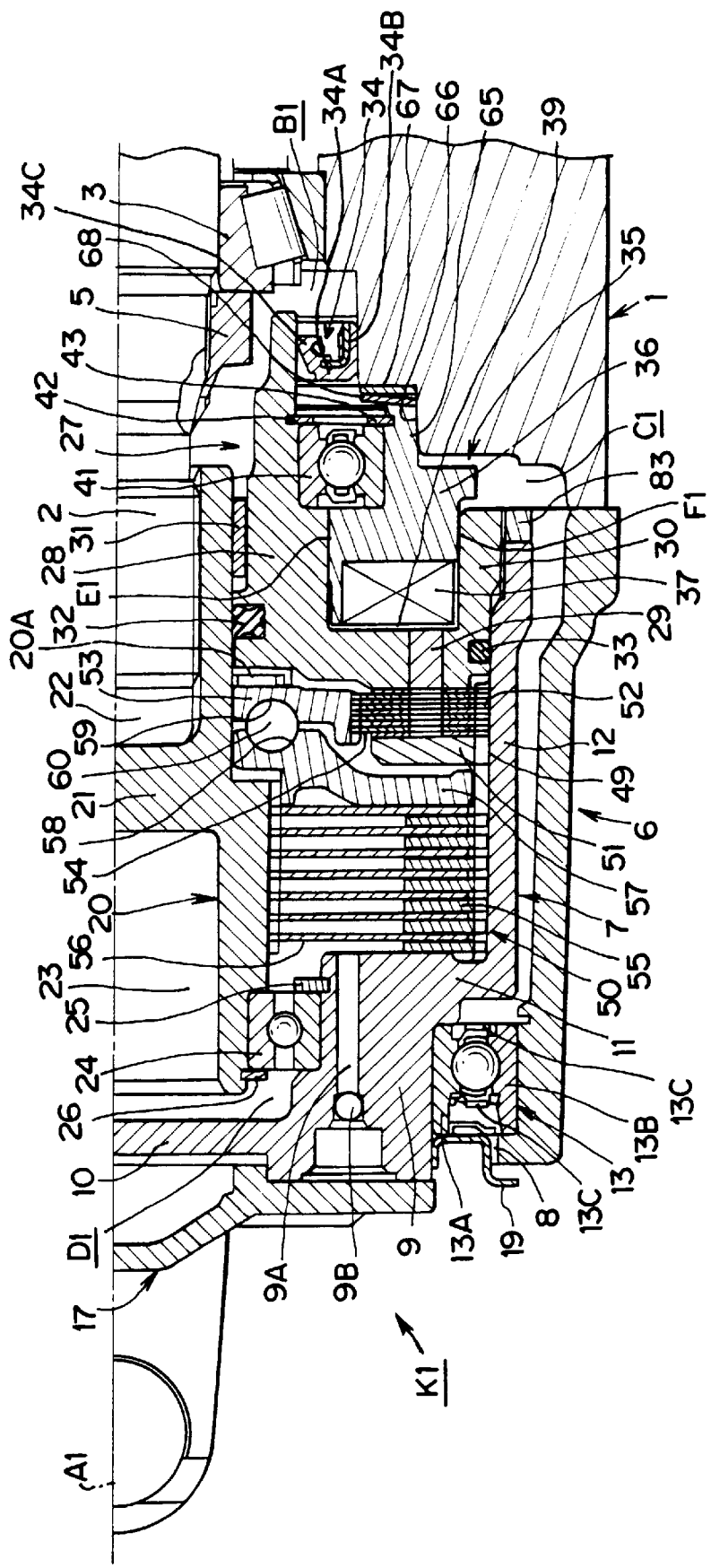
FIG. 13 is a sectional front elevation showing the other half of the driving force transmission system of FIG. 12.

FIGS. 12 and 13 are sectional front elevations showing another embodiment of the diving force transmission system K1. The embodiment of FIGS. 12 and 13 is different from that of FIGS. 6 and 7 in the construction of the electromagnet 35 and the rotation stopping mechanism for the electromagnet 35.

Specifically, a joint portion 89 is formed around the outer circumference of the iron core 36 of the electromagnet 35. In short, the joint portion 89 is integrated with the iron core 36 by a magnetic material. The joint portion 89 is protruded toward the differential carrier 1. Moreover, the joint portion 89 is formed into a bottomed cylindrical shape and arranged to have its axis G1 in parallel with the axis A1. In the outer circumference of the joint portion 89, on the other hand, there is formed an annular fitting groove 90, in which an O-ring 91 is fitted.

In the differential carrier 1, on the other hand, there is formed a fitting hole 92, in which the joint portion 89 is fitted. Moreover, the fitting hole 92 and the joint portion 90 are sealed with an O-ring 91. Thus, the joint portion 89 is fitted in the fitting hole 92 so that the rotation of the electromagnet 35 is stopped by the engaging forces between the joint portion 89 and the differential carrier 1. These rotation stopping mechanisms described above are arranged to face the openings 1A and 6A. On the other hand, a fixing hole 93 of the joint portion 89 is opened in the outer side of the differential carrier 1 and fixes therein a connector 94 for connecting the electric wire (or the lead wire). Here, the remaining construction is similar to that of the embodiment of FIGS. 6 and 7.

Here will be described the correspondences between the construction of the embodiment of FIGS. 12 and 13 and the invention. Specifically, the connector 94, the joint portion 89 and the fitting hole 92 correspond to the rotation stopping mechanism or the positioning mechanism of the invention. In other words, this rotation stopping mechanism or positioning mechanism is arranged inside of the abutting faces of the differential carrier 1 and the cover 6. On the other hand, the joint portion 89 and the O-ring 91 correspond to the isolating mechanism of the invention.

In the driving force transmission system K1 shown in FIGS. 12 and 13, too, the construction similar to that of the embodiment of FIGS. 6 and 7 can provide effects similar to those of the embodiment of FIGS. 6 and 7.

According to the embodiment of FIGS. 12 and 13, the rotation of the electromagnet 35 is stopped not by using any parts but by the joint portion 89 integrated with the electromagnet 35. As a result, it is possible to reduce the number of parts of the driving force transmission system K1, to reduce the number of steps of manufacturing the driving force transmission system K1, to reduce the weight of the driving force transmission system K1 and to lower the cost for manufacturing the driving force transmission system K1.

According to the embodiment of FIGS. 12 and 13, moreover, the connector 94 is fitted on the joint portion 89. As a result, the mere fitting of the joint portion 89 in the fitting hole 92 makes it possible to handle the connector 94 with respect to the differential carrier 1, to stop the rotation of the electromagnet 35 with respect to the differential carrier 1 and to end the sealing of the outer circumference of the joint portion 89. As a result, the assembling workability of the driving force transmission system K1 is improved to reduce the number of steps of assembling the driving force transmission system K1.

In this embodiment, the fitting hole 92 and the joint portion 89 are sealed with the O-ring 91 so that the foreign substance outside of the differential carrier 1 can be prevented from entering the electromagnet housing chamber C1 through the fitting hole 92. As a result, the magnetic permeabilities of the gaps E1 and F1 can be kept constant to keep the torque transmission performance of the driving force transmission system K1 satisfactory.

In the embodiment shown in FIG. 12, moreover, the joint portion 89 and the fitting hole 92 are arranged to face the openings 1A and 6A. As a result, when the electromagnet 35 and the differential carrier 1 are moved in the direction of the axis A1 during the assembly of the driving force transmission system K1, the worker can observe the joint portion 89 and the fitting hole 92 visually from the outside. When the joint portion 89 and the fitting hole 92 are out of phase in the circumferential direction, the relative movements of the unit and the differential carrier 1 are stopped. Merely by rotating the electromagnet 35, moreover, the phases of the joint portion 89 and the fitting hole 92 can be corrected into coincidence. As a result, the joint portion 89 and the fitting hole 92 can be positioned easily and promptly in the circumferential direction thereby to improve the assembling workability of the driving force transmission system K1.

According to the embodiment of FIG. 12, on the other hand, the rotation of the electromagnet 35 is stopped not by using any parts but by the joint portion 89 integrated with the electromagnet 35. This makes it possible to reduce the number of parts of the driving force transmission system K1, to reduce the number of steps of manufacturing the driving force transmission system K1, to reduce the weight of the driving force transmission system K1 and to lower the cost for manufacturing the driving force transmission system K1.

Figure 14:
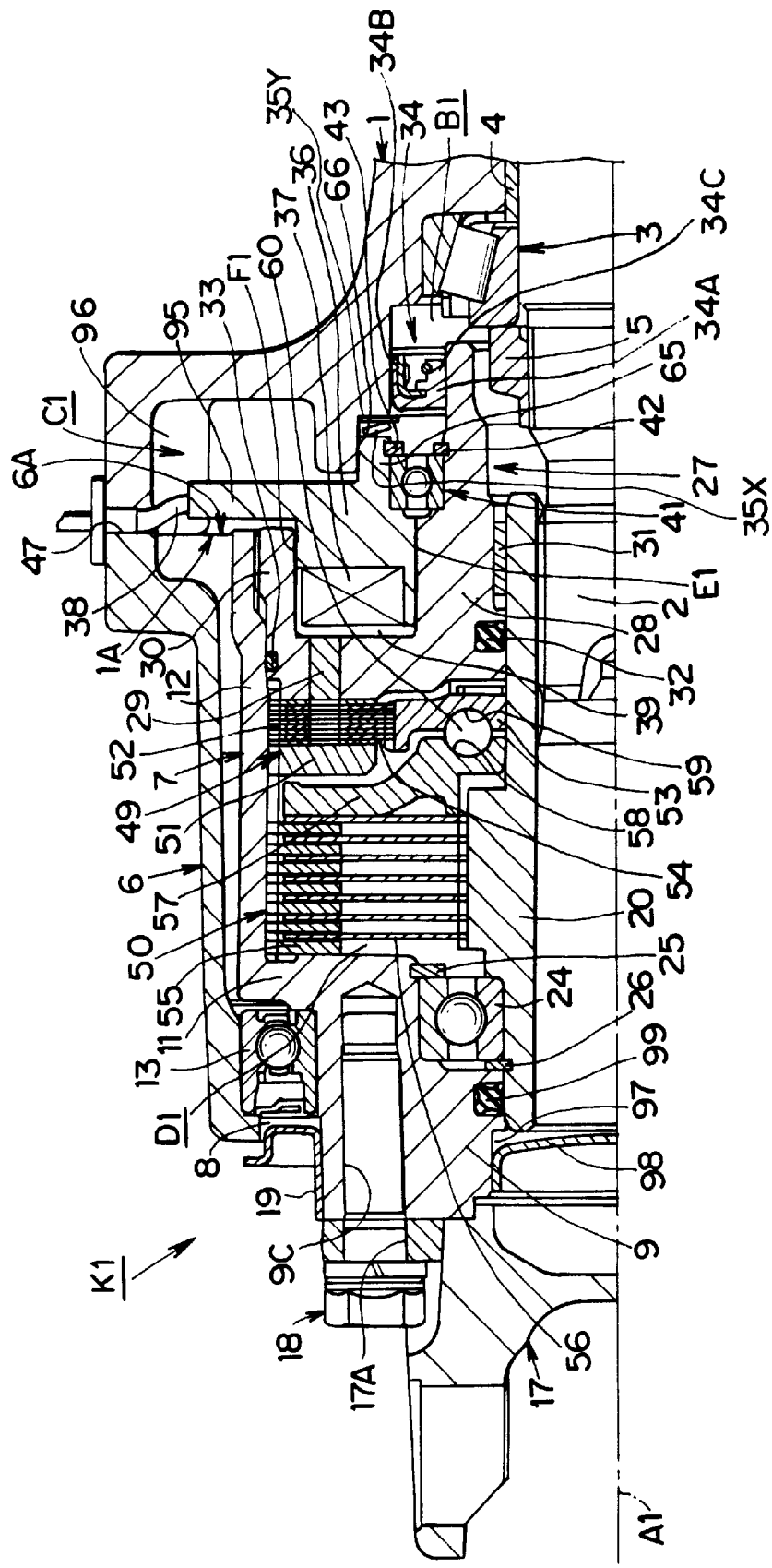
FIG. 14 is a sectional front elevation showing one half of a driving force transmission system according to still another embodiment of the invention.

FIG. 14 is a sectional front elevation showing one half of another embodiment of the driving force transmission system K1 of the invention. According to this embodiment of FIG. 14, there is formed on the outer circumference of the iron core 36 of the electromagnet 35 a protrusion 95, in which the electric wire 38 is buried. In the abutting end faces of the cover 6 and the differential carrier 1, on the other hand, there is formed the through groove 47, in which the electric wire 38 is inserted.

On the inner circumference of the differential carrier 1, moreover, there are formed a pair of retaining pawls 96 which are protruded in the circumferential direction to arrange the protrusion 95 inbetween. In short, the rotation of the electromagnet 35 is stopped by the engagements between the protrusion 95 and the paired retaining pawls 96. The rotation stopping mechanism, as composed of the protrusion 95 and the paired retaining pawls 96, is arranged to face the openings 1A and 6A.

On the other hand, the shaft 20 is formed into a cylindrical shape, and the drive pinion shaft 2 is splined in the inner circumference of the one end of the shaft 20. In the end portion of the coupling case 7 at the side of the flange 17, on the other hand, there is formed an opening 97, in which a blind cover 98 is fitted. In the inner circumference of the diametrically smaller cylindrical portion 9 of the coupling case 7, moreover, there is fitted an X-ring 99, by which the coupling case 7 and the shaft 20 are sealed liquid-tight.

Moreover, the space, as defined by the coupling case 7, the rotor 27 and the shaft 20, is sealed liquid-tight by the O-ring 33, the X-ling 32 and the X-ring 99 thereby to form the coupling oil chamber D1. The remaining construction is similar to that of either the embodiment of FIG. 1 or the embodiment of FIG. 6. Specifically, the mechanism for fixing the coupling case 7 and the flange 17 is made as in the embodiment of FIG. 1. On the other hand, the mechanism for positioning the electromagnet 35 in the radial direction with respect to the differential carrier 1 is made as in the embodiment of FIG. 6.

Here will be described the correspondence between the embodiment of FIG. 14 and the invention. The protrusion 95 and the paired retaining pawls 96 correspond to the rotation stopping mechanism of the invention. In short, this rotation stopping mechanism is arranged inside of the inner circumference of the abutting faces between the cover 6 and the differential carrier 1.

According to the embodiment of FIG. 14, moreover, effects similar to those of the embodiment of FIG. 1 can be achieved from the construction similar to that of the embodiment of FIG. 1, and effects similar to those of the embodiment of FIG. 6 can be achieved from the construction similar to that of the embodiment of FIG. 6. According to the embodiment of FIG. 14, on the other hand, the protrusion 95 is protruded in the radial direction from the outer circumference of the iron core 36, and the through groove 47 is formed outside of the protrusion 95. In other words, no obstruction is left between the protrusion 95 and the through groove 47. As a result, the electric wire 38 can be handled substantially linearly to improve the assembling workability of the driving force transmission system K1.

Figure 15:
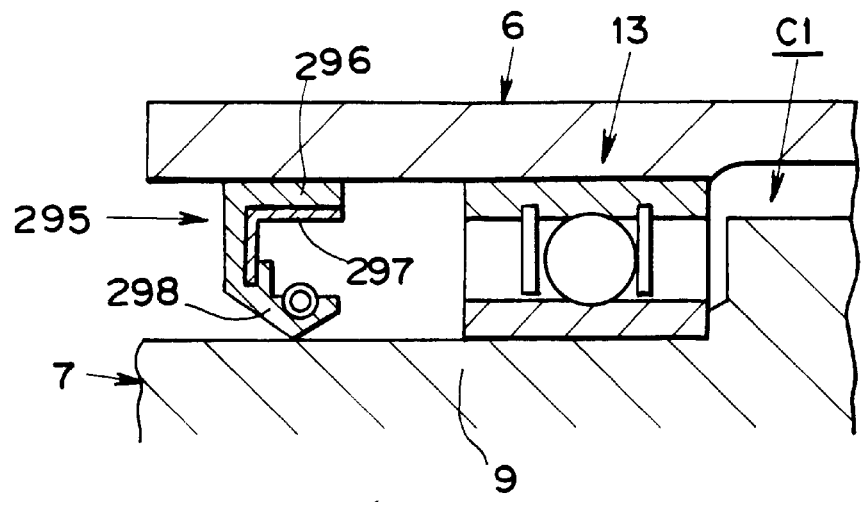
FIG. 15 is a sectional front elevation showing one half of a portion of another example of a sealing device to be used in the driving force transmission system of the invention.
Figure 16:
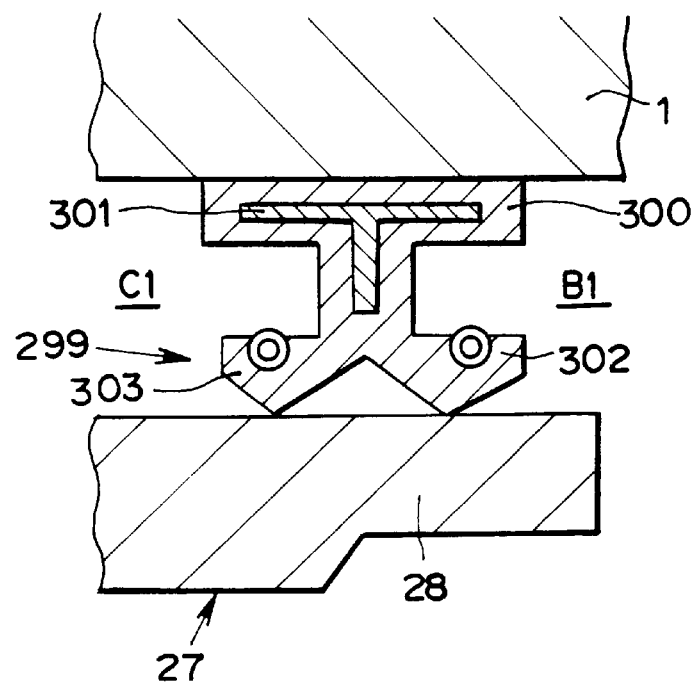
FIG. 16 is a sectional front elevation showing one half of a portion of still another embodiment of the sealing device.

FIGS. 15 and 16 are sections showing portions of another embodiment of the invention. This embodiment of FIGS. 15 and 16 is different from the embodiments of FIGS. 1 to 7 and FIGS. 9 and 10 in the construction of the isolating mechanism for the electromagnet housing chamber C1. As shown in FIG. 15, more specifically, an oil seal 295 is arranged outside of the seal bearing 13 between the cover 6 and the coupling case 7.

This oil seal 295 is composed of an annular seal body 296 made of a rubber elastomer, and a reinforcing metal ring 297 cured and adhered to the seal body 296. Moreover, the seal body 296 is fitted in the inner circumference of the cover 6, and a seal lip 298, as formed at the side of the inner circumference of the seal body 296, is sealed in contact with the diametrically smaller cylindrical portion 9 of the coupling case 7. The seal lip 298 is protruded toward the seal bearing 13.

As shown in FIG. 16, on the other hand, the electromagnet housing chamber C1 and the differential oil chamber B1 are defined liquid-tight by a composite oil seal 299. This composite oil seal 299 is composed of an annular seal body 300 made of a rubber elastomer, and a reinforcing metal ring 301 buried in the seal body 300. Moreover, the seal body 300 is fitted in the inner circumference of the differential carrier 1.

On the inner circumference of the seal body 300, on the other hand, there are formed two seal lips 302 and 303. Specifically, the seal lip 302 is protruded toward the differential oil chamber B1 whereas the seal lip 303 is protruded toward the electromagnet housing chamber C1. Moreover, the seal lips 302 and 303 are held in sealed contact with the outer circumference of the inner cylindrical portion 28 of the rotor 27.

Here, the description of the remaining construction will be omitted because the construction is similar to that of the embodiment of FIGS. 1 to 4, the embodiment of FIG. 5, the embodiment of FIGS. 6 and 7 or the embodiment of FIGS. 9 and 10. In the embodiment of FIGS. 15 and 16, moreover, the electromagnet housing chamber C1 is filled with the (not-shown) cooling liquid. This cooling liquid is one for cooling the pilot clutch and the main clutch indirectly. The cooling liquid is exemplified by a liquid such as gear oil having an excellent heat transfer. In the embodiment of FIGS. 15 and 16, the oil seal 295 and the composite oil seal 299 correspond to the isolating mechanism of the invention. In short, the sealing performance of the electromagnet housing chamber C1 is higher in the embodiment of FIGS. 12 and 13 than those of the embodiments of FIGS. 1 to 7, FIGS. 9 and 10 and FIGS. 15 and 16.

In the embodiment of FIGS. 15 and 16, the heat is transferred, when generated by the engagement between the main clutch and the pilot clutch, to the coupling case 7 and is released to the outside through the cooling fluid and the cover 6 or the differential carrier 1. As a result, the temperature rise, as might otherwise be caused by the heat generation of the main clutch and the pilot clutch, is further suppressed. Specifically, the main clutch and the pilot clutch are cooled to improve their durabilities while suppressing the wears or damages thereof. As a result, the driving force transmitting performance of the driving force transmission system K1 is kept satisfactory.

On the other hand, the cover 6 and the coupling case 7 are sealed by the oil seal 295. As a result, the cooling fluid is prevented from leaking to the outside from between the cover 6 and the coupling case 7 thereby to keep the stable cooling performance. As a result, the seal bearing 13 could be replaced by a bearing having no seal member.

Moreover, the electromagnet housing chamber C1 and the differential oil chamber B1 are defined liquid-tight by the composite oil seal 299. Specifically, the cooling fluid, as confined in the electromagnet housing chamber C1, is prevented by the seal lip 303 from leaking to the differential oil chamber B1. On the other hand, the foreign substance such as the differential oil, as confined in the differential oil chamber B1, or the wear powder is prevented by the seal lip 302 from entering the electromagnet housing chamber C1.

As a result, the cooling fluid, as confined in the electromagnet housing chamber C1, is kept at a substantially constant level to retain its cooling performance. On the other hand, the foreign substance such as the wear powder, as produced at the side of the differential oil chamber B1 is prevented from entering the gaps E1 and F1. As a result, the magnetic permeabilities of the gaps E1 and F1 are kept at a substantially constant level to keep satisfactory the driving force transmitting performance of the driving force transmission system K1.

Figure 17:
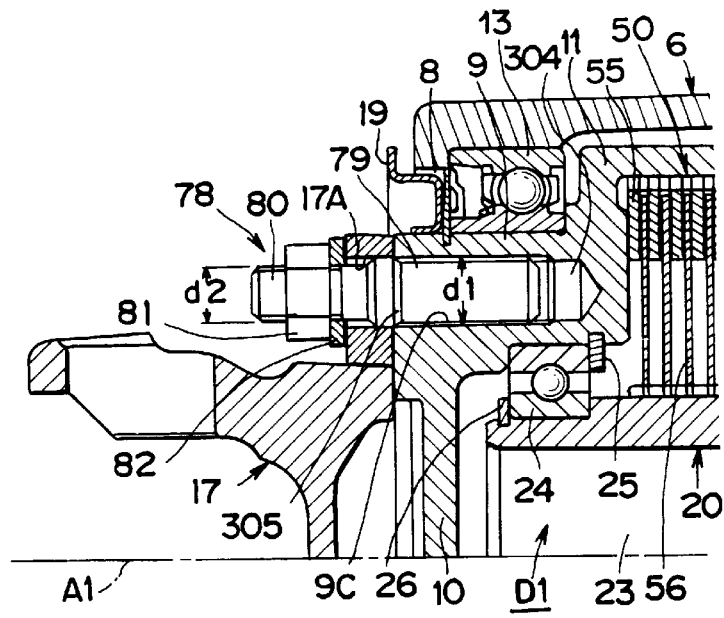
FIG. 17 is a sectional front elevation showing one half of a portion of a construction, as used in the driving force transmission system of the invention, in the vicinity of a stud bolt.

FIG. 17 is a section showing a portion of the construction of one stud bolt 78 for fixing the coupling case 7 and the flange 17. Four stud bolts 78 are arranged in the circumferential direction on the axis A1. The stud bolt 78 is formed, in its longitudinal direction, of the embedded side externally threaded portion 79 and the nut side externally threaded portion 80. Moreover, the embedded side externally threaded portion 79 is given a larger external diameter d1 than the external diameter d2 of the nut side externally threaded portion 80.

In the diametrically smaller cylindrical portion 9, on the other hand, there is formed a hole 304 which is opened in the outer end face of the cylindrical portion 9. The hole 304 is internally threaded at 9c in its inner circumference. The hole 304 is arranged to have a (not-shown) axis in parallel with the axis A1, and the embedded side externally threaded portion 79 is driven into the internally threaded portion 9C. Moreover, an incompletely threaded portion 305 of the embedded side externally threaded portion 79 is brought into abutment against the internally threaded portion 9C thereby to position the stud bolt 78 and the diametrically smaller cylindrical portion 9 in the axial direction.

In the flange 17, on the other hand, there are formed the axial holes 17A, in which the stud bolts 78 are arranged. Moreover, the nuts 81 are screwed on the nut side externally threaded portions 80 and are fastened to fix the coupling case 7 and the flange 17 on each other. Here, the washer 82 is sandwiched between the flanged 7 and eachnut 8. The studbolts 78 and the nuts 81 are made of a metallic material stronger than the coupling case 7 such as carbon steel for mechanical structures.

Here will be described a process for manufacturing the stud bolt 78. This stud bolt 78 is manufactured by the well-known rolling method. Specifically, the embedded side externally threaded portion 79 and the nut side externally threaded portion 80 are formed to copy a plurality of (not-shown) dies by pushing these dies to the outer circumference of the material. In this manufacture process, the external diameter d1 of the embedded side externally threaded portion 79 and the external diameter d2 of the nut side externally threaded portion 80 can be made different merely by changing the spacings between the rolling dies. Without adding any rolling steps or rolling facilities, therefore, the stud bolts 78 can be manufactured while suppressing the cost for their manufacture.

Here will be described the process for manufacturing the coupling case 7. This coupling case 7 is shaped at first to have a predetermined outer circumferential shape by a primary treatment such as a casting or forging treatment. By a second treatment or a machining treatment, the hole 304 and the internally threaded portion 9C are the n formed in the diametrically smaller cylindrical portion 9.

Moreover, the raw material required for manufacturing the stud bolt 78 or the joint element of the parts is less than that required for manufacturing the coupling case 7 or the so-called "structural member". On the other hand, the number of steps of manufacturing the stud bolt 78 is less than that for the coupling case 7. For these reasons, the cost for manufacturing the stud bolt 78 is lower than that for the coupling case 7.

Here will be described the work of fixing the coupling case 7 and the flange 17 on each other in the process for manufacturing the vehicle. The embedded side externally threaded portion 79 of the stud bolt 78 is driven in advance into the internally threaded portion 9C of the coupling case 7. The stud bolt 78 is fastened so far as the incompletely threaded portion 305 comes into abutment against the internally threaded portion 9C to establish a predetermined fastening torque. When the driving force transmission system is to be mounted on the vehicle, the stud bolts 78 are inserted into the holes 17A of the flange 17, and the washers 82 and the nuts 81 are fitted on the nut side externally threaded portions 80. After this, the nuts 81 are fastened under a predetermined torque to fix the coupling case 7 and the flange 17.

In this embodiment, the coupling case 7 is made of an aluminum alloy, and the stud bolts 78 are made of carbon steel for mechanical structures. Here, the carbon steel for mechanical structures has a higher strength than the aluminum alloy. Moreover, the external diameter d1 of the embedded side externally threaded portion 79 and the external diameter d2 of the nut side externally threaded portion 80 are set to different values.

Specifically, the external diameter d1 of the embedded side externally threaded portion 79 to be embedded in the coupling case 7 having a lower strength is set at a smaller value than the external diameter d2 of the nut side externally threaded portion 80 to be screwed in the nut 81 having a higher strength. In other words, when the nut 81 is to be fastened, the shearing stress to act on the internally threaded portion 9C of the coupling case 7 is lower than that to act on the internally threaded portion of the nut 81.

As a result, when the torque for fastening the nut 81 becomes excessive, the nut side externally threaded portion 80, as made to have a smaller diameter than that of the embedded side externally threaded portion 79, ruptures earlier to suppress the plastic deformation of the internally threaded portion 9C of the coupling case 7. It is, therefore, sufficient to replace the stud bolts 78 which are so smaller and lighter than the coupling case 7 that they are required for less powers for transportations and handling and manufactured at a lower cost. This makes it possible to suppress the time period and step number for the replacing works and the cost for manufacturing the driving force transmission system.

In this embodiment, on the other hand, the main clutch 50 is arranged in the coupling case 7 in the projected region, as taken in the direction of the axis A1, of the stud bolts 78. This provides a structure in which the protrusion of the diametrically smaller cylindrical portion 9 directed inward of the coupling case 7 is restricted.

In this embodiment, moreover, the mechanical strength of the stud bolt 78 is set to match the mechanical strength of the coupling case 7 by setting the external diameter d1 of the embedded side externally threaded portion 79 and the external diameter d2 of the nut side externally threaded portion 80 to different values. This restricts the lengths of the stud bolt 78 and the internally threaded portion 9C in the axial direction. As a result, the size of the diametrically smaller cylindrical portion 9 of the coupling case 7 can be suppressed in the axial direction thereby to make a contribution to a reduction in the size of the driving force transmission system.

In this embodiment, on the other hand, the external diameter d1 of the embedded side externally threaded portion 79 and the external diameter d2 of the nut side externally threaded portion 80 are set to the different value. As a result, the torque for fastening the threaded portions having equal external diameters are set to a unified value in the process for manufacturing the driving force transmission system so that the quality of the products can be improved while preventing an error in the fastening torque.

Here, when the material making the nut 81 is made stronger than the material making the coupling case 7, although not shown, there is adopted a construction in which the external diameter d1 of the embedded side externally threaded portion 79 is made smaller than the external diameter d2 of the nut side externally threaded portion 80. When this construction is adopted, the nuts 81 are suppressed from their plastic deformation.

Figure 18:
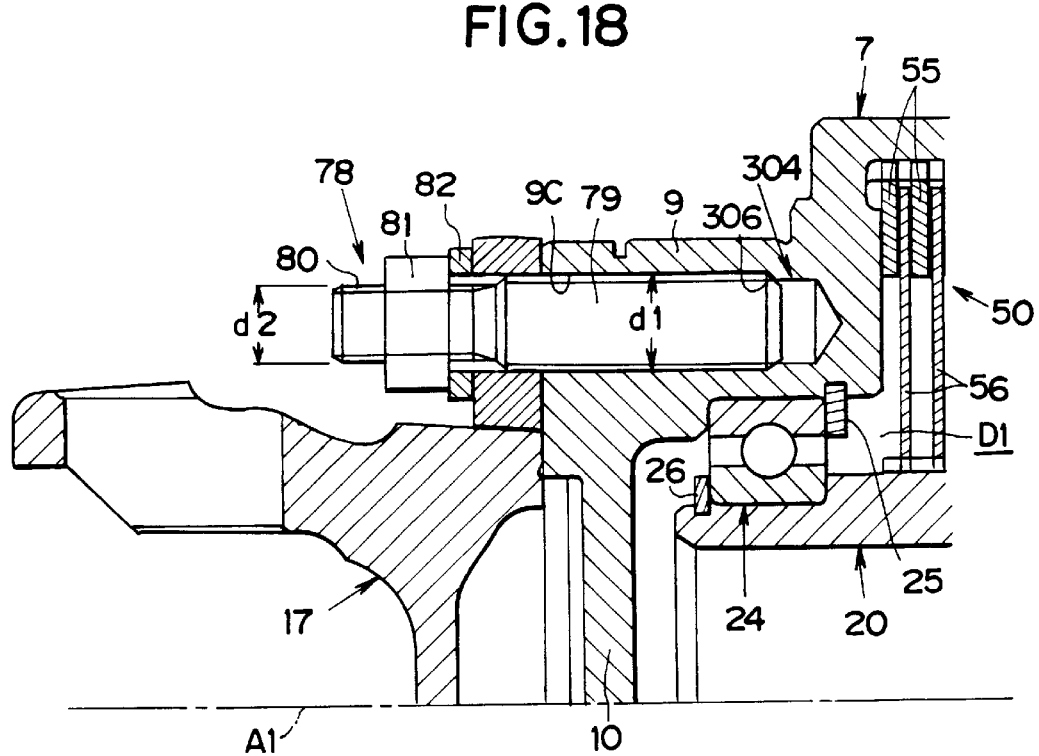
FIG. 18 is a sectional front elevation showing one half of a portion of another construction of the stud bolt to be used in the invention.

FIG. 18 is a section showing a portion of another embodiment of the stud bolt 78. In this embodiment of FIG. 18, the leading end of the embedded side externally threaded portion 79 of the stud bolt 78 comes into the bottom end 306 of the internally threaded portion 9C thereby to position the stud bolt 78 and the diametrically smaller cylindrical portion 9 in the direction of the axis A1. On the other hand, this embodiment is different from that of FIG. 17 in that the embedded side externally threaded portion 79 is formed all over the length of the diametrically larger portion of the stud bolt 78 thereby to eliminate the incompletely threaded portion. The remaining construction is similar to that of the embodiment of FIG. 17 thereby to provide effects similar to those of the embodiment of FIG. 17.

Here in the embodiment of FIG. 17, the stud bolt 78 and the coupling case 7 are positioned in the axial direction by bringing the incompletely threaded portion 305 and the internally threaded portion 9C into abutment. In this construction, the length of the internally threaded portion 9C has to be set in advance to such a larger value as to allow the tolerance of the length of the internally threaded portion 9C and the tolerance of the length of the embedded side externally threaded portion 79. As a result, when the axial protrusion of the diametrically smaller cylindrical portion 9 toward the inner face is restricted, as described above, there is adopted a construction in which the diametrically smaller cylindrical portion 9 is protruded toward the outer end face. As a result, the coupling case 7 is elongated so much in the axial direction that its mountability on the vehicle may possibly drop.

If the construction of FIG. 18 is adopted, on the other hand, the leading end of the embedded side externally threaded portion 79 is brought into the deep end portion 306 of the internally threaded portion 9C thereby to position the stud bolt 78 and the coupling case 7. This makes it necessary to consider not the tolerance for the length of the embedded side externally threaded portion 79 but only the tolerance of the length of the internally threaded portion 9C. In short, it is possible to make the internally threaded portion 9C and the hole 304 as short as possible in the axial direction. As a result, the driving force transmission system is made so small that its mountability on the vehicle is improved.

Figure 19:
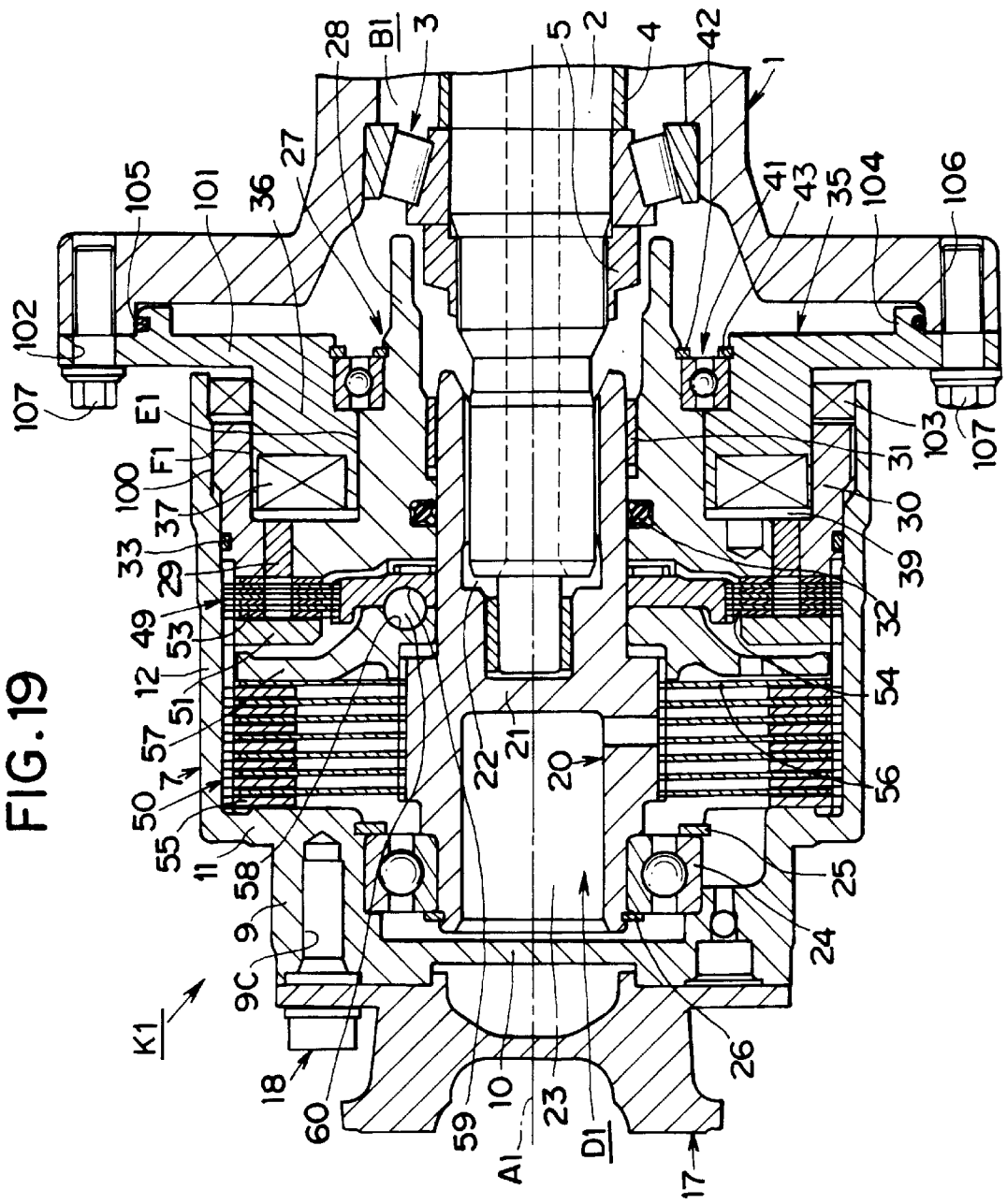
FIG. 19 is a sectional front elevation showing a driving force transmission system according to still another embodiment of the invention.

FIG. 19 is a sectional front elevation showing another embodiment of a driving force transmission system K1. This embodiment of FIG. 19 is different from the embodiments of FIGS. 1 to 11 in that no cover is arranged on the outer side of the coupling case 7. Specifically, a flange 101 is formed on the outer circumference of an annular iron core 100 making the electromagnet 35. In the flange 101, there are formed a plurality of axial holes 102 in the circumferential direction.

On the other hand, the bearing 41 is arranged between the inner circumference of the iron core 100 and the inner cylindrical portion 28 of the rotor 27. This bearing 41 sets the gaps E1 and F1. On the inner circumference of the coupling case 7, moreover, there is fitted an oil seal 103.

At the end face of the flange 101 at the side of the differential carrier 1, on the other hand, there is formed a cylindrical portion 104 on the axis A1, and an O-ring 105 is fitted on the outer circumference of the cylindrical portion 104. The differential carrier 1 is internally threaded at 106 in the circumferential direction, and bolts 107 are inserted into the axial holes 102 and are screwed and fastened into the internal threads 106.

In short, the electromagnet 35 is positioned in the radial direction by the bolt 107 to stop the rotation of the electromagnet 35. Moreover, the differential carrier 1 and the iron core 101 are sealed liquid-tight by the O-ring 105. In short, the differential oil chamber B1 is sealed in the embodiment of FIG. 19 by the X-ling 32 and the O-ring 105. The remaining construction is similar to that of the embodiment of FIGS. 1 and 2.

Here will be described the correspondences between the embodiment of FIG. 19 and the construction of the invention. Specifically, the flange 101 and the bolts 107 correspond to the rotation stopping mechanism of the invention, and the flange 101 and the bolts 107 correspond to the positioning mechanism of the invention.

Thus, in the driving force transmission system K1 shown in FIG. 19, too, the transmission/interruption of the torque is controlled depending upon whether or not the electric current is fed to the electromagnet 35. According to the embodiment of FIG. 19, on the other hand, the gaps E1 and F1 are set by the single bearing 41 so that their setting accuracy is improved to a level as high as possible. As a result, the applying force of the main clutch 50, that is, the torque capacity can be easily controlled to improve the transmission of the driving force to be transmitted from the coupling case 7 to the shaft 20 and the drive pinion shaft 2.

In the embodiment of FIG. 19, moreover, the electromagnet 35 is positioned in the radial direction with respect to the differential carrier 1 by the fitting between the differential carrier 1 and the cylindrical portion 104. In short, no part such as a bearing is required for positioning the differential carrier 1 and the electromagnet 35 in the radial direction. As a result, it is possible to reduce the number of parts of the driving force transmission system K1, to lighten the driving force transmission system K1, to reduce the number of steps of assembling the driving force transmission system K1 and to lower the cost for manufacturing the driving force transmission system K1.

In the embodiment of FIG. 19, still moreover, the coupling case 7 is supported at its rear end side indirectly through the rotor 27 and the electromagnet 35 by the differential carrier 1. This makes it unnecessary to provide the cover, as disclosed in the embodiments of FIGS. 1 to 11, so that the number of parts of the driving force transmission system K1 is reduced. This makes it possible to lighten the driving force transmission system K1, to reduce the number of steps of assembling the driving force transmission system K1 and to lower the cost for manufacturing the driving force transmission system K1. On the other hand, the absence of the cover improves the heat releases of the main clutch 50, the pilot clutch 49 and the electromagnet 35.

Still another embodiment of the invention will be described with reference to FIGS. 20 to 22. In this embodiment, a driving force transmission system 200 is arranged between the two shafts of a vehicle, as between the drive shaft and the driven shaft of the vehicle. Moreover, the driving force transmission system 200 is equipped with an electromagnet (or electromagnetic means) for controlling the actions electromagnetically to transmit the torque between the two shafts.

In the prior art, there has been proposed a coupling device as the driving force transmission system of one type having the electromagnetic means for controlling the actions electromagnetically, as disclosed in Japanese Patent Laid-Open No. 219123/1991. The coupling device, as disclosed, is a vehicular driving force transmission system of the type comprising: a main clutch mechanism arranged between an inner rotary member and an outer rotary member positioned to rotate coaxially and relative to each other; an electromagnetic pilot clutch mechanism; and a cam mechanism for converting the fictionally applying force for the pilot clutch mechanism into the frictionally applying force for the main clutch mechanism.

In the driving force transmission system of this type, the pilot clutch mechanism is activated, when an electromagnetic coil composing the pilot clutch mechanism is energized, to apply the main clutch mechanism frictionally thereby to transmit the torque between the two rotary members. This driving force transmission system is arranged between the drive shaft and the driven shaft, as composing the propeller shaft of a four-wheel drive vehicle, for example, to function to transmit the torque between those two shafts.

Here in the driving force transmission system of this type, the electromagnetic coil and the power source have to be connected because the power supply to the electromagnetic coil is indispensable. This makes it impossible to fix the electromagnetic coil on the outer rotary member or the inner rotary member composing the driving force transmission system. As disclosed in the aforementioned Laid-Open, therefore, the driving force transmission system is assembled in the transfer or the differential. Specifically, there is adopted a mechanism in which the electromagnetic coil is fixed in the case of the transfer or in the case of the differential or in which the driving force transmission system is mounted in a special case to fix the electromagnetic coil in the case.

This raises a disadvantage that when the driving force transmission system of the type is not mounted in the special case, its arrangement is limited to the inside of the transfer or the differential. Especially when the four-wheel drive vehicle is constructed, the driving force transmission system cannot be arranged midway of the propeller shaft. When the driving force transmission system is to be arranged in a desired place of the vehicle, on the other hand, it is necessary to prepare the special case for mounting the driving force transmission system. Another problem is that the special case mounting the driving force transmission system therein has to be fixed on the vehicle body by special fixing means.

Figure 20:
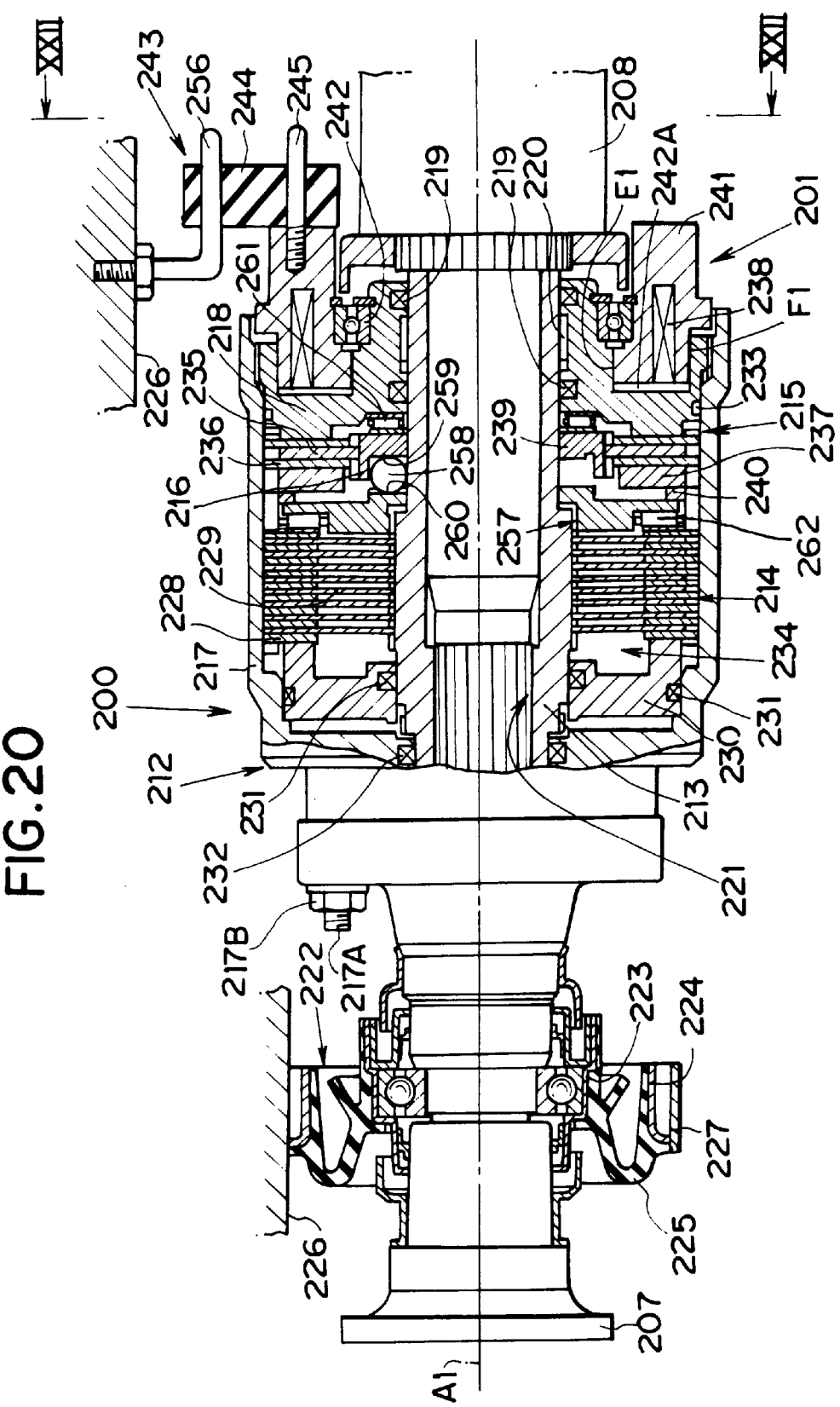
FIG. 20 is a longitudinal front section showing a portion of a driving force transmission system according to still another embodiment of the invention.
Figure 21:
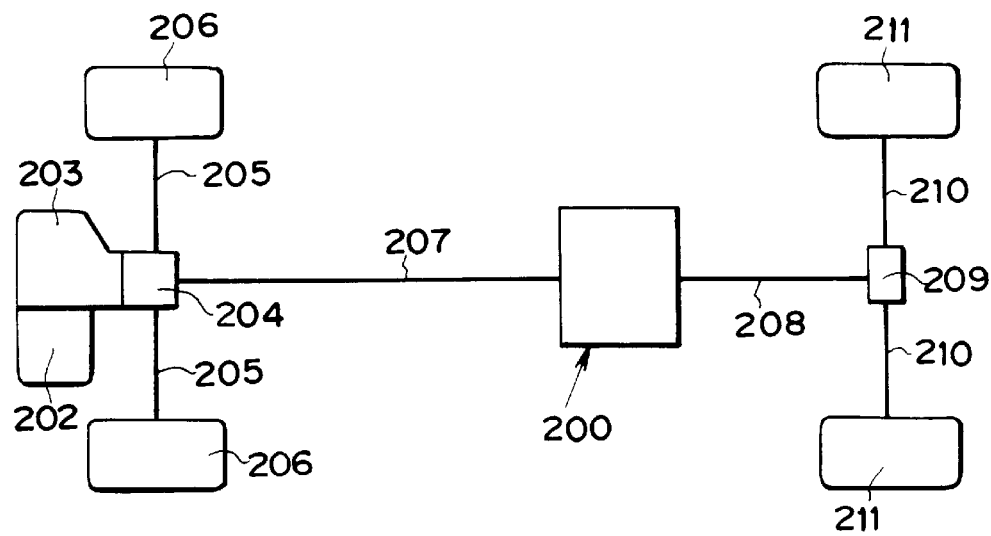
FIG. 21 is a schematic diagram showing a construction of a four-wheel drive vehicle on which a driving force transmission system of the invention is mounted.
Figure 22:
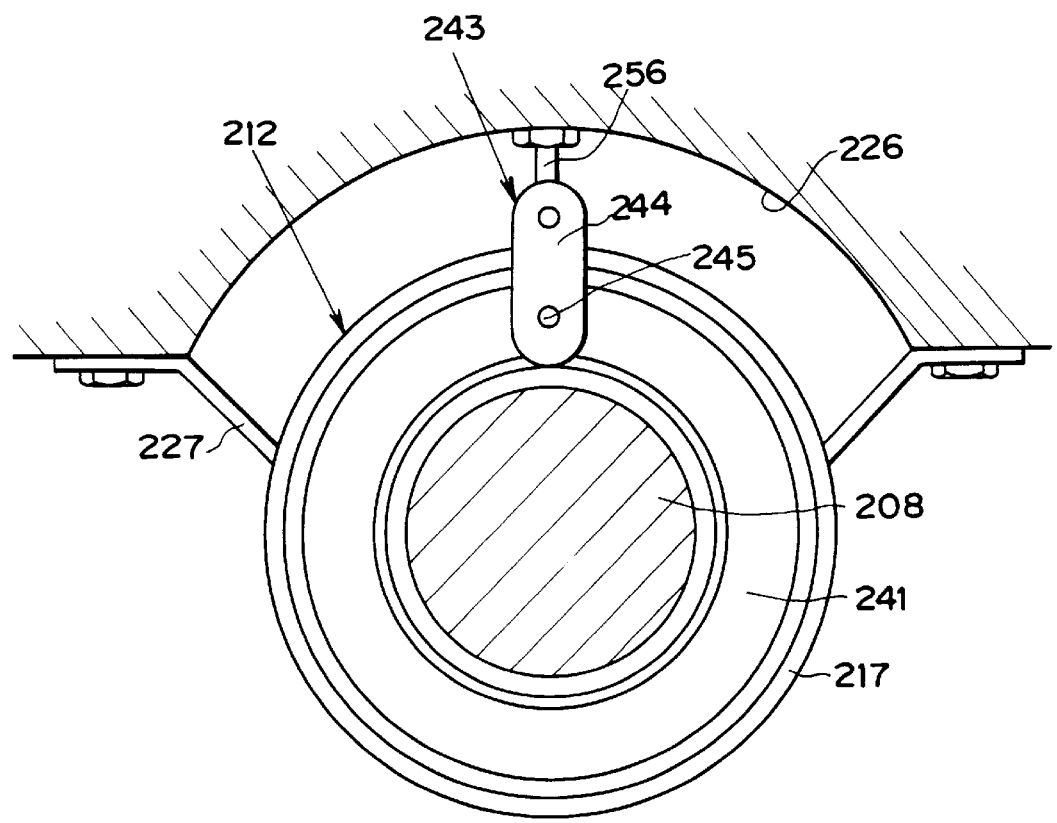
FIG. 22 is a righthand section taken along line XXII—XXII of FIG. 20 and shows the driving force transmission system of the invention.

Therefore, an object of the embodiment of FIGS. 20 to 22 is to make it possible to arrange the driving force transmission system of the type in a desired place of the vehicle without mounting it in the special case. Another object is to make it possible to arrange the driving force transmission system desirably midway of the propeller shaft of the four-wheel drive vehicle.

The embodiment of FIGS. 20 to 22 will be specifically described in the following. FIG. 20 shows one embodiment of the driving force transmission system 200 according to the invention. This driving force transmission system 200 is equipped with an electromagnet (or electromagnetic means) 201 for controlling the actions electromagnetically. This driving force transmission system 200 is arranged in a path for transmitting the driving force to the rear wheels in the four-wheel vehicle, as shown in FIG. 21.

In this vehicle, there is connected to the output side of an engine 202 a transaxle 203, which is equipped with the (not-shown) transmission and the (not-shown) transfer. A front differential 204 is arranged at the output side of the transaxle 203.

Moreover, the torque, as outputted from the engine 202, is transmitted through the transaxle 203 and the front differential 204 to two axle shafts 205 to drive two front wheels 206. On the other hand, a portion of the torque, as transmitted to the front differential 204, is further transmitted to a first propeller shaft 207.

The first propeller shaft 207 is connected through the driving force transmission system 200 to a second propeller shaft 208. When the first propeller shaft 207 and the second propeller shaft 208 are connected in a torque transmitting manner, the torque of the engine 202 is transmitted to a rear differential 209. The torque thus transmitted to the rear differential 209 is outputted to both axle shafts 210 to drive two rear wheels 211. In this vehicle, the first propeller shaft 207 constructs the drive shaft, and the second propeller shaft 208 constructs the driven shaft.

As shown in FIG. 20, moreover, the driving force transmission system 200 is equipped with an outer housing 212 acting as the outer rotary member, an inner shaft 213 acting as the inner rotary member, a main clutch mechanism 214, a pilot clutch mechanism 215 and a cam mechanism 216.

The outer housing 212 is equipped with a bottomed cylindrical outer case 217 on the axis A1, and an annular cover member 218 screwed in one end opening of the outer case 217 for covering the opening. The cover member 218 is made of a magnetic material. The inner shaft 213 is extended liquid-tight through the central portion of the cover member 218 into the outer case 217. On the other hand, the inner shaft 218 is arranged on the axis A1 and is so rotatably supported with its axial movement being restricted. A seal ring 219 is arranged between the inner shaft 213 and the cover member 218. A bushing 220 is also arranged between the inner shaft 213 and the cover member 218.

The first propeller shaft 207 is fixed in the leading end portion of the outer case 217 in the outer housing 212. Specifically, a stud bolt 217A is anchored in the end face of the outer case 217, and a nut 217B is screwed on the stud bolt 217A. In an internal bore 221 of the inner shaft 213, on the other hand, there is splined the second propeller shaft 208 in a torque transmitting manner.

Here will be described the construction of a support mechanism 222 for supporting the first propeller shaft 207. This support mechanism 222 is equipped with: a bearing (or an inner ring) 223 for supporting the first propeller shaft 207 rotatably; an annular outer ring 224 arranged outside of the bearing 223; a damping member 225 made of rubber and jointing the bearing 223 and the outer ring 224; and a bracket 227 fixed on the outer circumferences of the outer ring 224 and the damper 225 and fitted on the lower face of a vehicle body 226.

The main clutch mechanism 214 is of the multi-disc type equipped with a plurality of clutch discs 228 and a plurality of clutch plates 229. Each of these clutch plates 229 is splined at its outer circumference in the inner circumference of the outer case 217. In short, the clutch plates 229 are so assembled that they can rotate integrally with the outer case 217 and can move in the axial direction.

On the other hand, each clutch disc 228 is splined at its inner circumference to the outer circumference of the intermediate portion of the inner shaft 213. In short, the individual clutch discs 228 are so assembled that they can rotate integrally with the inner shaft 213 and can move in the axial direction.

Moreover, the individual clutch discs 228 and the individual clutch plates 229 are alternately arranged and are borne by an annular retainer 230 which is fitted in the bottom side of the outer case 217. The clutch discs 228 and the clutch plates 229 are brought into abutment against each other to establish their frictional engagement and away from each other to establish their released state.

On the inner circumference and the outer circumference of the retainer 230, there are fitted seal rings 231, by which the retainer 230 and the outer case 217 are sealed liquid-tight. On the inner circumference of the outer case 217, on the other hand, there is fitted a seal ring 232, by which the outer case 217 and the inner shaft 213 are sealed liquid-tight. On the outer circumference of the cover member 218, moreover, there is fitted a seal ring 233, by which the cover member 218 and the outer case 217 are sealed liquid-tight.

Moreover, the space, as defined by the outer case 217, the inner shaft 213 and the cover member 218, is sealed liquid-tight by the various seal rings 219, 231, 232 and 233 thereby to define a coupling oil chamber 234. In this coupling coil chamber 234, there are arranged the main clutch mechanism 214, the pilot clutch mechanism 215 and the cam mechanism 216. On the other hand, the coupling oil chamber 234 is filled with the (not-shown) oil.

The pilot clutch mechanism 215 is of an electromagnetic type equipped with a clutch discs 235, a plurality of clutch plates 236, an armature 237 and an electromagnetic coil 238. In the pilot clutch mechanism 215, the clutch disc 235 is splined at its inner circumference side in the outer circumference of a cam member 239. In short, the clutch disc 235 is so assembled that it can rotate integrally with the cam member 239 and can move in the axial direction.

On the other hand, each clutch plate 236 is splined at its outer circumferential side in the inner circumference of the outer case 217. The clutch disc 235 is sandwiched between the individual clutch plates 236. Thus, the individual clutch plates 236 are so assembled that they can rotate integrally with the outer case 217 and can move in the axial direction.

The armature ring 237 is formed into a ring shape and is arranged between a stopper ring 240 fixed on the outer case 217 and the clutch plate 236. Thus, the armature 237 is so assembled that it can move in the axial direction. On the other hand, the electromagnetic coil 238 is buried in a coil case 241 so that it is integrated with the coil case 241. The electromagnetic coil 238 and the coil case 241 construct the electromagnet 201.

This electromagnet 201 is arranged in an annular recess 242A formed in the outer side face of the cover member 218. Between the inner circumference of the coil case 241 and the cover member 218, moreover, there is arranged a bearing 242, by which the coil case 241 is so supported that it can rotate. By the bearing 242, moreover, the coil case 241 and the cover member 218 are positioned in the radial direction. In short, the air gaps E1 and F1, as formed between the inner and outer circumferences of the coil case 241 and the cover member 218, are set by the bearing 242.

As shown in FIGS. 20 and 22, on the other hand, the coil case 241 is fitted on the lower face side (or the outer side) of the vehicle body 226 by a fitting mechanism 243. This fitting mechanism 243 is composed of an elastic member 244 made of rubber, and two fitting bolts 245 and 256. These fitting bolts 245 and 256 are embedded in the elastic member 244. By screwing one fitting bolt 245 in the coil case 241 and by screwing the other fitting bolt 256 in the lower side of the vehicle body 226, moreover, the coil case 241 is fitted on the lower face of the vehicle body 226. Thus, the elastic member 244 is fitted after the individual fitting bolts 245 and 256 are screwed, so as to improve the assembly.

In the pilot clutch mechanism 215, a magnetic path is established among the cover member 218, the individual clutch plates 236, the clutch discs 235 and the armature 237 by energizing the electromagnetic coil 238. Then, the armature 237 is attracted toward the electromagnetic coil 238 by the magnetic induction. As a result, the armature 237 pushes the clutch disc 235 and the clutch plates 236 toward the cover member 218. As a result, the clutch disc 235 and the clutch plates 236 are brought into frictional engagement with each other.

The cam mechanism 216 is composed of the annular first cam member 239, an annular second cam member 257 and cam followers 258. The first cam member 239 is so assembled on the outer circumference of the inner shaft 213 that it can rotate. On the other hand, the clutch disc 235 is fitted at its inner circumferential side in the outer spline formed in the outer circumference of the first cam member 239. On the other hand, the second cam member 257 is so assembled on the outer circumference of the inner shaft 213 that it can rotate integrally therewith and move in the axial direction. Moreover, the second cam member 257 is arranged between the stopper ring 240 and the clutch plates 229 of the main clutch mechanism 214.

In the confronting faces of the first cam member 239 and the second cam member 257, on the other hand, there are formed numerous cam grooves 259 and 260 which are arranged at a predetermined spacing in the circumferential direction. Each of the cam grooves 259 and 260 generally has a V-shape so that the ball-shaped cam followers 258 are fitted between the cam grooves 259 and 269 confronting each other. In this state, the first cam member 239 is borne by the cover member 218 through a needle bearing 261, and the second cam member 257 is borne by the clutch plate 229 through a needle bearing 262.

As a result, when the two cam members 239 and 257 of the cam mechanism 216 rotate relative to each other the second cam member 257 is moved leftward of the Drawing by the actions between the two cam grooves 259 and 260 and the cam followers 258. Then, the clutch discs 228 and the clutch plates 229 of the main clutch mechanism 214 are pushed by the second cam member 257 so that they come into frictional engagement with each other.

Here will be described the correspondence between the embodiment of FIGS. 20 to 22 and the construction of the invention. Specifically: the outer housing 212 and the cover member 218 correspond to the first rotary member of the invention; the inner shaft 213 corresponds to the second rotary member of the invention; the cover member 218 corresponds to the magnetic member of the invention; and the vehicle body 226 corresponds to the stationary member of the invention. On the other hand, the fitting mechanism 243 corresponds to the rotation stopping mechanism, the positioning mechanism and the support mechanism of the invention. Moreover, the first propeller shaft 207 corresponds to the drive shaft of the invention, and the second propeller shaft 208 corresponds to the driven shaft of the invention.

The driving force transmission system 200 thus constructed is attached at its outer housing 212 to the first propeller shaft 207, for example, as shown in FIG. 21. On the other hand, the inner shaft 213 is attached to the second propeller shaft 208 thereby to act as the device for transmitting the driving force to the rear wheels 211 of the four-wheel drive vehicle.

In the driving force transmission system 200, the pilot clutch mechanism 215 is inactive at its cam mechanism 216 and main clutch mechanism 214 when the electromagnetic coil 238 of the pilot clutch mechanism 215 is in the deenergized state. As a result, the torque, as transmitted from the first propeller shaft 207 to the outer housing 212, is not transmitted to the inner shaft 213 and the second propeller shaft 208.

When the electromagnetic coil 238 of the pilot clutch mechanism 215 is energized, the armature 237 is attracted toward the electromagnetic coil 238 by the electromagnetic attraction. As a result, the armature 238 pushes the clutch disc 235 and the clutch plates 236 toward the cover member 218 thereby to bring the clutch disc 235 and the clutch plates 236 into frictional engagement with each other.

As a result, a relative rotation occurs between the first cam member 239 and the second cam member 257 composing the cam mechanism 216. Then, the second cam member 257 is pushed toward the main clutch mechanism 214 by the actions of the two cam grooves 259 and 260 and the cam followers 258. As a result, the frictional engagement is established between the clutch discs 228 and the clutch plates 229 of the main clutch mechanism 214. As a result, the torque, as transmitted from the first propeller shaft 207 to the outer housing 212, is further transmitted through the clutch discs 228 and the clutch plates 229 to the inner shaft 213 and the second propeller shaft 208.

In these actions, the frictional applying force for the pilot clutch mechanism 215 uses in proportion to the current value which is fed to the electromagnetic coil 238. In response to the increase in the current value, moreover, the pushing force to be generated in the cam mechanism 216 increases, and the frictional applying force for the main clutch mechanism 214 increases so that the torque to be transmitted from the outer housing 212 to the main shaft 213 gradually rises.

Here, the driving force transmission system 200 is constructed such that the electromagnetic coil 238 is rotatably assembled, while being buried in the coil case 241, in the cover member 218 of the outer housing 21 and is fixed on the lower face (or the outer side) of the vehicle body 226. As a result, the driving force transmission system 200 can be arranged, as it is, in a desired place of the vehicle without being housed in any special case and without deteriorating its driving force transmitting function.

On the other hand, the electromagnetic coil 238 is fixed in an arbitrary place through the elastic member 244. As a result, this elastic member 244 absorbs or damps the vibration at the side of the vehicle body 226 thereby to prevent any adverse affect on the assembled position of the coil case 241 in the driving force transmission system 200.

Thus, the driving force transmission system 200 can be arranged midway of the propeller shaft by connecting the outer housing 212 to the first propeller shaft 207 and the inner shaft 213 to the second propeller shaft 208. As a result, the driving force transmission system 200 can be mounted without any special case and without any change in the transfer or the differential, thereby to make the four-wheel drive vehicle compact.

In the driving force transmission system 200, moreover, the air gaps E1 and F1 are set by the single bearing 242 which is arranged between the cover member 218 and the electromagnet 201. Here, the bearing 242 is intrinsically give a sizing accuracy capable of accurately setting the relative positions in the axial direction between the member to be mounted and the support member so that the setting accuracy of the air gaps E1 and F1 is improved to a level as high as possible. As a result, the applying force for the main clutch mechanism 214, that is, the torque capacity is easily controlled to improve the transmission performance of the driving force.

Figure 23:
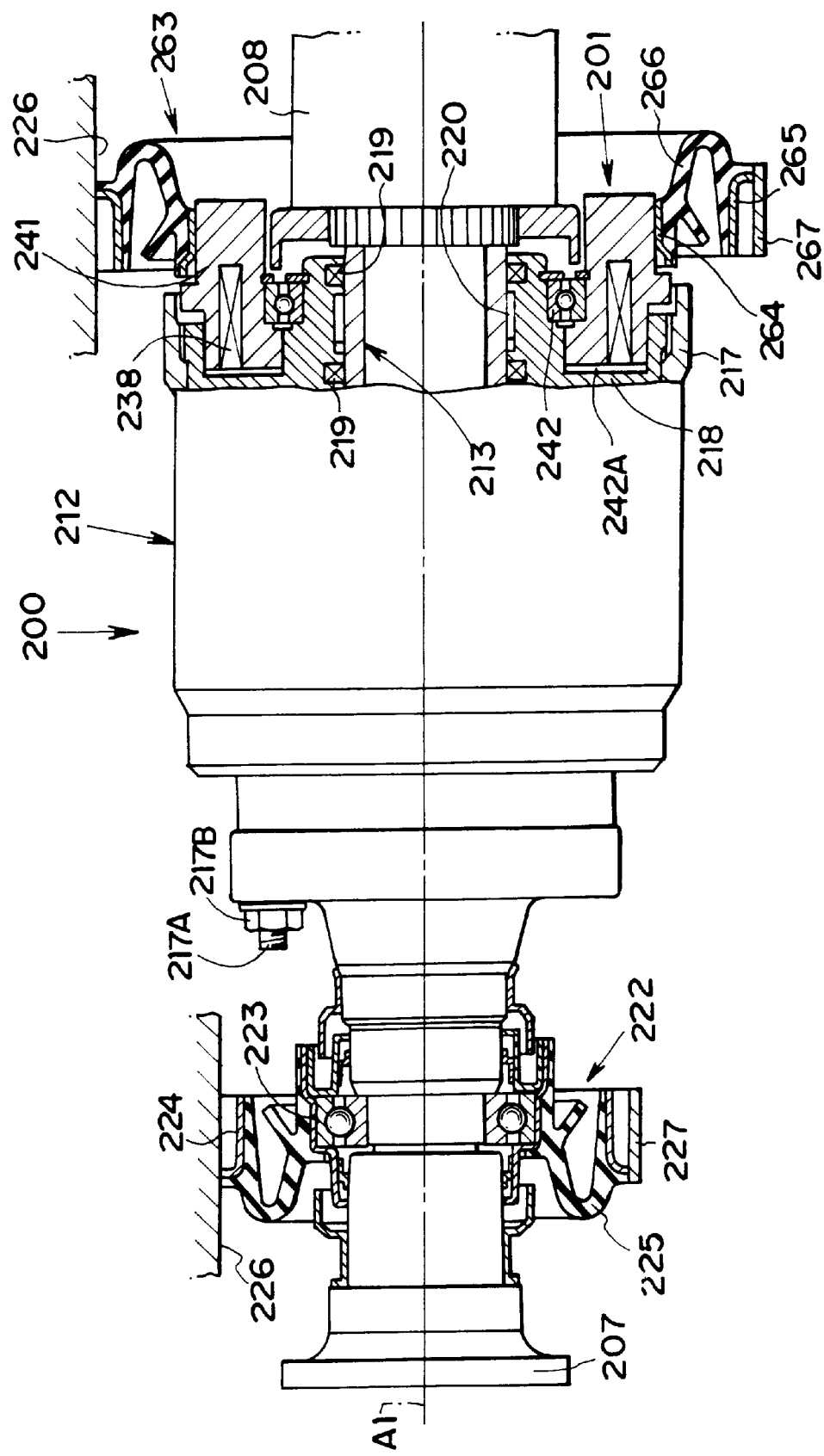
FIG. 23 is a longitudinal front section showing a portion of still another embodiment of the driving force transmission system of FIG. 20, in which the coil case of an electromagnet is fitted by another fitting mechanism.

FIG. 23 shows an example of the driving force transmission system 200, in which the coil case 241 having the electromagnetic coil 238 buried therein is fitted on the lower face (or the outer side) of the vehicle body 226 by adopting another fitting mechanism 263. This fitting mechanism 263 is made substantially identical to the support mechanism 222 supporting the first propeller shaft 207. The fitting mechanism 263 and the support mechanism 222 are given different radial sizes.

Specifically, the fitting mechanism 263 is equipped with: an inner ring 264 fixed on the outer circumference of the coil case 241; an annular outer ring 265 arranged outside of the inner ring 264; a damping member 266 made of rubber and jointing the inner ring 264 and the outer ring 265; and a bracket 267 fixed on the outer circumferences of the outer ring 265 and the damping member 266 and fitted on the lower face (or the outer side) of the vehicle body 226. By the fitting mechanism 263, moreover, the electromagnet 201 is positioned in the radial direction and stopped in rotation. The remaining construction is similar to that of the embodiment of FIGS. 13 to 15.

Here will be described the correspondence between the embodiment of FIG. 23 and the construction of the invention. Specifically, the fitting mechanism 263 corresponds to the rotation stopping mechanism, the positioning mechanism and the support mechanism of the invention. In the embodiment of FIG. 23, moreover, there can be achieved effects similar to those of the embodiment of FIGS. 20 to 22.

Figure 24:
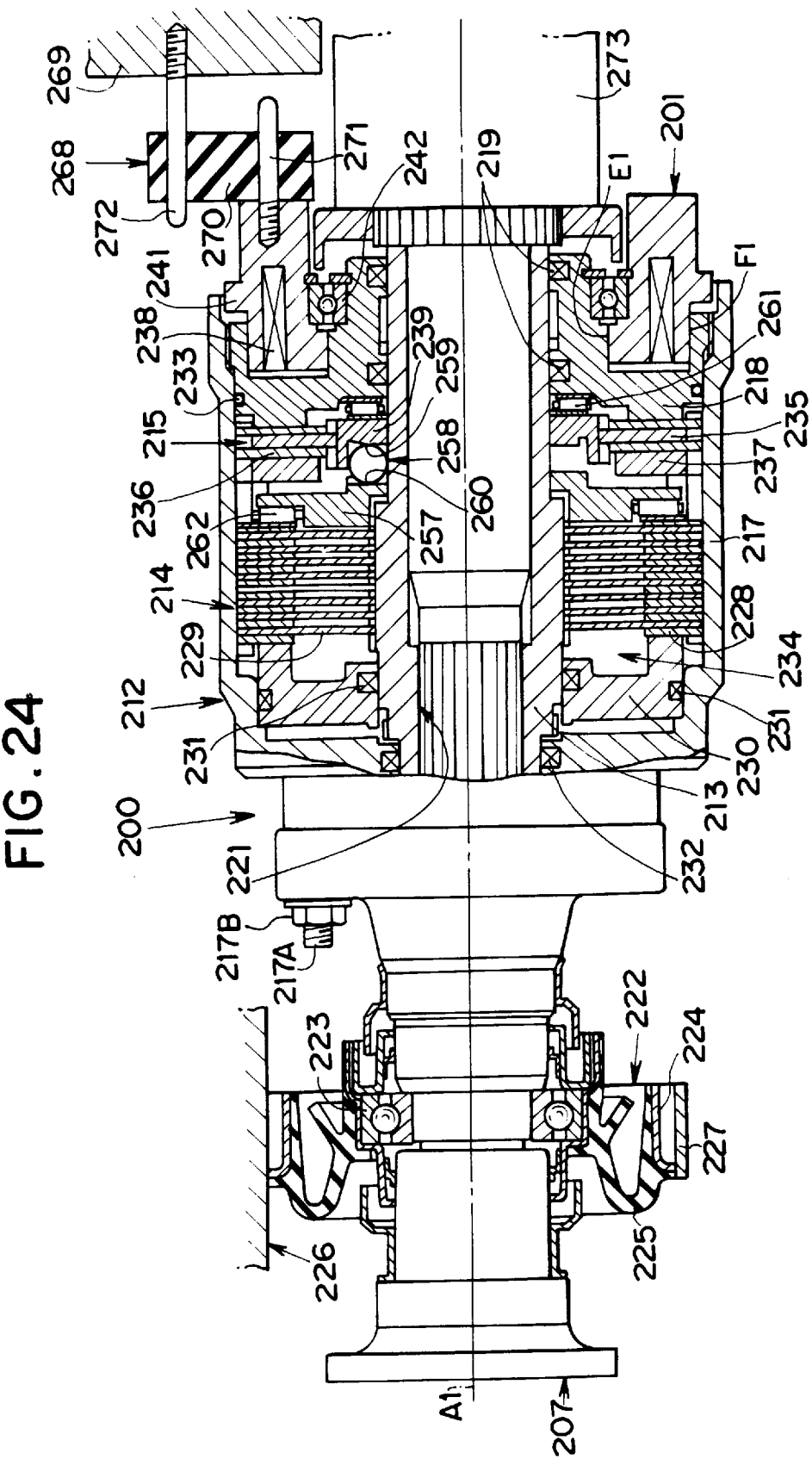
FIG. 24 is a longitudinal front section showing still another embodiment of the driving force transmission system of FIG. 20, in which the coil case of the electromagnet is fitted by still another fitting mechanism.

FIG. 24 shows an example of the driving force transmission system 200, in which the coil case 241 having the electromagnetic coil 238 buried therein is fitted outside of a differential carrier 269 of the four-wheel drive vehicle through a fitting mechanism 268. This fitting mechanism 268 has a construction similar to that of the fitting mechanism 243 shown in FIGS. 20 and 22.

Specifically, the fitting mechanism 268 is composed of an elastic member 270 made of rubber, and two bolts 271 and 272. Each of these fitting bolts 271 and 272 is embedded in the elastic member 270. By screwing the fitting bolt 271 on the outer end face of the coil case 241 and by screwing the fitting bolt 272 on the outer wall of the differential carrier 269, moreover, the coil case 241 is fitted on the outer side of the differential carrier 269. Here in this embodiment, a drive pinion shaft 273, as arranged in the differential carrier 269, is splined at its leading end to the internal bore 221 of the inner shaft 213.

Here will be described the correspondence between the embodiment of FIG. 24 and the construction of the invention. Specifically, the fitting mechanism 268 corresponds to the rotation stopping mechanism, the positioning mechanism and the support mechanism of the invention, and the differential carrier 269 corresponds to the stationary member of the invention. In the embodiment of FIG. 24, moreover, there are achieved effects similar to those of the embodiment of FIGS. 20 to 22.

Although not especially shown, the coil case may be fixed on the body side or the differential carrier by a fitting mechanism having a construction different from that of the fitting mechanism shown in FIGS. 20, 23 and 24, as the fitting mechanism for supporting the electromagnet. In this case, too, there are achieved effects similar to those of the case in which the fitting mechanism shown in FIGS. 20, 23 and 24 is adopted.

Figure 25:
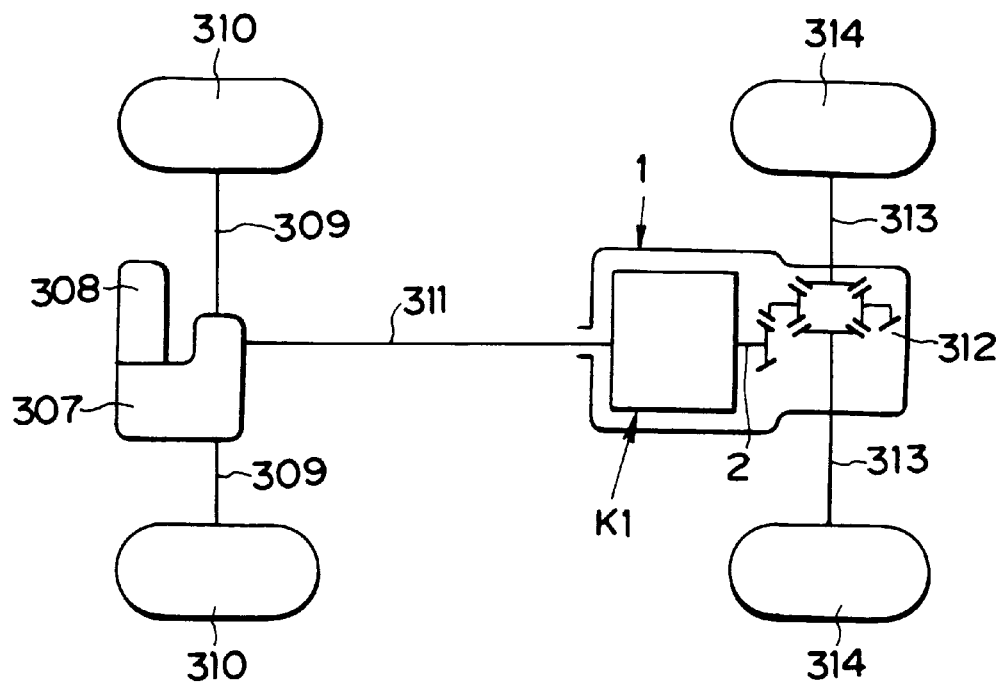
FIG. 25 is a skeleton diagram showing a vehicle, on which a driving force transmission system according to the invention is mounted.

Here, the driving force transmission system K1, as shown in FIGS. 6 and 7 or FIGS. 12 and 13, is arranged in the path for transmitting the driving force to the rear wheels of the four-wheel drive vehicle, for example, as shown in FIG. 25.

In this four-wheel drive vehicle, the transmission, the transfer and the front differential are integrally assembled in a transaxle 307. Specifically, the driving force of an engine 308 is outputted through the transaxle 307 to two axle shafts 309 to drive right and left front wheels 310 and further to a propeller shaft 311. This propeller shaft 311 is connected through the driving force transmission system K1 to a rear differential 312. When the propeller shaft 311 and the rear differential 312 are connected in a torque transmitting manner, the driving force of the propeller shaft 311 is transmitted to the rear differential 312 and is outputted from the differential 312 to two axle shafts 313 to drive right and left rear wheels 314.

The driving force transmission system K1 is housed together with the rear differential 312 in the differential carrier 1 and is supported through the differential carrier 1 by the vehicle body.

Figure 26:
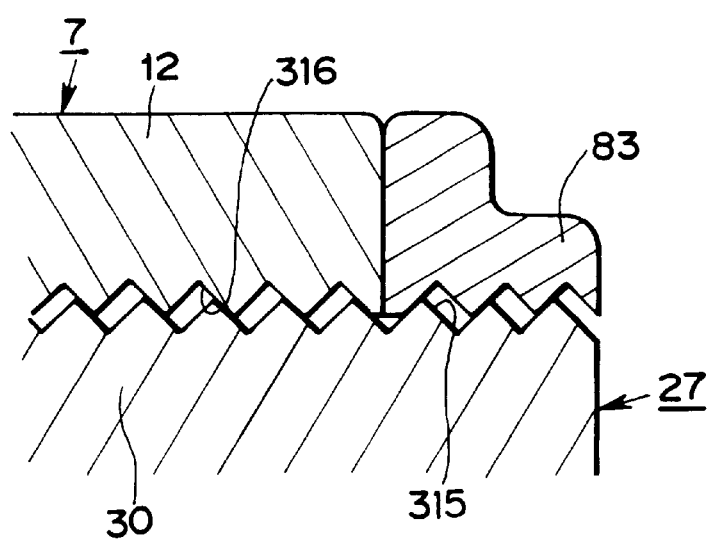
FIG. 26 is a section showing a portion of the state in which a coupling case and a rotor of the driving force transmission system according to the invention are screwed.

FIG. 26 is an enlarged section showing the joint portion between the coupling case 7 and the rotor 27 in the embodiment of FIGS. 6 and 7 or FIGS. 12 and 13. Specifically, the outer cylindrical portion 30 is externally threaded at 315 in the outer circumference of its rear end, and the nut member 83 is so screwed on the externally threaded portion 315 as to move back and forth. The nut member 83 fastens the coupling case 7 from the rear end side to force an internally threaded portion 316 in the inner circumference of the diametrically larger cylindrical portion 12 onto the externally threaded portion 315 thereby to eliminate the looseness between the two threaded portions 315 and 316. The remaining construction is similar to that of the embodiment of FIGS. 6 and 7 or FIGS. 12 and 13.

In the driving force transmission system K1, moreover, the rotor 27, the clutch plates 54, the clutch discs 55 and the coupling case 7 to contact with the amateur 51, through which the magnetic path is formed when the electromagnet 35 is energized, are made of a non-magnetic material. As a result, the magnetic flux to establish the magnetic path will neither leak from the coupling case 7 nor reduce its density. As a result, the electromagnetic force to be established by the electromagnet 35, that is, the current efficiency can be increased to improve the action efficiency for the pilot clutch 49 over that of the driving force transmission system of this type of the prior art.

In the driving force transmission system K1, on the other hand, the coupling case 7 is made of an aluminum alloy, and the rotor 27 is made of a magnetic material such as iron. As a result, the first rotary member can be lightened to reduce the weight of the driving force transmission system K1 itself.

On the other hand, the driving force transmission system K1 is constructed by screwing the nut member 38 back and forth on the outer circumference of the rear end portion of the rotor 27 and by fastening the coupling case 7 from the rear end side by the nut member 38. As a result, the looseness, as might otherwise be caused by the screwed relation between the coupling case 7 and the rotor 27, can be eliminated to hold the air gaps E1 and F1 between the rotor 27 and the iron core 36 always at constant values. As a result, the fluctuation, as might otherwise be caused due to the fluctuation in the air gaps E1 and F1, in the magnetic flux density is suppressed to make constant the force to attract the armature 51. In the pilot clutch 49, therefore, a stable frictional applying force is achieved to improve the controllability of the pilot clutch 49.

Here, the backward lifting force to act on the propeller shaft 311 is transmitted to the coupling case 7, the rotor 27 and the iron core 36. However, this lifting force is absorbed by the conical spring 68 which is interposed between the iron core 36 and the differential carrier 1. On the other hand, no looseness is caused in the screwed portion between the coupling case 7 and the rotor 27 which are present in the transmission path for the lifting force.

In the driving force transmission system K1, on the other hand, between the coupling case 7 and the shaft 20, there are interposed the main clutch 50 for transmitting, when frictionally applied, the torque between the coupling case 7 and the shaft 20, and the electromagnetic type pilot clutch 49 to be frictionally applied when activated by the power supply. Further provided is the cam mechanism which is interposed between the main clutch 50 and the pilot clutch 49 for converting the frictional applying force of the pilot clutch 49 into the force for pushing the main clutch 50. As a result, the frictional applying force of the pilot clutch 50 can be smoothly transmitted through the cam mechanism to the main clutch 50. As a result, the main clutch 50 can be sufficiently frictionally applied to increase the torque to be transmitted between the coupling case 7 and the shaft 20, thereby to improve the driving force transmission characteristics of the driving force transmission system K1.

Figure 27:
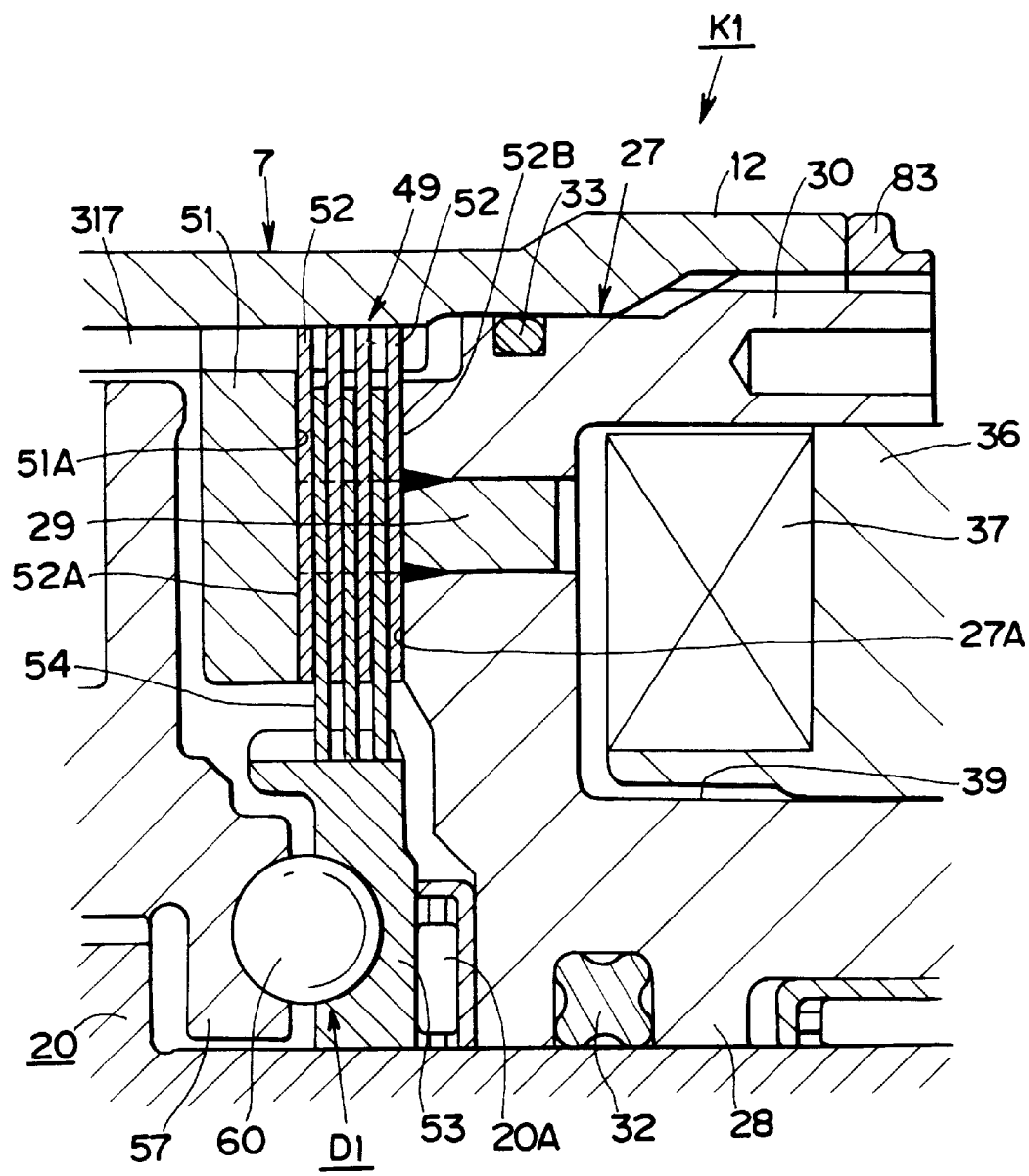
FIG. 27 is a section showing a portion of a pilot clutch constructing the driving force transmission system of the invention.

FIG. 27 is an enlarged section showing a portion of another embodiment of the driving force transmission system KI which is shown in FIGS. 6 and 7 or FIGS. 12 and 13. This embodiment of FIG. 27 is mounted in the state, as shown in the embodiment of FIG. 25, on the vehicle.

Specifically, in the driving force transmission system K1, the pilot clutch 49 is equipped with the three clutch plates 54 and the four clutch discs (or plates) 52. Here, one clutch disc 52 confronts the armature 51, and one clutch disc 52 confronts the rotor 27.

The armature 51 and the clutch disc 52 confronting the former are fitted like the armature 5 line spline 317 formed in the coupling case 7. In short, the armature 51 and the clutch disc 52 are so assembled in the coupling case 7 that they can rotate integrally with each other. On the other hand, the clutch disc 52 confronting the rotor 27 is also fitted in the spline 317 of the coupling case 7. In short, the clutch disc 52 is so assembled with the coupling case 7 that it can rotate integrally not only with the coupling case 7 but also the rotor 27.

Figure 28:
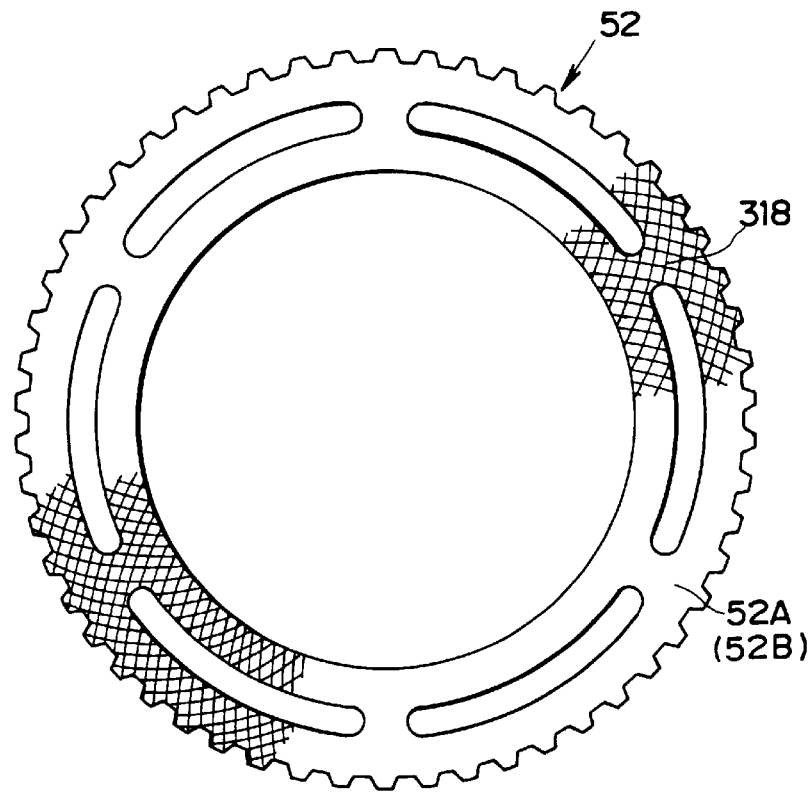
FIG. 28 is a side elevation showing a clutch disc constructing the pilot clutch shown in FIG. 27.

FIG. 28 is a side elevation showing both the clutch disc 52 confronting the armature 51 and the clutch disc 52 confronting the rotor 27. A number of oil discharging grooves 318 extending curvilinearly are formed in net shapes all over both a confronting face 52A of the clutch disc 52 confronting the armature 51 and a confronting face 52B of the clutch disc 52 confronting the rotor 27. The remaining construction is similar to that of the embodiment of FIGS. 6 and 7 or FIGS. 12 and 13. As in these embodiments, moreover, the pilot clutch 49 is controlled by the electromagnet 35.

Here will be described the correspondence between the construction of the embodiment of FIG. 27 and the construction of the invention. Specifically, the rotor 27 corresponds to the magnetic path forming member, and the oil seal 34 corresponds to the other member. Moreover, the rotor 27 corresponds to the side wall of the invention.

In the driving force transmission system K1 shown in FIG. 27, the clutch disc 52 of the pilot clutch 49 confronting the armature 51 is constructed to rotate integrally with the armature 51, and the clutch disc 52 confronting the rotor 27 is constructed to rotate integrally with the rotor 27. Moreover, the numerous oil discharging grooves 318 are formed all over the confronting faces 52A and 52B of the individual clutch discs 52 confronting the armature 51 or the rotor 27.

As a result, the cutting of the oil film between the clutch disc 52 and the armature 51 or between the clutch disk 52 and the rotor 27 is promoted. This suppresses a reduction, as might otherwise be caused by the formation of the oil film, in the action responsiveness of the pilot clutch 49.

In the driving force transmission system K1, the oil discharging grooves 318 are formed in the confronting faces 52A and 52B of the individual clutch discs 52, but may be formed in either a confronting face 51A of the armature 51 or a confronting face 27A of the rotor 27 confronting each clutch disc 52.

On the other hand, the driving force transmission system K is constructed to comprise: the main clutch 50 interposed between the coupling case 7 and the shaft 20 for transmitting, when frictionally applied, the torque between the coupling case 7 and the shaft 20; the electromagnetic type pilot clutch 49 to be activated and frictionally applied when energized; and the cam mechanism interposed between the main clutch 50 and the pilot clutch 49 for converting the frictional applying force of the pilot clutch 49 into the force for pushing the main clutch 50. As a result, the frictional applying force of the pilot clutch 49 can be smoothly transmitted through the cam mechanism to the main clutch 50.

As a result, the main clutch 50 can be sufficiently frictionally applied to increase the torque to be transmitted between the coupling case 7 and the shaft 20. Thus, it is possible to improve the driving force transmission characteristics of the driving force transmission system KI.

Figure 29:
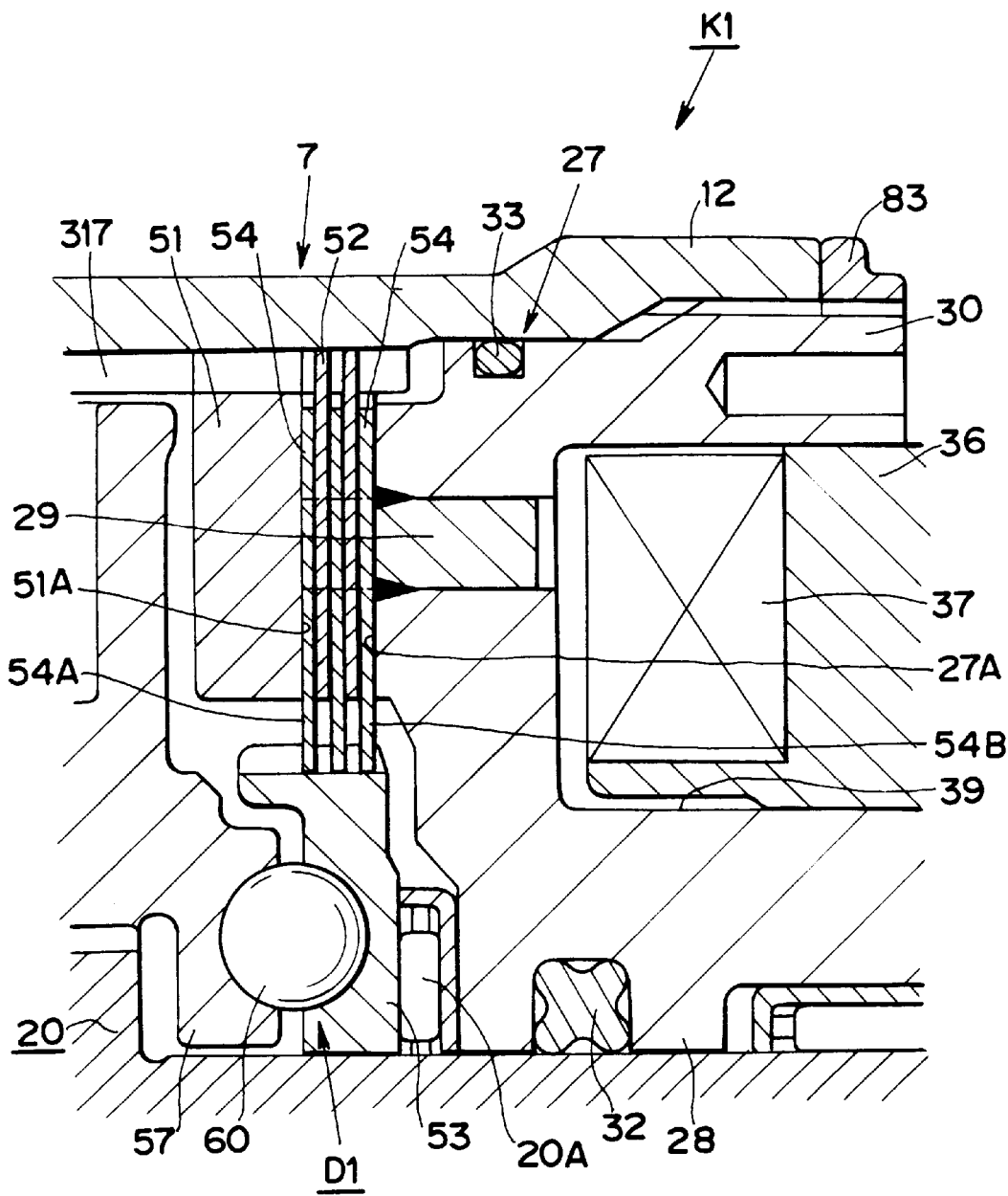
FIG. 29 is a section showing a portion of a driving force transmission system according to still another embodiment of the invention.

FIG. 29 shows a modification of the construction of the pilot clutch 49 of the driving force transmission system K1. The pilot clutch 49, as shown in FIG. 29, is similar to the pilot clutch 49 of FIG. 27 in that it is equipped with the electromagnet 35 and the armature 51. However, the difference from the pilot clutch 49 shown in FIG. 27 resides in that the pilot clutch 49 is composed of the three clutch plates 54 and the two clutch discs 52, in that one clutch plate 54 is so assembled with the cam 53 as to confront the armature 51, and in that one clutch plate 54 is so assembled with the cam 53 as to confront the rotor 27.

Figure 30:
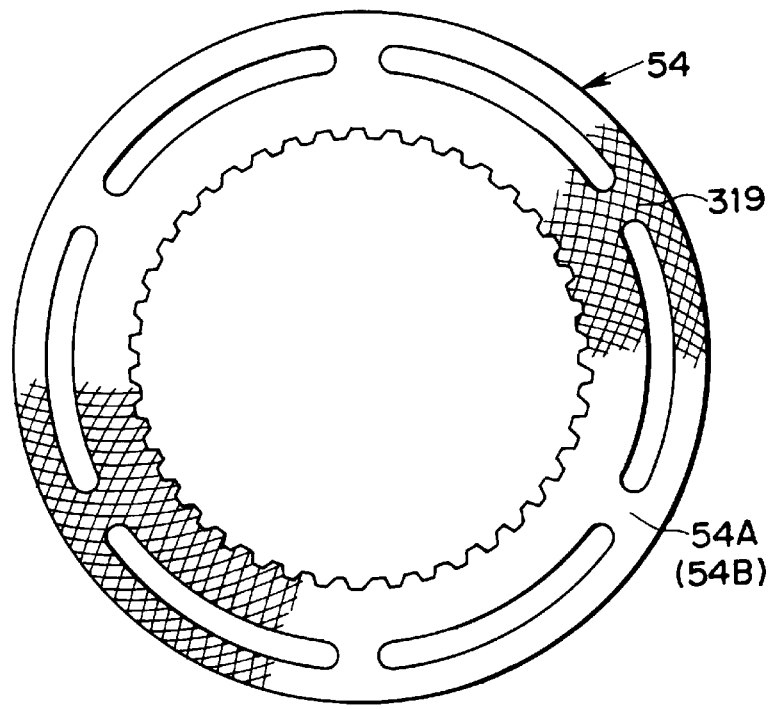
FIG. 30 is a section showing a portion of another construction of the pilot clutch shown in FIG. 29.

In the embodiment of FIG. 29, therefore, the clutch plate 54 and the armature 51 rotate relative to each other, and the clutch plate 54 and the rotor 27 rotate relative to each other. Moreover, oil discharging grooves 319 are formed in net shapes, as shown in FIG. 30, all over both a confronting face 54A of the clutch plate 54 confronting the armature 51 and a confronting face 54B of the clutch plate 54 confronting the rotor 27.

On the other hand, the confronting face 51A of the armature 51 confronting the clutch plate 54 and the confronting face 27A of the rotor 27 confronting the clutch plate 54 are nitrided. Thus, these confronting faces 51A and 27A are given high hardness, wear resistance and corrosion resistance.

The driving force transmission system K1, as shown in FIG. 29 to have the pilot clutch 49 thus constructed, acts like the driving force transmission system K1, as shown in FIG. 27 to have the pilot clutch 49, to achieve similar effects. On the other hand, the embodiment of FIG. 29 achieves the following effects.

In the pilot clutch 49 shown in FIG. 29, more specifically, the clutch plate 54 confronting the armature 51 can rotate relative to the armature 51, and the clutch plate 54 confronting the rotor 27 can rotate relative to the rotor 27. On the other hand, the oil discharging grooves 319 are formed in the confronting faces 54A and 54B of the individual clutch plates 54 confronting the armature 51 or the rotor 27. As a result, the cutting of the oil film between the clutch plate 54 and the armature 51 or between the clutch plate 54 and the rotor 27 can be promoted to prevent a reduction, as might otherwise be caused by the formation of the oil film, in the action responsiveness of the pilot clutch 49. Moreover, the armature 51 and the rotor 27 can retain a function similar to that of the clutch disc 54 of the pilot clutch 49. As a result, the pilot clutch 49 can be made compact.

Figure 31:
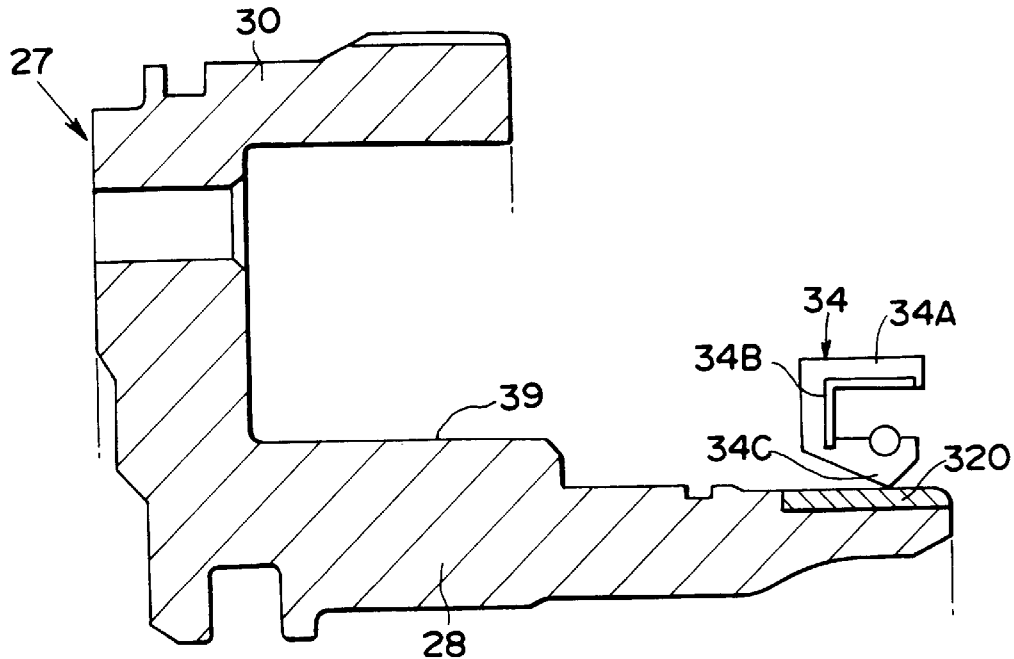
FIG. 31 is a partially omitted section showing a rotor or a magnetic path establishing member constructing a first rotary member of the driving force transmission system.

FIG. 31 is an enlarged section showing the rotor 27 (or the side wall) shown in FIGS. 27 and 29.

The rotor 27 is made of a low-carbon magnetic material such as an iron material containing 0.1 to 0.2 wt. % of carbon. On the other hand, the outer circumference of the inner cylindrical portion 28, with which the seal lip 340 of the oil seal 34 is to come into contact, that is, a sliding portion 320 of the oil seal 34 is hardened on its surface. More specifically, the surface hardening treatment to be applied to the sliding portion 320 includes both the carburizing treatment and the quenching treatment. More specifically, the surface of the sliding portion 320 is hardened by carburizing only the surface and by heating and induction-hardening it. Alternatively, the surface is hardened by carburizing the whole surface of the rotor 27, by machining the carburized surface portion excepting the sliding portion 320 and by quenching the portion left unmachined. By the carburization, the carbon content of the sliding portion 320 is at 0.35 to 2.0 wt. %.

The rotor 27 for establishing the magnetic path between the electromagnet 35 and the armature 51 when the coil 37 of the electromagnet 35 shown in FIG. 27 or 29 is energized is made of a low-carbon magnetic material in the embodiment of FIG. 31. On the other hand, the sliding portion 320 of the rotor 27 with the oil seal 34 is treated at its surface to a high hardness. This gives the rotor 27 a high magnetic permeability as a whole and a low coercive force. On the other hand, the rotor 27 has a hard surface only at the sliding portion 320, as requiring a high hardness, so that it has excellent heat resistance and corrosion resistance.

In the embodiment of FIG. 31, therefore, the rotor 27 can retain the low coercive force and a high hardness at its portion to contact with the oil seal 34. More specifically, when the feed of the electric current to the coil 37 of the electromagnet 35 is interrupted, the magnetic path, as formed in the rotor 27, promptly disappears to eliminate the response delay in the interruption of the magnetic path. As a result, when the feed of the electric current to the coil 37 is interrupted, the pilot clutch 49 quickly stops its action thereby to interrupt the torque transmission between the coupling case 7 and the shaft 20.

In this embodiment, on the other hand, the magnetic path forming member is constructed of the rotor 27 which is screwed in the opening of the rear end of the coupling case 7 to cover that opening. As a result, the rotor 27 can be given characteristics to have a high magnetic permeability and a low coercive force thereby to facilitate the surface hardening treatment of only the sliding portion 320. The remaining effects are similar to those of the embodiment of FIG. 26 or 27.

Figure 32:
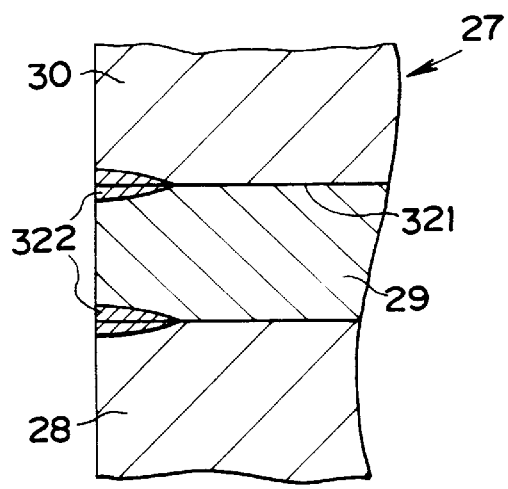
FIG. 32 is a section showing a portion of the state in which the components of the rotor composing the driving force transmission system are jointed to each other by an electron-beam welding.

FIG. 32 is an enlarged section showing another embodiment of the rotor 27 of the driving force transmission system KI shown in FIGS. 6 and 7 or FIGS. 12 and 13. This embodiment is applied to the driving force transmission system K1 shown in FIG. 25.

The rotor 27 is composed of the inner cylindrical portion 28 and the outer cylindrical portion 30 made of a magnetic material, and the shielding member 29 made of a non-magnetic material. Specifically, this shielding member 29 is a cylindrical member made of stainless steel and inserted in an annular hole 321 formed between the inner cylindrical portion 28 and the outer cylindrical portion 30. At the open end portion of the annular hole 321, moreover, welded portions 322 are formed by welding the boundary between the inner cylindrical portion 28 and the shielding member 29 and the boundary between the outer cylindrical portion 30 and the shielding member 29. In short, the inner cylindrical portion 28, the outer cylindrical portion 30, and the shielding member 29 are firmly jointed by the two welded portions 322. Here, the electron-beam welding method is adopted for welding the boundary between the inner cylindrical portion 28 and the shielding member 29 and the boundary between the outer cylindrical portion 30 and the shielding member 29. The remaining construction is similar to that of the embodiment of FIGS. 6 and 7 or FIGS. 12 and 13.

Here will be described the correspondence between the construction of the embodiment of FIG. 32 and the construction of the invention. Specifically: the rotor 27 corresponds to the rear housing of the invention; the inner cylindrical portion 28 and the outer cylindrical portion 30 correspond to the main portion of the invention; and the shielding member 29 corresponds to the annular portion of the invention.

Figure 33:
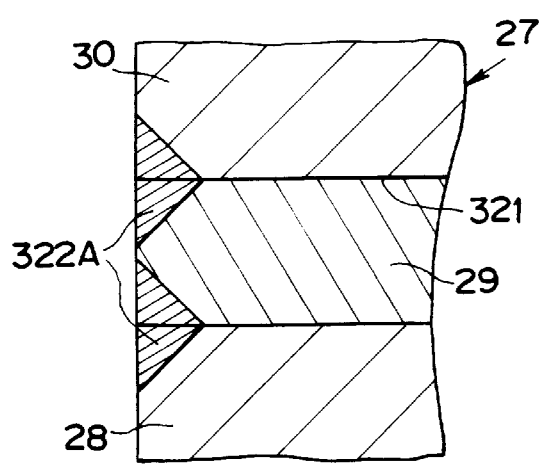
FIG. 33 is a section showing a portion of a comparison of the state in which the components of the rotor are jointed by another welding means.

FIG. 33 is an enlarged section showing a comparison of the case in which welded portions 322A are formed by welding the inner cylindrical portion 28 and the outer cylindrical portion 30, and the shielding member as shown in FIG. 32, by the ordinary plasma or gas welding method.

Here will be made the comparison between the two welded portions 322 and 322A shown in FIGS. 32 and 33. The welded portions 322, as formed by the electron-beam welding method, are narrow and deeper, whereas the welded portions 322A, as formed by the plasma or gas welding method, are wider in the radial direction and shallower in the axial direction. As a result, the rotor 27 having adopted the electron-beam welding method is less influenced by the magnetic permeability from the welded portions 322 so that it can suppress the difference in the magnetic attraction for the armature 51 in every products and can retain a sufficient welding depth thereby to improve the joint strength. The remaining effects are similar to those of FIG. 26 or 27.

Figure 34:
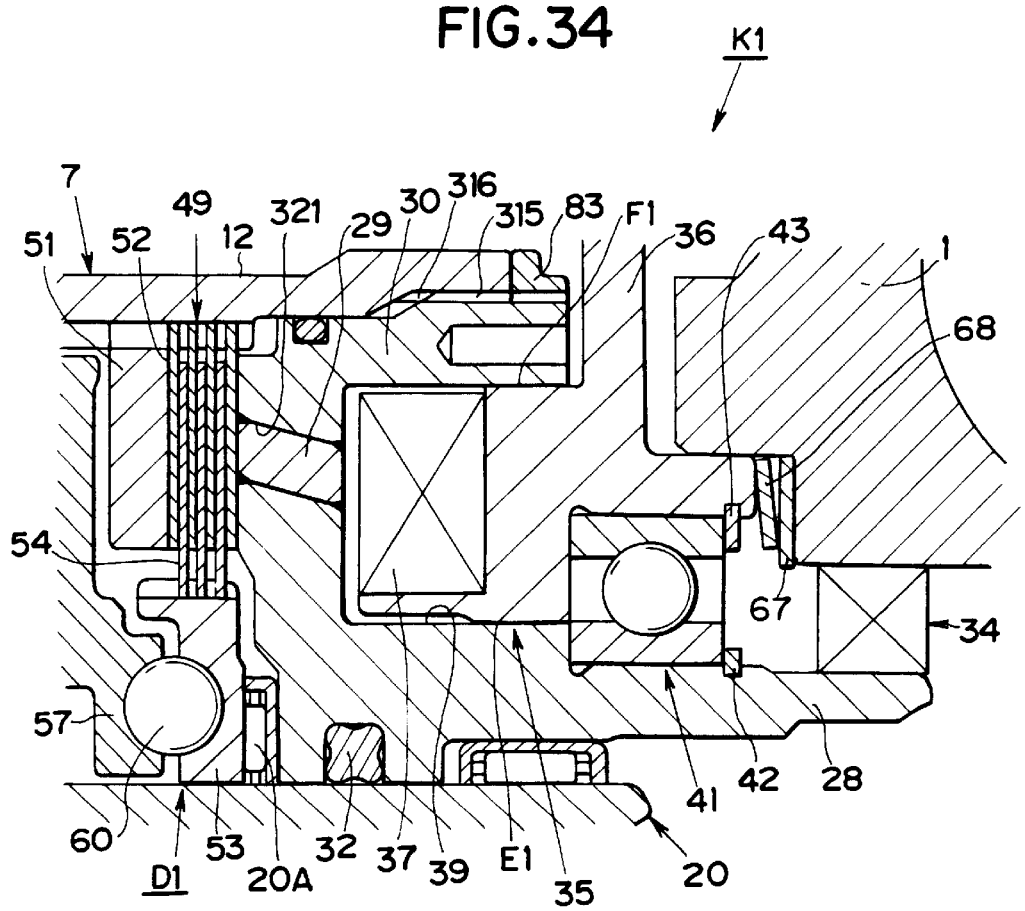
FIG. 34 is an enlarged section showing still another embodiment of the driving force transmission system.

FIG. 34 is a section showing still another embodiment of the rotor 27. The shielding member 29 of the rotor 27 is made of a conical cylinder of stainless steel. This shielding member 29 is inserted in the conical annular hole 321 formed in an intermediate portion between the inner cylindrical portion 28 and the outer cylindrical portion 30. Moreover, the boundaries between the inner cylindrical portion 28 and the outer cylindrical portion 30, and the shielding member 29 are joined by adhesion means using an adhesive or by caulking means. In this joint structure, the outer circumference and inner circumference of the shielding member 29, the inner circumference of the outer cylindrical portion 30 and the outer circumference of the inner cylindrical portion 28 are tapered from the side of the armature 51 to the side of the coil 37. As a result, when the pilot clutch 49 is applied to push the cam member 53 toward the rotor 27, the inner cylindrical portion 28 is pushed to bite in a wedge shape into the inner circumference of the shielding member 29 by the axial force acting on the inner cylindrical portion 28 through the thrust bearing 20A. By this pushing force, on the other hand, the shielding member 29 is pushed to bite into the inner circumference of the outer cylindrical portion 30.

The remaining construction is similar to that of FIG. 26 or 27 to provide effects similar to those of FIG. 26 or 27. In the embodiment of FIG. 34, on the other hand, no welding means is adopted for jointing the inner cylindrical portion 28 and the outer cylindrical portion 30, and the shielding member 29. In short, there is eliminated the welding portion such as the rotor 27 of the driving force transmission system K1, as shown in FIG. 32. As a result, the influence of the magnetic permeability to be caused by the welding portion can be eliminated to prevent the difference in the magnetic attraction for the armature 51 in every products. In the rotor 27 of FIG. 34, on the other hand, the inner cylindrical portion 28 and the outer cylindrical portion 30, and the shielding member 29 are jointed by the wedge actions. As a result, the joint strengths between the inner cylindrical portion 28 and the outer cylindrical portion 30, and the shielding member 29 can be further improved.

In the driving force transmission system KI of FIG. 34, on the other hand, the first rotary member is constructed of the coupling case 7 made of an aluminum alloy, and the rotor 27 screwed in the inner circumference of the rear end opening of the coupling case 7 and molded of a material such as iron. Moreover, no welding means is adopted for jointing the coupling case 7 and the rotor 27, and the components of the rotor 27 itself. As a result, the facilities or working time periods accompanying the welding works can be eliminated to lower the cost for manufacturing the driving force transmission system K1.

Figure 35:
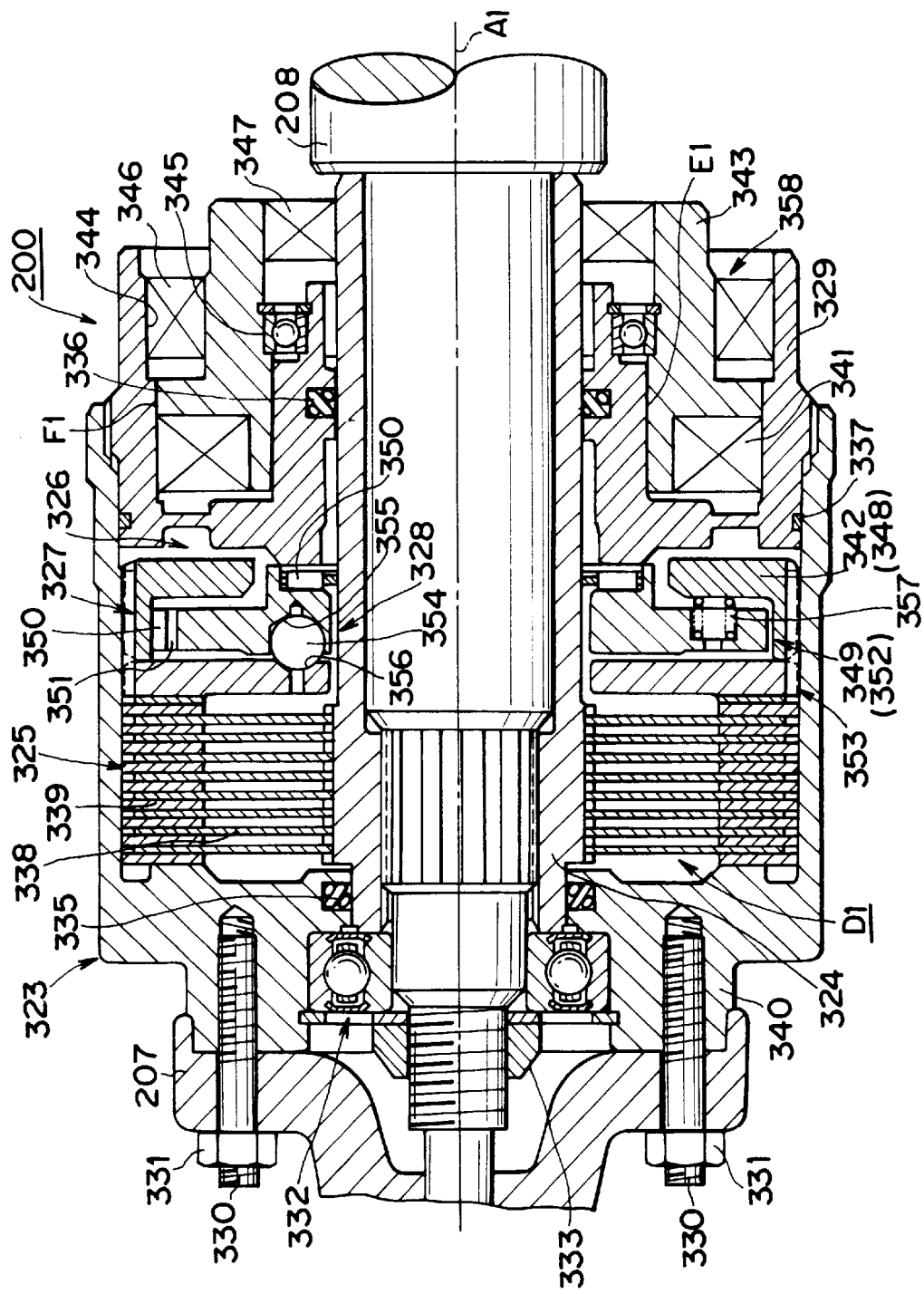
FIG. 35 is a section showing a driving force transmission system according to still another embodiment of the invention.

FIG. 35 is a section showing another embodiment of the driving force transmission system 200 shown in FIG. 21. The driving force transmission system 200, as shown in FIG. 35, is equipped with a coupling case 323 acting as a fast rotary member, a shaft 324 acting as a second rotary member, a clutch mechanism 325, a pilot mechanism 326, a first cam mechanism 327 and a second cam mechanism 328.

The coupling case 323 is formed into a cylinder, and an annular rotor 329 is screwed on one end opening of the coupling case 323 to cover that opening. On the other hand, the shaft 324 is arranged in the rotor 329 and is extended in the coupling case 323. To one end portion of the coupling case 323, on the other hand, there is fixed and connected the first propeller shaft 207 by means of a stud bold 330 and a nut 331. On the other hand, the second propeller shaft 208 is splined in the shaft 324. In the inner circumference of the coupling case 323, moreover, there is fitted a bearing 332, by which the second propeller shaft 208 is rotatably supported. On the leading end of the second propeller shaft 208, moreover, there is screwed a nut 333 which clamps the inner race of the bearing 332 between itself and the shaft 324. By the construction described above, the coupling case 323, the shaft 324 and the second propeller shaft 208 are enabled to rotate relative to one another on the axis A1.

In the inner circumference of the coupling case 323, on the other hand, there is fitted an X-ring 335, by which the coupling case 323 and the shaft 324 are sealed liquid-tight. In the inner circumference of the rotor 329, moreover, there is fitted an X-ring 336, by which the shaft 324 and the rotor 329 are sealed liquid-tight. On the outer circumference of the rotor 329, still moreover, there is fitted an O-ring 337, by which the coupling case 323 and the rotor 329 are sealed liquid-tight. The space, as defined by the coupling case 323, the shaft 324 and the rotor 329, is sealed by the X-rings 335 and 336 and the O-ring 337 thereby to form the coupling oil chamber D1. This coupling oil chamber D1 is filled with the oil for wetting the clutch mechanism 325. Moreover, the clutch mechanism 325, the pilot mechanism 326, the first cam mechanism 327 and the second cam mechanism 328 are mounted in the coupling oil chamber D1. Moreover, the clutch mechanism 325 is arranged between the rotor 329 and an inward flange 340 of the coupling case 323. On the other hand, the pilot mechanism 326, the first cam mechanism 327 and the second cam mechanism 328 are arranged between the rotor 329 and the clutch mechanism 325.

The clutch mechanism 325 is of the multi-disc type including a plurality of clutch discs 338 and a plurality of clutch plates 339. Each clutch disc 338 is fitted at its inner circumference in the spline which is formed in the outer circumference of the intermediate portion of the shaft 324, and is so assembled that it can rotate integrally with the shaft 324 and move in the axial direction. On the other hand, each clutch plate 339 is fitted at its outer circumference in the spline which is formed in the inner circumference of the coupling case 323, and is so assembled that it can rotate integrally with the coupling case 323 and move in the axial direction.

The individual clutch discs 338 and the individual clutch plates 339 are alternately positioned at the side of the inward flange 340 of the coupling case 323 and are brought into abutment against each other to come into frictional engagement and out of abutment to take free states.

The pilot mechanism 326 is of an electromagnetic type composed of a coil 341 and an annular armature 342. The coil 341 is buried in an annular iron core 343. The coil 341 and the iron core 343 construct an electromagnet 358.

On the other hand, the iron core 343 is restricted in the axial movement by an annular recess 344 of the rotor 329. The bearing 345 is fitted in the recess 344 and supported to rotate. The rotor 329 and the iron core 343 are positioned in the radial direction by the bearing 345. Thus, the air gap F1 is formed between the outer circumference of the iron core 343 and the rotor 329, and the air gap E1 is formed between the inner circumference of the iron core 343 and the rotor 329. Here, the rotor 329 and the iron core 343 are sealed liquid-tight by an oil seal 346, and the iron core 343 and the shaft 324 are sealed liquid-tight by an oil seal 347. These oil seals 346 and 347 and the X-ring 336 perform a function to prevent the oil or foreign substance from entering the air gaps E1 and F1.

On the other hand, the armature 342 is fitted in the spline, which is formed in the inner circumference of the coupling case 323, and is assembled to move in the axial direction. This armature 342 is formed to have an L-shaped section.

In the pilot mechanism 326, a magnetic path is established among the rotor 329, the iron core 343 and the armature 327, as made of a magnetic metal material, when the coil 341 is energized, so that the armature 327 is attracted to the rotor 329 by the magnetic induction.

The first cam mechanism 327 is composed of a first cam member 348, a second cam member 349 and cam followers 350. Specifically, the first cam member 348 acts as the armature 342 constructing the pilot mechanism 326. As a result, the firs cam member 348 can rotate integrally with the coupling case 323 and can move in the axial direction. On the other hand, the second cam member 349 is rotatably assembled between the first cam member 348 and the shaft 324. Between the rotor 329 and the second cam member 349, moreover, there is fitted a thrust bearing 350. This thrust bearing 350 bears a load for urging the second cam member 349 toward the rotor 329.

Figure 36:
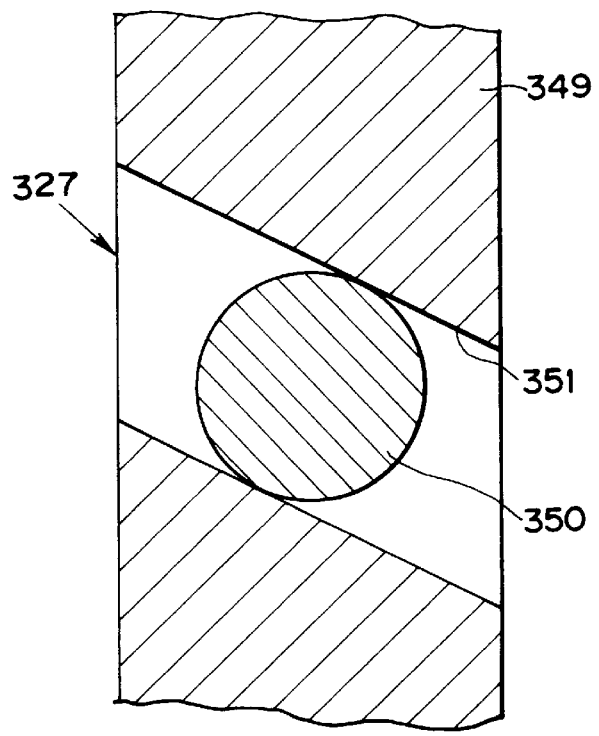
FIG. 36 is an enlarged transverse section of a portion showing a relation between a cam groove and cam followers in a first cam mechanism constructing the driving force transmission system shown in FIG. 35.

The second cam member 349 is formed into a ring shape, and a plurality of sloped cam grooves 351, as shown in FIGS. 35 and 36, are formed in the outer circumference of the second cam member 349 and at a predetermined interval in the circumferential direction. These sloped cam grooves 351 are sloped to intersect with respect to the axis A1. The cam followers 350 are formed into a roller shape and are so assembled in the inner circumference of the cylindrical portion of the first cam member 348 as to rotate. A plurality of sets of cam followers 350 are assembled to confront the individual sloped cam grooves 351 such that their inner end portions face the individual sloped cam grooves 351.

In the first cam mechanism 327, when the first cam member 348 moves in the axial direction, the second cam member 349 is rotated in the circumferential direction by the actions of the sloped cam grooves 351 and the cam followers 350. Here, the first cam member 348 acts as the armature 342 constructing the pilot mechanism 326 so that, when the coil 341 constructing the pilot mechanism 326 is energized, the armature 342 is attracted toward the rotor 329 to move in the axial direction by the magnetic attraction.

The second cam mechanism 328 is composed of a first cam member 352, a second cam member 353 and cam followers 354. Moreover, the first cam member 352 acts as the second cam member 349 constructing the first cam mechanism 327. The second cam member 353 is fitted in the spline which is formed in the inner circumference of the coupling case 323, and can rotate integrally with with coupling case 323 and can move in the axial direction.

In these two cam members 352 and 353, V-shaped cam grooves 355 and 356 are formed in the confronting faces. The ball-shaped cam followers 354 are fitted between those two cam grooves 355 and 356. The first cam member 352 is urged toward the second cam member 353 by a spring member 357, which is sandwiched between the first cam members 352 and 348, to come into elastic abutment against the cam followers 354. On the other hand, the second cam member 353 is held to confront the clutch mechanism 327 so that it can come into contact with the clutch plate 339. Here will be described the construction of the embodiment of FIGS. 35 and 36 and the construction of the invention. Specifically, the coupling case 323, the shaft 324, the rotor 329, the X-rings 335 and 336 and the O-ring 337 construct the isolating mechanism of the invention. On the other hand, the coupling case 323 corresponds to the first rotary member of the invention whereas the shaft 324 corresponds to the second rotary member of the invention, and the electromagnet 358 and the rotor 329 construct the electromagnetic type control means of the invention.

In the driving force transmission system 200 thus constructed, while the coil 341 constructing the pilot mechanism 326 is inactive, the armature 342 is also inactive. As a result, the first and second cam mechanisms 327 and 328 and the clutch mechanism 325 are inactivated to establish no torque transmission between the coupling case 323 and the shaft 324.

When the coil 341 constructing the pilot mechanism 326 is energized, it attracts the armature 342 (or the first cam member 348 of the first cam mechanism 327) to move it in the axial direction. As a result, the second cam member 349 (or the first cam member 352 of the second cam mechanism 328) is rotated in the circumferential direction by the sloped cam grooves 351 and the cam followers 350 of the first cam mechanism 327. By the actions of the cam grooves 355 and 356 and the cam followers 354 of the second cam mechanism 328, on the other hand, the second cam member 353 moves in the axial direction to push the individual clutch discs 338 and the individual clutch plates 339, as constructing the clutch mechanism 325, into frictional engagement.

As a result, the clutch mechanism 325 is frictionally applied to transmit the torque between the coupling case 323 and the shaft 324. In this case, the force for urging the clutch mechanism 325 in the axial direction rises in proportion to the flow of the electric current to be applied to the coil 341. By increasing the current flow to the coil 341, therefore, it is possible to increase the torque to be transmitted between the coupling case 323 and the shaft 324. In the embodiment of FIG. 35, too, the coupling oil chamber D1 is sealed liquid-tight from the surrounding space so that effects similar to those of the embodiment of FIGS. 1 and 2 are achieved.

Here in the driving force transmission system 200, the axial force of the armature 342 constructing the pilot mechanism 326 is converted by the first cam mechanism 327 into the rotational force, and this rotational force is converted by the second cam mechanism 328 into the frictionally applying force (i.e., the pushing force in the axial direction) for the clutch mechanism 325. In short, it is unnecessary to establish the frictionally applying force in the circumferential direction for the pilot mechanism 326. As a result, the pilot mechanism is equipped with the coil 341 and the armature 342 to be attracted to move in the direction of the axis A1 when the coil 341 is energized. On the other hand, it is possible to adopt the pilot mechanism 326 which uses no friction clutch. In the pilot mechanism 326, therefore, it is possible to prevent the noise or vibration, as might otherwise be caused by the friction clutch.

In the driving force transmission system 200, on the other hand, no matter whether the relative rotation between the coupling case 323 and the shaft 324 might be forward or backward, the moving direction of the armature 342 is in the same axial direction at all times. As a result, the acting directions of the first cam mechanism 327 and the second cam mechanism 328 are also fixed, so that the increase in the chattering in the rotational direction can be suppressed between the two cam members 348 and 349 and the cam followers 350 constructing those cam mechanisms 327 and 328 and between the two cam members 352 and 353 and the cam followers 354.

In the driving force transmission system 200, on the other hand, the pilot mechanism 326 is constructed of the coil 341 and the armature 342. On the other hand, the armature 342 acts as the first cam member 348 of the first cam mechanism 327, and the second cam member 349 of the first cam mechanism 327 acts as the first cam member 352 of the second cam mechanism 328. As a result, all the mechanisms including the pilot mechanism 326, the first cam mechanism 327 and the second cam mechanism 328 can be made synthetically compact to reduce the size of the driving force transmission system 200.

In this embodiment, on the other hand, the first cam mechanism 327 is constructed to include: the sloped cam grooves 351 formed in the second cam member 349; and the cam followers 350 fitted on the first cam member 348 and confronting the sloped cam grooves 351. As a result, the force for moving the first cam member 348 in the direction of the axis A1 can be smoothly converted into the force in the direction to rotate the second cam member 349.

Figure 37:
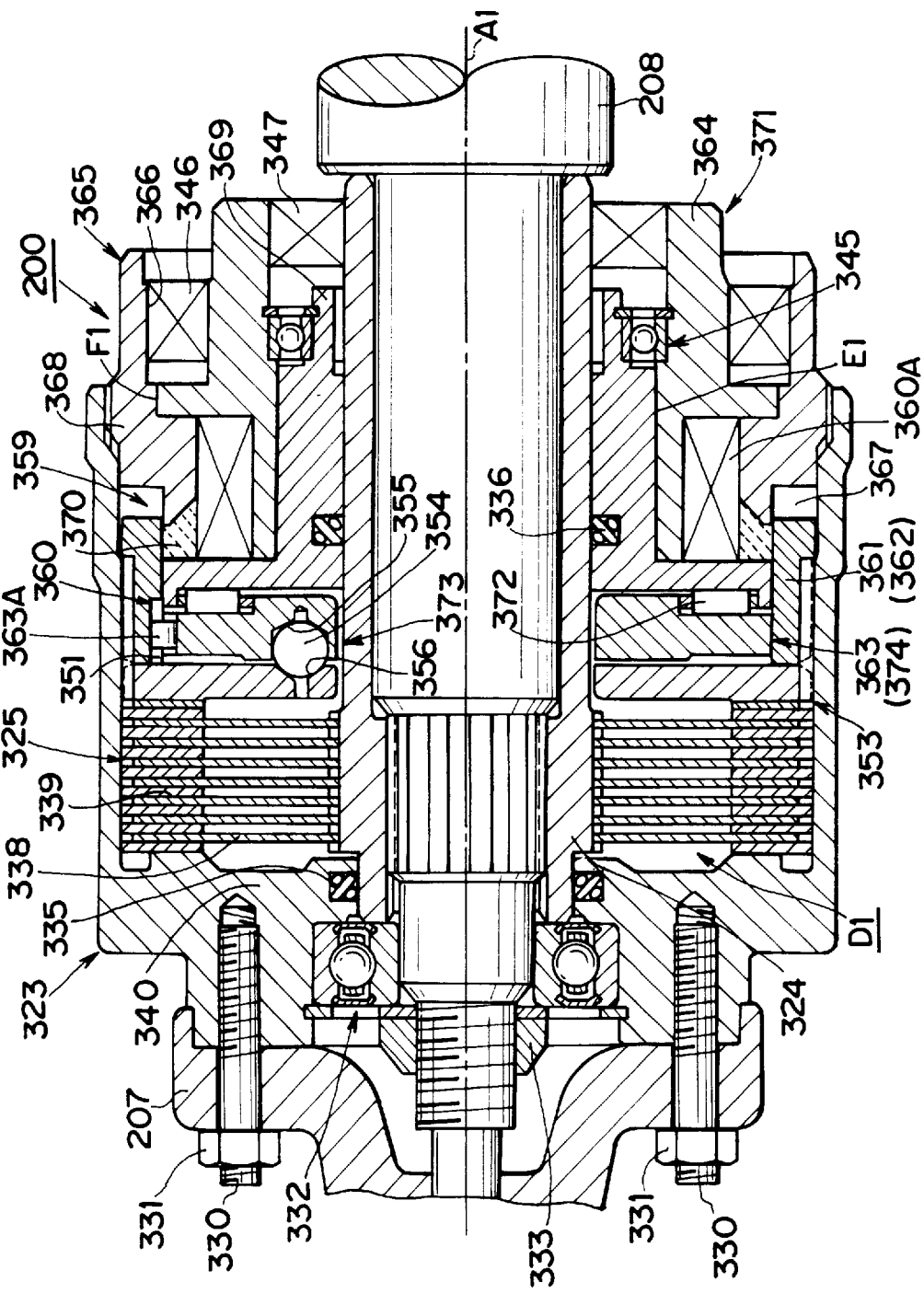
FIG. 37 is a section showing a driving force transmission system according to still another embodiment of the invention.

FIG. 37 shows another embodiment of the driving force transmission system 200 to be used in FIG. 21. This driving force transmission system 200 is so modified from the basic construction of the driving force transmission system 200 shown in FIG. 35 that the constructions of a pilot mechanism 359 and a first cam mechanism 360 are made different from those of the driving force transmission system 200 of FIG. 35. The remaining construction is similar to that of FIG. 35, and its description is limited to a necessary one while omitting its detailed description In the driving force transmission system 200 shown in FIG. 37, the pilot mechanism 359 is equipped with an electromagnetic coil 360A and an armature 361. On the other hand, the first cam mechanism 360 is equipped with a first cam member 362 acting as the armature 361, the second cam member 363 and cam followers 363A.

The coil 360A constructing the pilot mechanism 359 is buried in an iron core 364, and this iron core 364 is fitted in a recess 366 formed in the inner circumference of a cylindrical rotor 365. This rotor 365 is screwed in and jointed to the inner circumference of the coupling case 323. The armature 361 is formed into a cylinder and is so fitted in the spline, which is formed in the inner circumference of the coupling case 323, that it can move in the axial direction. Specifically, the armature 361 can move forward and backward in the axial direction in an annular recess 367 which is formed between the inner circumference of the coupling case 323 and the rotor 365.

In the driving force transmission system 200, the rotor 365 of the coupling case 323 is constructed integrally of an outer cylindrical portion 368, an inner cylindrical portion 369, and a joint portion 370 jointing those two cylindrical portions 368 and 369. In the rotor 365 thus constructed, the two cylindrical portions 368 and 369 are made of a magnetic metal material, and the joint portion 370 is made of a non-magnetic metal material. These iron core 364 and coil 360A construct an electromagnet 371.

On the other hand, the X-ring 336 is fitted between the inner cylindrical portion 369 and the shaft 324. Moreover, the inner cylindrical portion 369 is rotatably supported by the bearing 345 which is fitted in the inner circumference of the iron core 364. This iron core 364 is positioned in the axial direction by the bearing 345.

Thus, the air gap F1 is formed between the iron core 364 and the outer cylindrical portion 368, and the air gap E1 is formed between the iron core 364 and the inner cylindrical portion 369.

Moreover, the space, as defined by the coupling case 323, the shaft 324 and the rotor 365, is sealed liquid-tight by the X-rings 335 and 336 thereby to form the coupling oil chamber D1. This coupling oil chamber D1 is filled with the oil for wetting the clutch mechanism 325.

In the pilot mechanism 359, moreover, when the coil 360A is energized, a magnetic path is established among the coil 360, the outer cylindrical portion 368, the armature 361, the inner cylindrical portion 369 and the coil 360 so that the armature 361 is moved in the axial direction within the recess 367 toward the outer cylindrical portion 368 by the magnetic induction.

On the other hand, the first cam mechanism 360 is composed of the first cam member 362, the second cam member 363 and the cam followers 363A, and the first cam member 362 acts as the armature 361 composing the pilot mechanism 359. As a result, the first cam member 362 can rotate integrally with the coupling case 323 and can move in the axial direction. On the other hand, the second cam member 363 is rotatably fitted between the coupling case 323 and the shaft 324. Moreover, a thrust bearing 372 is fitted between the second cam member 363 and the inner cylindrical portion 369.

The second cam member 363 is formed into a ring shape, and a plurality of sloped cam grooves 351 are formed as in FIG. 36 in the outer circumference of the second cam member 363 and at a predetermined spacing in the circumferential direction. The sloped cam grooves 351 are sloped to intersect with respect to the axis A1. The cam followers 363A are formed into a roller shape and are so assembled with the first cam member 362 that they can rotate. A plurality of sets of cam followers 363A are assembled to confront the individual sloped cam grooves 351, and their inner end portions confront the individual sloped cam grooves 351.

In the first cam mechanism 360, when the first cam member 362 is moved in the axial direction, the second cam member 363 is rotated in the circumferential direction by the actions of the sloped cam grooves 351 and the cam followers 363A. Since the first cam member 362 acts as the armature 361 constructing the pilot mechanism 359, when the coil 360A constructing the pilot mechanism 359 is energized, the armature 361 is attracted toward the outer cylindrical portion 368 to move in the axial direction by the magnetic induction.

A second cam mechanism 373 is constructed like the second cam mechanism 328 of the driving force transmission system 200 shown in FIG. 35. Specifically, the second cam mechanism 373 is composed of a first cam member 374, the second cam member 353 and the cam followers 354. Moreover, the first cam member 374 acts as the second cam member 363 composing the first cam mechanism 360. The second cam member 353 is moved in the axial direction by the rotation of the first cam member 374 to push the clutch discs 338 and the clutch plates 339 composing the clutch mechanism 325 into frictional engagement.

Here will be described the correspondence between the construction of the embodiment of FIG. 37 and the construction of the invention. Specifically, the electromagnet 371 and the rotor 365 construct the electromagnetic type control means of the invention. On the other hand, the coupling case 323, the shaft 324, the X-rings 335 and 336 and the rotor 365 construct the isolating mechanism of the invention.

The driving force transmission system 200, as shown in FIG. 37, is activated like the driving force transmission system 200 of FIG. 35 by energizing the coil 360A composing the pilot mechanism 359. As a result, the clutch mechanism 325 is applied to transmit the torque between the coupling case 323 and the shaft 324 so that the driving force of the first propeller shaft 207 is transmitted to the second propeller shaft 208.

Thus, in the driving force transmission system 200 shown in FIG. 37, the pilot mechanism 359 has no friction clutch so that effects similar to those of the driving force transmission system 200 shown in FIG. 35 are achieved. In the embodiment of FIG. 37, on the other hand, the coupling oil chamber D1 is sealed liquid-tight from the surrounding space so that effects similar to those of the embodiment of FIGS. 1 and 2 are achieved.

Figure 38:
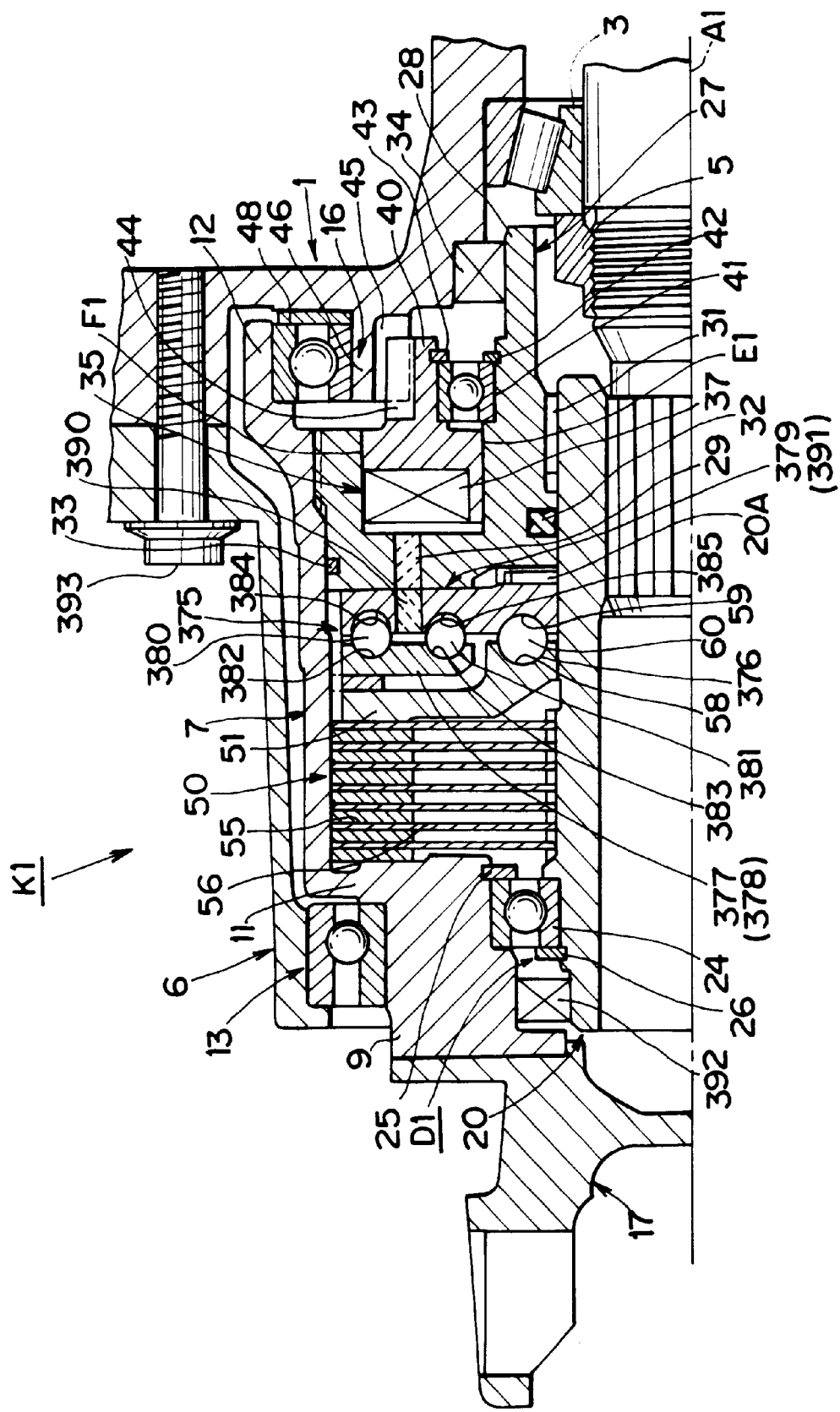
FIG. 38 is a partially omitted section showing a driving force transmission system according to still another embodiment of the invention.

FIG. 38 shows still another embodiment of the driving force transmission system K1 used in FIG. 25. This driving force transmission system K1 is modified from the basic construction of the driving force transmission system K1 of FIGS. 1 and 2. Specifically, the driving force transmission system K1 shown in FIG. 38 and the driving force transmission system K1 of FIGS. 1 and 2 are different in the constructions of a first cam mechanism 375 and a second cam mechanism 376 and in the constructions of the shaft 20 and the coupling case 7. In the following, therefore, here will be described in detail the first cam mechanism 375 and the second cam mechanism 376 of the driving force transmission system K1 of FIG. 38. The first cam mechanism 375 is equipped with a first cam member 378 acting as an armature 377, a second cam member 379, and a pair of ball-shaped cam followers 380 and 381.

The first cam member 378 and the second cam member 379 are formed into ring shapes, arcuate cam grooves 382 and 383 are formed in the first cam member 378 whereas cam grooves 384 and 385 are formed in the second cam member 379. The individual cam grooves 382 and 383 and the individual cam grooves 384 and 385 are opposed each other, and the individual cam followers 380 and 381 are fitted between the cam grooves 382 and 384 and between the cam grooves 383 and 385.

On the other hand, the first and second cam members 378 and 379 are wholly made of a magnetic metal material, but a second cam member 389 is provided in its radial portion with an annular portion 390 which is made of a non-magnetic metal material. The annular portion 390 is arranged between the two cam grooves 384 and 385 thereby to define the second cam member 389 into outer and inner side portions in which the individual cam grooves 384 and 385 are located. On the other hand, the annular portion 390 and the shielding member 29 confront each other at their end portions.

The second cam mechanism 376 is constructed substantially as in FIGS. 1 and 2. Specifically, the second cam mechanism 376 is equipped with a first cam member 391, the second cam member 51 and the balls 60, and the first cam member 391 acts as the second cam member 379 composing the first cam mechanism 375. The second cam member 51 is moved in the direction of the axis A1 by the pushing force which is transmitted through the balls 60 by the rotation of the first cam member 391, to push the clutch discs 55 and the clutch plates 56 composing the main clutch 50 into frictional engagement.

With the first cam mechanism 375 and the second cam mechanism 376 being assembled, the cam followers 60 of the second cam mechanism 376 are completely fitted in the individual cam grooves 58 and 59. In the first cam mechanism 375, on the other hand, the individual cam followers 380 and 381 are fitted with a slight shift in the circumferential direction with respect to the individual cam grooves 382 and 384 and the individual cam grooves 383 and 385.

When the coil 37 of the electromagnet 35 is energized, moreover, a magnetic path is established among the coil 37, the rotor 27, the second cam member 379, the cam followers 380, the first cam member 378, the cam followers 381 and the second cam member 379 so that the armature 377 (or the first cam member 378) is attracted toward the second cam member 379 to move in the axial direction by the magnetic induction.

In the first cam mechanism 375, on the other hand, when the first cam member 378 is moved in the axial direction, the second cam member 379 is rotated in the circumferential direction by the actions of the individual cam grooves 382 and 384, the cam followers 380, the individual cam grooves 383 and 385 and the cam followers 381. Since the first cam member 378 acts as the armature 377, however, the armature 377 is attracted, when the coil 37 is energized, toward the second cam member 379 to move in the axial direction by the magnetic induction.

Here, the construction of the shaft 20, as embodied in the embodiment of FIG. 38, is different from that of the shaft 20 shown in FIGS. 1 and 2. In short, the shaft 20 of FIG. 38 is not equipped with the construction corresponding to the partition of the shaft 20 of FIGS. 1 and 2. On the other hand, the coupling case 7 of FIG. 38 is not equipped with the construction corresponding to the bottom 10 of the coupling case 7 of FIGS. 1 and 2. In the embodiment of FIG. 38, moreover, there is fitted on the inner circumference of the diametrically smaller cylindrical portion 9 of the coupling case 7 an oil seal 392, by which the coupling case 7 and the shaft 20 are sealed liquid-tight. Moreover, the differential carrier 1 and the cover 6 are fastened and fixed by bolts 393.

In this construction, the space, as defined by the coupling case 7, the shaft 20 and the rotor 27, is sealed liquid-tight by the oil seal 392, the X-ring 32 and the O-ring 33 thereby to construct the coupling oil chamber D1. In this coupling oil chamber D1, there are arranged the main clutch 50, the first cam mechanism 375 and the second cam mechanism 376, and the (not-shown) oil is filled therein.

Here will be described the correspondence between the construction of the embodiment of FIG. 38 and the construction of the invention.

Specifically, the coupling case 7, the shaft 20, the rotor 27, the oil seal 392, the X-ring 32 and the O-ring 33 construct the isolating mechanism of the invention. On the other hand, the electromagnet 35 and the rotor 27 construct the electromagnetic control means of the invention. On the other hand, the armature 377 and the cam followers 380 and 381 construct the pilot mechanism of the invention.

In the embodiment of FIG. 38, moreover, the coupling oil chamber D1 is sealed liquid-tight from the surrounding space by the isolating mechanism so that effects similar to those of the embodiment of FIGS. 1 and 2 are achieved. In the embodiment of FIG. 38, on the other hand, the pilot mechanism to be controlled directly by the electromagnet 35 is constructed to have no friction clutch, so that effects similar to those of the embodiment of FIG. 35 are achieved.

Here will be enumerated the characteristic constructions of the foregoing specific embodiments. Specifically, the driving force transmission system comprises: a first rotary member and a second rotary member arranged to rotate relative to each other; a clutch mechanism for controlling a torque transmission between the first rotary member and the second rotary member; an electromagnet for generating an electromagnetic force to apply/release the clutch mechanism; and a magnetic member arranged at a gap from the electromagnet, wherein the improvement comprises an isolating mechanism for forming an air chamber (or an electromagnet housing chamber) to isolate a space, in which the electromagnet and the magnetic member are arranged, fluid-tight from the surrounding space. The isolating mechanism of this first characteristic construction is exemplified to include a coupling case, a shaft, a rotor, an oil seal, an O-ring and a seal bearing.

In a characteristic construction disclosed in FIGS. 1 to 5, on the other hand, the driving force transmission system comprises: a first rotary member and a second rotary member arranged to rotate relative to each other; a clutch mechanism for controlling a torque transmission between the first rotary member and the second rotary member; an electromagnet for controlling the clutch mechanism; and oil for retaining the function of the clutch mechanism, wherein the improvement comprises an isolating mechanism for forming an oil chamber to isolate a space, in which the clutch mechanism is arranged, liquid-tight from the surrounding space. The isolating mechanism of this second characteristic construction is exemplified to include a coupling case, a shaft, a rotor, an X-ring and an O-ring In a characteristic construction disclosed in FIGS. 15 to 19, moreover, the driving force transmission system for a vehicle comprises electromagnetic means for controlling the actions electromagnetically, wherein the driving force transmission system is arranged on a propeller shaft, and wherein the electromagnetic means is supported either by a body constructing the vehicle or outside of a case.

In a characteristic construction disclosed in FIGS. 15 to 19, still moreover, the driving force transmission system for a vehicle comprises: a main clutch mechanism arranged between an inner rotary member and an outer rotary member arranged coaxially with and made rotatable relative to each other; an electromagnetic type pilot clutch mechanism; and a cam mechanism for converting the frictional applying force of the pilot clutch mechanism into a frictional applying force for the main clutch mechanism, so that the main clutch mechanism is frictionally applied by the action of the pilot clutch mechanism to transmit a torque between the two rotary members, wherein an electromagnetic coil composing the pilot clutch mechanism is rotatably assembled on one of the inner and outer rotary members or between the two rotary members and is fixed through an elastic member with respect to a vehicle body or a stationary member at the vehicle body.

In a characteristic construction disclosed in FIGS. 15 to 19, still moreover, in the driving force transmission system, the electromagnetic coil is rotatably assembled on one of the inner and outer rotary members or between the two rotary members so that it can be fixed at an arbitrary position of the vehicle. As a result, the driving force transmission system can be arranged as it is and without deterioration of any function in a desired place of the vehicle without being housed in any special case. The electromagnetic coil is fixed through an elastic member at the arbitrary position of the vehicle, so that the elastic member absorbs or damps the vibration of the body side to prevent the affection on the electromagnetic coil assembled portion of the driving force transmission system.

In a characteristic construction disclosed in FIGS. 15 to 19, still moreover, in the driving force transmission system, one of the inner and outer rotary members is connected to a drive side shaft making the propeller shaft, and the other of the inner and outer rotary members is connected to a driven side shaft making the propeller shaft. As a result, the driving force transmission system can be arranged midway of the propeller shaft. As a result, a four-wheel drive vehicle can be made compact while requiring neither any special case nor modifying a transfer or a differential.

In a characteristic construction disclosed in FIGS. 15 to 19, still moreover, the driving force transmission system is arranged midway of a propeller shaft, and one of the inner and outer rotary members is connected to a drive side shaft making the propeller shaft, and the other of the inner and outer rotary members is connected to a driven side shaft making the propeller shaft.

According to a characteristic construction disclosed in FIGS. 1 to 5, the driving force transmission system comprises: a first rotary member and a second rotary member arranged to rotate on an axis relative to each other; a clutch mechanism for controlling a torque transmission between the first rotary member and the second rotary member; an electromagnet for generating an electromagnetic force to apply/release the clutch mechanism; a magnetic member arranged through an air gap with respect to the electromagnet; and a casing supporting the first rotary member, wherein the improvement comprises: a first bearing arranged between the first rotary member and the electromagnet and supporting the electromagnet for setting the air gap; a rotation stopping mechanism formed in the casing and the electromagnet for preventing the relative rotation between the casing and the electromagnet; and a second bearing arranged between the casing and the first rotary member and supporting the first rotary member, wherein the first bearing and the second bearing are so arranged at substantial identical positions in the axial direction as to overlap in the axial direction. The first rotary member, as described in this characteristic construction, includes the first rotary member itself and a member to rotate integrally with the first rotary member.

In the characteristic construction disclosed in FIGS. 1 to 5, moreover, the driving force transmission system comprises: a first rotary member and a second rotary member arranged to rotate relative to each other; a clutch mechanism for controlling a torque transmission between the first rotary member and the second rotary member; an electromagnet for generating an electromagnetic force to apply/release the clutch mechanism; and a magnetic member arranged at an air gap from the electromagnet, wherein the improvement comprises an isolating mechanism for isolating a space, in which the electromagnet and the magnetic member are arranged, gas-tight from the surrounding space. Here, the isolating mechanism is constructed of a coupling case, a rotor, an oil seal, an O-ring and a seal bearing.

According to a characteristic construction disclosed in FIGS. 1 to 5, the driving force transmission system comprises: a first rotary member and a second rotary member arranged to rotate on an axis relative to each other; a clutch mechanism for controlling a torque transmission between the first rotary member and the second rotary member; an electromagnet for controlling the clutch mechanism; a magnetic member arranged through an air gap with respect to the electromagnet; and a casing supporting the first rotary member, wherein the improvement comprises: a first bearing arranged between the first rotary member and the electromagnet and supporting the electromagnet for setting the air gap; a rotation stopping mechanism formed in the casing and the electromagnet for preventing the relative rotation between the casing and the electromagnet; and a second bearing arranged between the casing and the first rotary member and supporting the first rotary member, wherein the first bearing and the second bearing are so arranged at substantial identical positions in the axial direction as to overlap in the radial direction. The first rotary member, as described in this characteristic construction, includes the first rotary member itself and a member to rotate integrally with the first rotary member.

In a characteristic construction disclosed in FIGS. 1 to 5, FIGS. 9 and 10, or FIGS. 12 or 13, the driving force transmission system comprises: a first rotary member and a second rotary member arranged to rotate relative to each other; a clutch mechanism for controlling a torque transmission between the first rotary member and the second rotary member; an electromagnet for controlling the clutch mechanism; and oil for retaining the function of the clutch mechanism, wherein the improvement comprises an isolating mechanism for isolating a space, in which the clutch mechanism and oil are arranged, liquid-tight from the surrounding space. Here, the isolating mechanism is constructed of a coupling case, a shaft, a rotor, an X-ring and an O-ring.

Here will be enumerated the characteristic constructions of the invention, as disclosed in connection with the specific embodiment of FIGS. 14 and 15. Specifically, a stud bolt is constructed to have an embedded side externally threaded portion to be embedded in the internally threaded portion of the first rotary member, and a nut-side externally threaded portion to be screwed in the internally threaded portion of the nut, wherein the external diameter of the embedded side externally threaded portion and the external diameter of the nut-side externally threaded portion are set on the basis of the strength of the first rotary member and the strength of the stud bolt. On the other hand, the external diameter of the embedded side externally threaded portion and the external diameter of the nut-side externally threaded portion could also be set on the basis of the strength of the nut and the strength of the stud bolt.

Further characterized is that by comparing the strengths of the first rotary member and the nut and the strength of the stud bolt, the external diameter of the externally threaded portion to be fitted in a member having a lower strength than the stud bolt is set to a larger value than that of the externally threaded portion to be fitted in a member having a higher strength than the embedded bolt.

What is claimed is:

1. A driving force transmission system between a first rotary member and a second rotary member arranged rotatably relative to each other, comprising:
   a housing capable of enclosing at least two sealed chambers, said first and second rotary members being supported at said housing;
   a clutch mechanism in one of said chambers in said housing and connected so as to provide controlled torque transmission between said first and second rotary members;
   an electromagnetic control device including an electromagnet in another of said chambers in said housing, the electromagnetic control device being positioned to control actions of said clutch mechanism;
   oil in said one of said chambers so as to wet said clutch mechanism; and
   seals positioned in said housing to fluid tightly seal said another of said chambers relative to said one of said chambers.

2. A driving force transmission system according to claim 1, further comprising:
   a magnetic member arranged on at least one portion of said first rotary member;
   a stationary member arranged irrotationally for supporting said first rotary member and said electromagnet;
   a rotation stopping mechanism for jointing said electromagnet rotationally relative to said stationary member;
   a first bearing arranged between said first rotary member and said electromagnet for supporting said first rotary member rotatably to set a predetermined gap in a radial direction between said magnetic member and said electromagnet; and
   a second bearing arranged between said stationary member and said first rotary member for supporting said first rotary member rotatably;
   wherein said first bearing and said second bearing are so arranged at substantially identical positions in an axial direction as to overlap in the radial direction.

3. A driving force transmission system according to claim 2, further comprising:
   a third bearing arranged between said stationary member and said first rotary member for supporting said first rotary member rotatably;
   wherein one axial end of said first rotary member is supported by said second bearing whereas the other axial end of said first rotary member is supported by said third bearing.

4. A driving force transmission system according to claim 1, further comprising:
   a stationary member arranged irrotationally for supporting said first rotary member and said electromagnet;
   a positioning mechanism for positioning said electromagnet at a predetermined radial position on the center axis of said first rotary member;
   a rotation stopping mechanism for jointing said electromagnet irrotationally relative to said stationary member; and
   a first bearing arranged between said first rotary member and said electromagnet for supporting said first rotary member rotatably to set a predetermined gap in the radial direction between said magnetic member and said electromagnet.

5. A driving force transmission system according to claim 4, wherein said positioning mechanism includes fitting portions formed individually on said electromagnet and said stationary member and adapted to be fitted in contact with each other.

6. A driving force transmission system according to claim 4, wherein said rotation stopping mechanism includes a connector integrated with said electromagnet for connecting an electric wire with said electromagnet and for irrotationaily engaging with said stationary member.

7. A driving force transmission system according to claim 1, further comprising:
   a stationary portion for fixing said driving force transmission system; and
   a fitting mechanism for fitting said electromagnet on said stationary portion.

8. A driving force transmission system according to claim 7, further comprising:
   an elastic member for causing said fitting mechanism to elastically deform by the relative displacement between said electromagnet and said stationary portion.

9. A driving force transmission system according to claim 8, further comprising:
   a drive side shaft and a driven side shaft constructing a propeller shaft and arranged on a common axis;
   wherein said first rotary member is connected to said drive side shaft whereas said second rotary member is connected to said driven side shaft.

10. A driving force transmission system according to claim 1, further comprising:
    a magnetic member mounted on at least one portion of said first rotary member and arranged radially outside or inside of said electromagnet to leave a predetermined gap from said electromagnet.

11. A driving force transmission system according to claim 10, further comprising:
    a cooling liquid filled in said another chamber for cooling said clutch mechanism.

12. A driving force transmission system according to claim 1, further comprising:
a casing for accommodating said first rotary member, said second rotary member and said annular electromagnet;
an opening formed in said casing; and
a positioning mechanism arranged to confront said opening for positioning said electromagnet in a circumferential direction on the center axis of said first rotary member.

13. A driving force transmission system according to claim 1, further comprising:
a stud bolt integrally including an embedded side externally threaded portion screwed in an internally threaded portion, as formed in said first rotary member, and a nut-side externally threaded portion screwed in a nut;
wherein the external diameter of said embedded side externally threaded portion and the external diameter of said nut-side externally threaded portion are made different.

14. A driving force transmission system according to claim 13,
wherein the external diameter of said embedded side externally threaded portion and the external diameter of said nut-side externally threaded portion are set on the basis of the strength of said first rotary member and the strength of said nut.

15. A driving force transmission system according to claim 14,
wherein the smaller external diameter of the stud bolt is threaded into the one of the first rotary member and the nut having a higher strength.

16. A driving force transmission system according to claim 1,
wherein said first rotary member includes a bottomed cylindrical front housing made of a non-magnetic material, and a rear housing made of a magnetic material and screwed on a rear end opening of said front housing for covering said rear end opening; and
wherein said electromagnetic control means includes said electromagnet positioned outside of said front housing and arranged to confront one side of said clutch mechanism, as positioned in said front housing, across said rear housing, and an armature positioned in said front housing at the other side of said clutch mechanism and adapted to be attracted in the axial direction, when a coil of said electromagnet is energized, to apply said clutch mechanism.

17. A driving force transmission system according to claim 16,
wherein said front housing is made of an aluminum alloy whereas said rear housing is made of iron.

18. A driving force transmission system according to claim 16, further comprising:
a nut member screwed on a rear end portion of said rear housing for applying an axial pushing force to said front housing.

19. A driving force transmission system according to claim 1,
wherein said clutch mechanism includes: a main clutch for transmitting, when frictionally applied, the torque between said first rotary member and said second rotary member; a pilot clutch adapted to be applied by the electromagnetic force to be generated by said electromagnet; and a cam mechanism positioned between said main clutch and said pilot clutch for converting the frictional applying force for said pilot clutch into a force for pushing said main clutch.

20. A driving force transmission system according to claim 1,
wherein said clutch mechanism includes clutch plates adapted to come into frictional contact with each other to transmit the torque;
wherein said electromagnetic control device includes an armature so arranged in said one chamber as to confront said clutch plates and adapted to be urged toward said clutch plates by the electromagnetic force which is generated by said electromagnet; and
wherein oil film cut promoting means is provided on either one of the respective confronting faces of said clutch plate and said armature.

21. A driving force transmission system according to claim 1,
wherein said clutch mechanism includes a clutch plate arranged to confront a side wall portion forming part of said first rotary member defining said one chamber;
wherein said electromagnetic control devices includes an armature adapted to be urged by the electromagnetic force of said electromagnet thereby to clamp said clutch plate between itself and said side wall portion; and
wherein oil film cut promoting means is provided on either one of the respective confronting faces of said clutch plate and said side wall portion.

22. A driving force transmission system according to claim 1,
wherein said first rotary member includes a bottomed cylindrical front housing made of a non-magnetic material, and a rear housing made of a magnetic material and screwed on a rear end opening of said front housing for covering said rear end opening;
wherein said rear housing includes a body portion made of a magnetic material, and an annular portion made of a non-magnetic material and fitted in the radially intermediate portion of said body portion; and
wherein said annular portion and said body portion are jointed by an electron-beam welding method.

23. A driving force transmission system according to claim 22,
wherein said front housing is made of an aluminum alloy; and
wherein the body portion of said rear housing is made of a magnetic iron material whereas the annular portion of said rear housing is made of stainless steel.

24. A driving force transmission system according to claim 9,
wherein said first rotary member includes a bottomed cylindrical front housing made of a non-magnetic material, and a rear housing made of a magnetic material and screwed on the rear end opening of said front housing for covering said rear end opening;
wherein said rear housing includes a body portion made of a magnetic material, and an annular portion made of a non-magnetic material and fitted in the radially intermediate portion of said body portion; and
wherein said annular portion and said body portion are jointed by fitting said annular portion in a conical annular hole which is formed in said body portion.

25. A driving force transmission system according to claim 24,
wherein said annular portion and said body portion are fitted in such a direction by an axially acting force to be applied to said body portion that said body portion bites in a wedge shape into said annular portion.

26. A driving force transmission system according to claim 1,
wherein said first rotary member includes a bottomed cylindrical front housing made of a non-magnetic material and housing said clutch mechanism therein, and a rear housing made of a magnetic material and screwed on the rear end opening of said front housing for covering said rear end opening; and wherein said electromagnetic control device includes an armature adapted to be attracted by said electromagnet, as arranged at the side opposed to said clutch mechanism across said rear housing, and so arranged in said front housing as to confront said clutch mechanism.

27. A driving force transmission system according to claim 1, further comprising:

an electromagnetic pilot mechanism including an armature adapted to be moved in the axial direction by the electromagnetic force of said electromagnet;

a first cam mechanism for converting the axial moving force of said armature into a rotational force; and a second cam mechanism for converting the rotational force, as converted by said first cam mechanism, into an axial urging force for said clutch mechanism.

28. A driving force transmission system according to claim 27, wherein said first cam mechanism includes: a first cam member assembled to move only in the axial direction with respect to said first rotary member and moved in the axial direction by the electromagnetic force of said electromagnet; a second cam member so arranged between said first and second rotary members as to rotate only in the circumferential direction; and a cam follower interposed between said first and second cam members for converting the axial moving force of said first cam member into a rotational force for said second cam member.

29. A driving force transmission system according to claim 28, wherein the second cam member of said first cam mechanism acts as the first cam member of said second cam mechanism.

30. A driving force transmission system according to claim 27, wherein said pilot mechanism includes an armature adapted to be attracted by said electromagnet to move in the axial direction and acting as the first cam member of said first cam mechanism.

31. A driving force transmission system according to claim 23, wherein said first cam mechanism includes: a sloped cam groove formed in a direction to intersect one of said first and second rotary members in the axial direction; a first cam member assembled to move only in the axial direction with respect to said first rotary member and moved in the axial direction by the electromagnetic force of said electromagnet; a second cam member so arranged between said first and second rotary members as to rotate only in the circumferential direction; and a roller-shaped cam follower fitted on the other of said first and second cam members and confronting said sloped cam groove for converting the axially moving force of said first cam member into a rotational force for said second cam member.

32. A driving force transmission system according to claim 27, wherein said first cam mechanism includes: a first cam member assembled to move only in the axial direction with respect to said first rotary member and moved in the axial direction by the electromagnetic force of said electromagnet; a second cam member so arranged between said first and second rotary members as to rotate only in the circumferential direction; recessed cam grooves formed in the confronting faces of said first and second cam members and confronting each other; and a ball-shaped cam follower confronting said two cam grooves for converting the axially moving force of said first cam member into a rotational force for said second cam member.

33. A driving force transmission system which has:

a first rotary member and a second rotary member arranged rotatably relative to each other;

a clutch mechanism for controlling a torque transmission between said first rotary member and said second rotary member;

an electromagnetic control device including an electromagnet for controlling the actions of said clutch mechanism:

oil for wetting said clutch mechanism;

an isolating mechanism for forming an oil chamber to isolate the space, in which said clutch mechanism and said oil are housed, liquid-tight from the space in which at least said electromagnet is arranged;

an armature adapted to be attracted by said electromagnet;

a magnetic path establishing member made of low-carbon steel for establishing a magnetic path between said electromagnet and said armature; and a sliding portion formed in a portion of said magnetic path establishing member and having a higher hardness than the remaining portions for allowing another member to come into frictional contact therewith.

34. A driving force transmission system according to claim 33, wherein said sliding portion is made harder at its surface by a surface hardening treatment.

35. A driving force transmission system according to claim 34, wherein only the surface of said sliding portion is hardened by carburizing and quenching it.

36. A driving force transmission system according to claim 33, wherein after the whole surface of said magnetic path establishing member is carburized, the carburized surface portion other than said sliding portion is machined, and the machined sliding portion is quenched to have the hard surface.

37. A driving force transmission system according to claim 33, wherein said magnetic path establishing member is formed into a cylindrical shape integral with said first rotary member.

38. A driving force transmission system according to claim 37, wherein said first rotary member includes a bottomed cylindrical front housing made of a non-magnetic material, and a rear housing made of a magnetic material and screwed on the rear end opening of said front housing for covering the rear end opening;

whereby said cylindrical magnetic path establishing member is formed by said rear housing.

39. A driving force transmission system according to claim 33, wherein said clutch mechanism includes: a main clutch for transmitting, when frictionally applied, the torque between said first rotary member and said second rotary member; a pilot clutch adapted to be applied by the electromagnetic force which is generated by said electromagnet; and a cam mechanism positioned between said main clutch and said pilot clutch for converting the frictional applying force for said pilot clutch into a force for pushing said main clutch.

* * * * *

UNITED STATES PATENT AND TRADEMARK OFFICE
CERTIFICATE OF CORRECTION

PATENT NO. : 6,109,408
DATED : August 29, 2000
INVENTOR(S): Akihiko IKEDA ET AL

It is certified that an error appears in the above-identified patent and that said Letters Patent is hereby corrected as shown below:

Column 59, line 56, delete "rotationally" and insert --irrotationally--;

Column 60, line 36, delete "irrotationaily" and insert --irrotationally--;

Column 62, line 46, delete "9" and insert --1--;

Column 63, line 3, delete "the" and insert --a--;

Column 63, line 44, "23" and insert --27--.

Signed and Sealed this

Eighth Day of May, 2001

Attest:

NICHOLAS P. GODICI

Attesting Officer   Acting Director of the United States Patent and Trademark Office